US010728008B2

(12) United States Patent
Malladi et al.

(10) Patent No.: US 10,728,008 B2
(45) Date of Patent: *Jul. 28, 2020

(54) TRANSMISSION OF UPLINK CONTROL CHANNELS OVER AN UNLICENSED RADIO FREQUENCY SPECTRUM BAND

(71) Applicant: QUALCOMM Incorporated, San Diego, CA (US)

(72) Inventors: Durga Prasad Malladi, San Diego, CA (US); Yongbin Wei, La Jolla, CA (US); Wanshi Chen, San Diego, CA (US); Peter Gaal, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/012,238

(22) Filed: Jun. 19, 2018

(65) Prior Publication Data

US 2018/0302209 A1 Oct. 18, 2018

Related U.S. Application Data

(63) Continuation of application No. 14/813,404, filed on Jul. 30, 2015, now Pat. No. 10,033,505.
(Continued)

(51) Int. Cl.
*H04L 5/00* (2006.01)
*H04W 72/04* (2009.01)
*H04L 27/00* (2006.01)

(52) U.S. Cl.
CPC .......... *H04L 5/0057* (2013.01); *H04L 5/0041* (2013.01); *H04L 27/0006* (2013.01);
(Continued)

(58) Field of Classification Search
CPC ................ H04L 1/1812; H04L 1/1861; H04L 5/0053–0057; H04W 72/0413; H04W 72/0453; H04W 72/1284
See application file for complete search history.

(56) References Cited

U.S. PATENT DOCUMENTS 9,590,791 B2 3/2017 Damnjanovic et al.
2010/0111226 A1 5/2010 Ko et al.
(Continued)

FOREIGN PATENT DOCUMENTS

CN 103701580 A 4/2014
CN 103918331 A 7/2014
(Continued)

OTHER PUBLICATIONS

International Search Report and Written Opinion—PCT/US2015/043111—ISA/EPO —dated Oct. 6, 2015, 13 pgs.
(Continued)

*Primary Examiner* — Pao Sinkantarakorn
(74) *Attorney, Agent, or Firm* — Holland & Hart LLP

(57) ABSTRACT

Techniques are described for wireless communication. A first method includes generating uplink control information at a wireless device, and transmitting the uplink control information over an interlace of a component carrier of an unlicensed radio frequency spectrum band. The interlace includes a plurality of non-contiguous concurrent resource blocks in the unlicensed radio frequency spectrum band, and at least two resource blocks in the interlace include different portions of the uplink control information. A second method includes generating uplink control information at a wireless device, and transmitting the uplink control information over an uplink control channel of an unlicensed radio frequency spectrum band. Resources of the uplink control channel are divided into a plurality of discrete dimensions and the uplink control information of the wireless device is transmitted
(Continued)

over a number of the discrete dimensions allocated to the uplink control information of the wireless device.

23 Claims, 32 Drawing Sheets

Related U.S. Application Data

(60) Provisional application No. 62/031,791, filed on Jul. 31, 2014.

(52) U.S. Cl.
CPC ......... *H04W 72/0413* (2013.01); *H04L 5/001* (2013.01); *H04L 5/0055* (2013.01)

(56) References Cited

U.S. PATENT DOCUMENTS

| | | |
|---|---|---|
| 2011/0243066 A1 | 10/2011 | Nayeb Nazar et al. |
| 2012/0002657 A1 | 1/2012 | Seyama et al. |
| 2012/0213196 A1 | 8/2012 | Chung et al. |
| 2012/0250631 A1 | 10/2012 | Hakola et al. |
| 2013/0272187 A1 | 10/2013 | Malladi et al. |
| 2014/0036889 A1 | 2/2014 | Kim et al. |
| 2014/0112282 A1 | 4/2014 | Wijting et al. |
| 2016/0036578 A1 | 2/2016 | Malladi et al. |
| 2017/0142593 A1 | 5/2017 | Seo et al. |
| 2018/0302208 A1 | 10/2018 | Malladi et al. |

FOREIGN PATENT DOCUMENTS

| | | |
|---|---|---|
| GB | 2477649 A | 8/2011 |
| GB | 2490110 A | 10/2012 |
| JP | 2013507067 A | 2/2013 |
| JP | 2014502080 A | 1/2014 |
| JP | 2016510529 A | 4/2016 |
| WO | WO-2010050221 A1 | 5/2010 |
| WO | WO-2010109521 A1 | 9/2010 |
| WO | WO-2013158363 A2 | 10/2013 |
| WO | WO-2014046497 A1 | 3/2014 |
| WO | WO-2014075043 A2 | 5/2014 |
| WO | WO-2014107052 A1 | 7/2014 |
| WO | WO2015094816 | 6/2015 |

OTHER PUBLICATIONS

Panasonic: "Comparison between Clustered DFT-s-OFDM and OFDM for supporting non-contiguous RB allocation within a component carrier". 3GPP Draft; R1-084583. 3rd Generation Partnership Project (3GPP). Mobile Competence Centre ; 650. Route Des Lucioles ; F-06921 Sophia-Antipolis Cedex ; France. no. Prague. Czech Republic; Nov. 18, 2008. Nov. 18, 2008; 7 pgs.
International Preliminary Report on Patentability—PCT/US2015/043111, The International Bureau of WIPO—Geneva, Switzerland, dated Feb. 9, 2017; 9 pgs.

TRANSMISSION OF UPLINK CONTROL CHANNELS OVER AN UNLICENSED RADIO FREQUENCY SPECTRUM BAND

CROSS REFERENCES

The present Application for Patent is a continuation of U.S. patent application Ser. No. 14/813,404 by Malladi et al., entitled "Transmission of Uplink Control Channels Over an Unlicensed Radio Frequency Spectrum Band," filed Jul. 30, 2015, and claims the benefit of U.S. Provisional Patent Application No. 62/031,791 by Malladi et al., entitled "Transmission of Uplink Control Channels Over an Unlicensed Radio Frequency Spectrum Band," filed Jul. 31, 2014, assigned to the assignee hereof, and expressly incorporated herein.

BACKGROUND

Field of the Disclosure

The present disclosure, for example, relates to wireless communication systems, and more particularly to techniques for transmitting uplink control channels over an unlicensed radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications with a UE over an unlicensed radio frequency spectrum band, or over different radio frequency spectrum bands (e.g., a licensed radio frequency spectrum band and/or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. In some instances, an uplink control channel may be transmitted over an unlicensed radio frequency spectrum band. Efficient transmission of such an uplink control channel, and/or coordination of the transmissions of uplink control channels from multiple UEs, may be desirable.

SUMMARY

The present disclosure, for example, relates to one or more techniques for transmitting uplink control channels over an unlicensed radio frequency spectrum band. In some examples, a plurality of UEs may have uplink control information (e.g., acknowledgement information and/or channel state information) to transmit to a base station at the same time. However, the resources available to transmit the uplink control information of the different UEs may be finite. The described techniques therefore enable efficient and/or flexible allocation and sharing of a finite number of resources between a plurality of UEs, and enable the provision of a greater or lesser share of the resources to one or more UEs.

In a first set of illustrative examples, a method for wireless communication is described. In one configuration, the method may include generating uplink control information at a wireless device, and transmitting the uplink control information over an interlace of a component carrier of an unlicensed radio frequency spectrum band. The interlace may include a plurality of non-contiguous concurrent resource blocks in the unlicensed radio frequency spectrum band. At least two resource blocks in the interlace may include different portions of the uplink control information.

In some examples of the method, generating the uplink control information may include receiving a downlink transmission, and generating acknowledgement information for the downlink transmission. The uplink control information may include the acknowledgement information. In some examples, the acknowledgement information may include code block level acknowledgement information for an individual code block of the downlink transmission or a group of code blocks of the downlink transmission. In some examples, the acknowledgement information may include transport block level acknowledgement information for an individual transport block of the downlink transmission or a group of transport blocks of the downlink transmission. In some examples, the method may include performing a joint coding on a plurality of acknowledgement bits of the acknowledgement information to generate jointly coded acknowledgement bits. In some examples, the joint coding may be a joint convolutional coding. In some examples, transmitting the uplink control information over the interlace of the component carrier may include transmitting a different portion of the jointly coded acknowledgement bits over each resource block of the interlace.

In some examples of the method, the plurality of non-contiguous concurrent resource blocks may be spaced in frequency according to a uniform spreading pattern. In some examples of the method, the uplink control information may be transmitted according to a physical uplink control channel (PUCCH) format from a group consisting of: format 1a, format 1b, format 2, and format 3. In some examples of the method, the uplink control information may include channel state information (CSI) for the unlicensed radio frequency spectrum band.

In a second set of illustrative examples, an apparatus for wireless communication is described. In one configuration, the apparatus may include means for generating uplink control information at a wireless device, and means for transmitting the uplink control information over an interlace of a component carrier of an unlicensed radio frequency spectrum band. The interlace may include a plurality of non-contiguous concurrent resource blocks in the unlicensed radio frequency spectrum band. At least two resource blocks in the interlace may include different portions of the uplink control information. In some examples, the apparatus may further include means for implementing one or more aspects of the method for wireless communication described above with respect to the first set of illustrative examples.

In a third set of illustrative examples, another apparatus for wireless communication is described. In one configuration, the apparatus may include a processor, and memory coupled to the processor. The processor may be configured to generate uplink control information at a wireless device, and transmit the uplink control information over an interlace of a component carrier of an unlicensed radio frequency spectrum band. The interlace may include a plurality of non-contiguous concurrent resource blocks in the unlicensed radio frequency spectrum band. At least two resource blocks in the interlace may include different portions of the uplink control information. In some examples, the processor may also be configured to implement one or more aspects of the method for wireless communication described above with respect to the first set of illustrative examples.

In a fourth set of illustrative examples, a non-transitory computer-readable medium for storing instructions executable by a processor is described. In one configuration, the non-transitory computer-readable medium may include instructions to generate uplink control information at a wireless device, and instructions to transmit the uplink control information over an interlace of a component carrier of an unlicensed radio frequency spectrum band. The interlace may include a plurality of non-contiguous concurrent resource blocks in the unlicensed radio frequency spectrum band. At least two resource blocks in the interlace may include different portions of the uplink control information. In some examples, the non-transitory computer-readable medium may also include instructions to implement one or more aspects of the method for wireless communication described above with respect to the first set of illustrative examples.

In a fifth set of illustrative examples, another method for wireless communication is described. In one configuration, the method may include generating acknowledgement information at a wireless device, and transmitting the acknowledgement information. The acknowledgement information may indicate, at a code block level within a transport block, whether a plurality of code blocks of a downlink transmission were received correctly. In some examples, the acknowledgement information may be transmitted over an interlace of a component carrier of an unlicensed radio frequency spectrum band In some examples of the method, the acknowledgement information may include a plurality of bits. Each bit may indicate whether an individual code block was received correctly. In some examples of the method, the acknowledgement information may include at least one bit indicating whether a group of code blocks was received correctly.

In some examples of the method, the interlace may include a plurality of non-contiguous concurrent resource blocks in the unlicensed radio frequency spectrum band. In some examples, transmitting the acknowledgement information over the interlace may include transmitting the acknowledgement information over a subset of the resource blocks of the interlace. In some examples, transmitting the acknowledgement information over the interlace may include transmitting different portions of the acknowledgement information over different subsets of the resource blocks of the interlace. In some examples, transmitting the acknowledgement information over the interlace may include transmitting the acknowledgement information over each of the resource blocks of the interlace. In some examples, the plurality of non-contiguous concurrent resource blocks may be spaced in frequency according to a uniform spreading pattern.

In some examples, the method may include performing a joint coding on a plurality of acknowledgement bits of the acknowledgement information to generate jointly coded acknowledgement bits. In some examples, the joint coding may be a joint convolutional coding. In some examples, transmitting the acknowledgement information over the interlace may include transmitting a different portion of the jointly coded acknowledgement bits over each resource block of the interlace In some examples of the method, the acknowledgement information may be transmitted according to PUCCH format from a group consisting of: format 1a, format 1b, format 2, and format 3. In some examples, the method may include generating CSI for the unlicensed radio frequency spectrum band, and transmitting the acknowledgement information includes transmitting an uplink control channel including the acknowledgement information and the CSI.

In a sixth set of illustrative examples, another apparatus for wireless communication is described. In one configuration, the apparatus may include means for generating acknowledgement information at a wireless device, and means for transmitting the acknowledgement information. The acknowledgement information may indicate, at a code block level within a transport block, whether a plurality of code blocks of a downlink transmission were received correctly. In some examples, the acknowledgement information may be transmitted over an interlace of a component carrier of an unlicensed radio frequency spectrum band. In some examples, the apparatus may further include means for implementing one or more aspects of the method for wireless communication described above with respect to the fifth set of illustrative examples.

In a seventh set of illustrative examples, another apparatus for wireless communication is described. In one configuration, the apparatus may include a processor, and memory coupled to the processor. The processor may be configured to generate acknowledgement information at a wireless device, and transmit the acknowledgement information. The acknowledgement information may indicate, at a code block level within a transport block, whether a plurality of code blocks of a downlink transmission were received correctly. In some examples, the acknowledgement information may be transmitted over an interlace of a component carrier of an unlicensed radio frequency spectrum band. In some examples, the processor may also be configured to implement one or more aspects of the method for wireless communication described above with respect to the fifth set of illustrative examples.

In an eighth set of illustrative examples, another non-transitory computer-readable medium for storing instructions executable by a processor is described. In one configuration, the non-transitory computer-readable medium may include instructions to generate acknowledgement information at a wireless device, and transmit the acknowledgement information. The acknowledgement information may indicate, at a code block level within a transport block, whether a plurality of code blocks of a downlink transmission were received correctly. In some examples, the acknowledgement information may be transmitted over an interlace of a component carrier of an unlicensed radio frequency spectrum band. In some examples, the non-transitory computer-readable medium may also include instructions to implement one or more aspects of the method for wireless communication described above with respect to the fifth set of illustrative examples.

In a ninth set of illustrative examples, another method for wireless communication is described. In one configuration, the method may include generating acknowledgement information including a plurality of acknowledgement bits for a downlink transmission, performing a joint coding on the plurality of acknowledgement bits to generate jointly coded acknowledgement bits, and transmitting the jointly coded acknowledgement bits over an interlace of a component carrier of an unlicensed radio frequency spectrum band. In some examples, the joint coding may be a joint convolutional coding. Each acknowledgement bit may indicate whether a separate portion of the downlink transmission was received correctly.

In some examples of the method, the interlace may include a plurality of non-contiguous concurrent resource blocks in the unlicensed radio frequency spectrum band. In some examples, transmitting the jointly coded acknowledgement bits over the interlace may include transmitting the jointly coded acknowledgement bits over a subset of the resource blocks of the interlace. In some examples, transmitting the jointly coded acknowledgement bits over the interlace may include transmitting different portions of the jointly coded acknowledgement bits over different subsets of the resource blocks of the interlace. In some examples, transmitting the jointly coded acknowledgement bits over the interlace may include transmitting the jointly coded acknowledgement bits over each of the resource blocks of the interlace. In some examples, the plurality of non-contiguous concurrent resource blocks may be spaced in frequency according to a uniform spreading pattern.

In some examples of the method, each separate portion of the downlink transmission may include a code block or a group of code blocks. In some examples of the method, each separate portion of the downlink transmission may include a transport block or a group of transport blocks. In some examples of the method, each separate portion of the downlink transmission may include a group of code blocks across one or more transport blocks. In some examples of the method, the jointly coded acknowledgement bits may be transmitted according to a PUCCH format from a group consisting of: format 1a, format 1b, format 2, and format 3. In some examples, the method may include generating CSI for the unlicensed radio frequency spectrum band, and transmitting the jointly coded acknowledgement bits may include transmitting an uplink control channel including the jointly coded acknowledgement bits and the CSI.

In a tenth set of illustrative examples, another apparatus for wireless communication is described. In one configuration, the apparatus may include means for generating acknowledgement information including a plurality of acknowledgement bits for a downlink transmission, means for performing a joint coding on the plurality of acknowledgement bits to generate jointly coded acknowledgement bits, and means for transmitting the jointly coded acknowledgement bits over an interlace of a component carrier of an unlicensed radio frequency spectrum band. In some examples, the means for performing a joint coding may perform a joint convolutional coding. Each acknowledgement bit may indicate whether a separate portion of the downlink transmission was received correctly. In some examples, the apparatus may further include means for implementing one or more aspects of the method for wireless communication described above with respect to the ninth set of illustrative examples.

In an eleventh set of illustrative examples, another apparatus for wireless communication is described. In one configuration, the apparatus may include a processor, and memory coupled to the processor. The processor may be configured to generate acknowledgement information including a plurality of acknowledgement bits for a downlink transmission, perform a joint coding on the plurality of acknowledgement bits to generate jointly coded acknowledgement bits, and transmit the jointly coded acknowledgement bits over an interlace of a component carrier of an unlicensed radio frequency spectrum band. In some examples, the joint coding may be a joint convolutional coding. Each acknowledgement bit may indicate whether a separate portion of the downlink transmission was received correctly. In some examples, the processor may also be configured to implement one or more aspects of the method for wireless communication described above with respect to the ninth set of illustrative examples.

In a twelfth set of illustrative examples, another non-transitory computer-readable medium for storing instructions executable by a processor is described. In one configuration, the non-transitory computer-readable medium may include instructions to generate acknowledgement information including a plurality of acknowledgement bits for a downlink transmission, instructions to perform a joint coding on the plurality of acknowledgement bits to generate jointly coded acknowledgement bits, and instructions to transmit the jointly coded acknowledgement bits over an interlace of a component carrier of an unlicensed radio frequency spectrum band. In some examples, the joint coding may be a joint convolutional coding. Each acknowledgement bit may indicate whether a separate portion of the downlink transmission was received correctly. In some examples, the non-transitory computer-readable medium may also include instructions to implement one or more aspects of the method for wireless communication described above with respect to the ninth set of illustrative examples.

In a thirteenth set of illustrative examples, another method for wireless communication is described. In one configuration, the method may include generating uplink control information at a wireless device, and transmitting the uplink control information over an uplink control channel of an unlicensed radio frequency spectrum band. Resources of the uplink control channel may be divided into a plurality of discrete dimensions and the uplink control information of the wireless device may be transmitted over a number of the discrete dimensions allocated to the uplink control information of the wireless device.

In some examples, the method may include receiving a scheduling message from a base station. The scheduling message may indicate the number of the discrete dimensions allocated to the uplink control information of the wireless device. In some examples, the number of the discrete dimensions allocated to the uplink control information of the wireless device may be based on a size of the uplink control information of the wireless device. In some examples of the method, the uplink control information of the wireless device may be transmitted over each of the plurality of discrete dimensions of the uplink control channel.

In some examples of the method, the resources of the uplink control channel may include an interlace of a component carrier of the unlicensed radio frequency spectrum band. The interlace may include a plurality of non-contiguous concurrent resource blocks in the unlicensed radio frequency spectrum band. In some examples, at least one of the number of the discrete dimensions allocated to the uplink control information of the wireless device may span multiple ones of the resource blocks of the interlace. In some examples, the resource blocks may include different ones of the discrete dimensions. In some examples, the plurality of non-contiguous concurrent resource blocks may be spaced in frequency according to a uniform spreading pattern. In some examples, the uplink control information may be transmitted according to a PUCCH format from a group consisting of: format 1a, format 1b, format 2, and format 3.

In a fourteenth set of illustrative examples, another apparatus for wireless communication is described. In one configuration, the apparatus may include means for generating uplink control information at a wireless device, and means for transmitting the uplink control information over an uplink control channel of an unlicensed radio frequency spectrum band. Resources of the uplink control channel may be divided into a plurality of discrete dimensions and the uplink control information of the wireless device may be transmitted over a number of the discrete dimensions allocated to the uplink control information of the wireless device. In some examples, the apparatus may further include means for implementing one or more aspects of the method for wireless communication described above with respect to the thirteenth set of illustrative examples.

In a fifteenth set of illustrative examples, another apparatus for wireless communication is described. In one configuration, the apparatus may include a processor, and memory coupled to the processor. The processor may be configured to generate uplink control information at a wireless device, and transmit the uplink control information over an uplink control channel of an unlicensed radio frequency spectrum band. Resources of the uplink control channel may be divided into a plurality of discrete dimensions and the uplink control information of the wireless device may be transmitted over a number of the discrete dimensions allocated to the uplink control information of the wireless device. In some examples, the processor may also be configured to implement one or more aspects of the method for wireless communication described above with respect to the thirteenth set of illustrative examples.

In a sixteenth set of illustrative examples, another non-transitory computer-readable medium for storing instructions executable by a processor is described. In one configuration, the non-transitory computer-readable medium may include instructions to generate uplink control information at a wireless device, and instructions to transmit the uplink control information over an uplink control channel of an unlicensed radio frequency spectrum band. Resources of the uplink control channel may be divided into a plurality of discrete dimensions and the uplink control information of the wireless device may be transmitted over a number of the discrete dimensions allocated to the uplink control information of the wireless device. In some examples, the non-transitory computer-readable medium may also include instructions to implement one or more aspects of the method for wireless communication described above with respect to the thirteenth set of illustrative examples.

In a seventeenth set of illustrative examples, another method for wireless communication is described. In one configuration, the method may include modulating a reference signal at a wireless device based on a determination that the wireless device has uplink data to transmit, and transmitting the modulated reference signal over an unlicensed radio frequency spectrum band. The modulated reference signal may indicate a scheduling request for a base station.

In some examples of the method, transmitting the modulated reference signal may include transmitting the modulated reference signal over an interlace of a component carrier of the unlicensed radio frequency spectrum band. The interlace of the component carrier may include a plurality of non-contiguous concurrent resource blocks. In some examples, the interlace may span a majority of a bandwidth of the component carrier of the unlicensed radio frequency spectrum band.

In some examples of the method, transmitting the modulated reference signal may include transmitting the modulated reference signal during a single symbol. In some examples of the method, the modulated reference signal may be transmitted concurrently with a sounding reference signal. In some examples of the method, modulating the reference signal may include modifying a polarity of the reference signal to indicate the scheduling request.

In an eighteenth set of illustrative examples, another apparatus for wireless communication is described. In one configuration, the apparatus may include means for modulating a reference signal at a wireless device based on a determination that the wireless device has uplink data to transmit, and means for transmitting the modulated reference signal over an unlicensed radio frequency spectrum band. The modulated reference signal may indicate a scheduling request for a base station. In some examples, the apparatus may further include means for implementing one or more aspects of the method for wireless communication described above with respect to the seventeenth set of illustrative examples.

In a nineteenth set of illustrative examples, another apparatus for wireless communication is described. In one configuration, the apparatus may include a processor, and memory coupled to the processor. The processor may be configured to modulate a reference signal at a wireless device based on a determination that the wireless device has uplink data to transmit, and transmit the modulated reference signal over an unlicensed radio frequency spectrum band. The modulated reference signal may indicate a scheduling request for a base station. In some examples, the processor may also be configured to implement one or more aspects of the method for wireless communication described above with respect to the seventeenth set of illustrative examples.

In a twentieth set of illustrative examples, another non-transitory computer-readable medium for storing instructions executable by a processor is described. In one configuration, the non-transitory computer-readable medium may include instructions to modulate a reference signal at a wireless device based on a determination that the wireless device has uplink data to transmit, and instructions to transmit the modulated reference signal over an unlicensed radio frequency spectrum band. The modulated reference signal may indicate a scheduling request for a base station. In some examples, the non-transitory computer-readable medium may also include instructions to implement one or more aspects of the method for wireless communication described above with respect to the seventeenth set of illustrative examples.

In a twenty-first set of illustrative examples, another method for wireless communication is described. In one configuration, the method may include generating a sounding reference signal (SRS) at a wireless device, and transmitting the SRS over an interlace of a component carrier of an unlicensed radio frequency spectrum band. The interlace may include a plurality of non-contiguous concurrent resource blocks in the unlicensed radio frequency spectrum band.

In some examples of the method, transmitting the SRS may include transmitting the SRS during a single symbol. In some examples of the method, the interlace may span a majority of a bandwidth of the component carrier of the unlicensed radio frequency spectrum band. In some examples of the method, the SRS may be transmitted concurrently with a modulated reference signal.

In a twenty-second set of illustrative examples, another apparatus for wireless communication is described. In one configuration, the apparatus may include means for generating a SRS at a wireless device, and means for transmitting the SRS over an interlace of a component carrier of an unlicensed radio frequency spectrum band. The interlace may include a plurality of non-contiguous concurrent resource blocks in the unlicensed radio frequency spectrum band. In some examples, the apparatus may further include means for implementing one or more aspects of the method for wireless communication described above with respect to the twenty-first set of illustrative examples.

In a twenty-third set of illustrative examples, another apparatus for wireless communication is described. In one configuration, the apparatus may include a processor, and memory coupled to the processor. The processor may be configured to generate a SRS at a wireless device, and transmit the SRS over an interlace of a component carrier of an unlicensed radio frequency spectrum band. The interlace may include a plurality of non-contiguous concurrent resource blocks in the unlicensed radio frequency spectrum band. In some examples, the processor may also be configured to implement one or more aspects of the method for wireless communication described above with respect to the twenty-first set of illustrative examples.

In a twenty-fourth set of illustrative examples, another non-transitory computer-readable medium for storing instructions executable by a processor is described. In one configuration, the non-transitory computer-readable medium may include instructions to generate a SRS at a wireless device, and instructions to transmit the SRS over an interlace of a component carrier of an unlicensed radio frequency spectrum band. The interlace may include a plurality of non-contiguous concurrent resource blocks in the unlicensed radio frequency spectrum band. In some examples, the non-transitory computer-readable medium may also include instructions to implement one or more aspects of the method for wireless communication described above with respect to the twenty-first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present teachings may be realized by reference to the following drawings. In the appended figures, similar components or features may have the same reference label. Further, various components of the same type may be distinguished by following the reference label by a dash and a second label that distinguishes among the similar components. If the first reference label is used in the specification, the description is applicable to any one of the similar components having the same first reference label irrespective of the second reference label.

DETAILED DESCRIPTION

Figure 1:
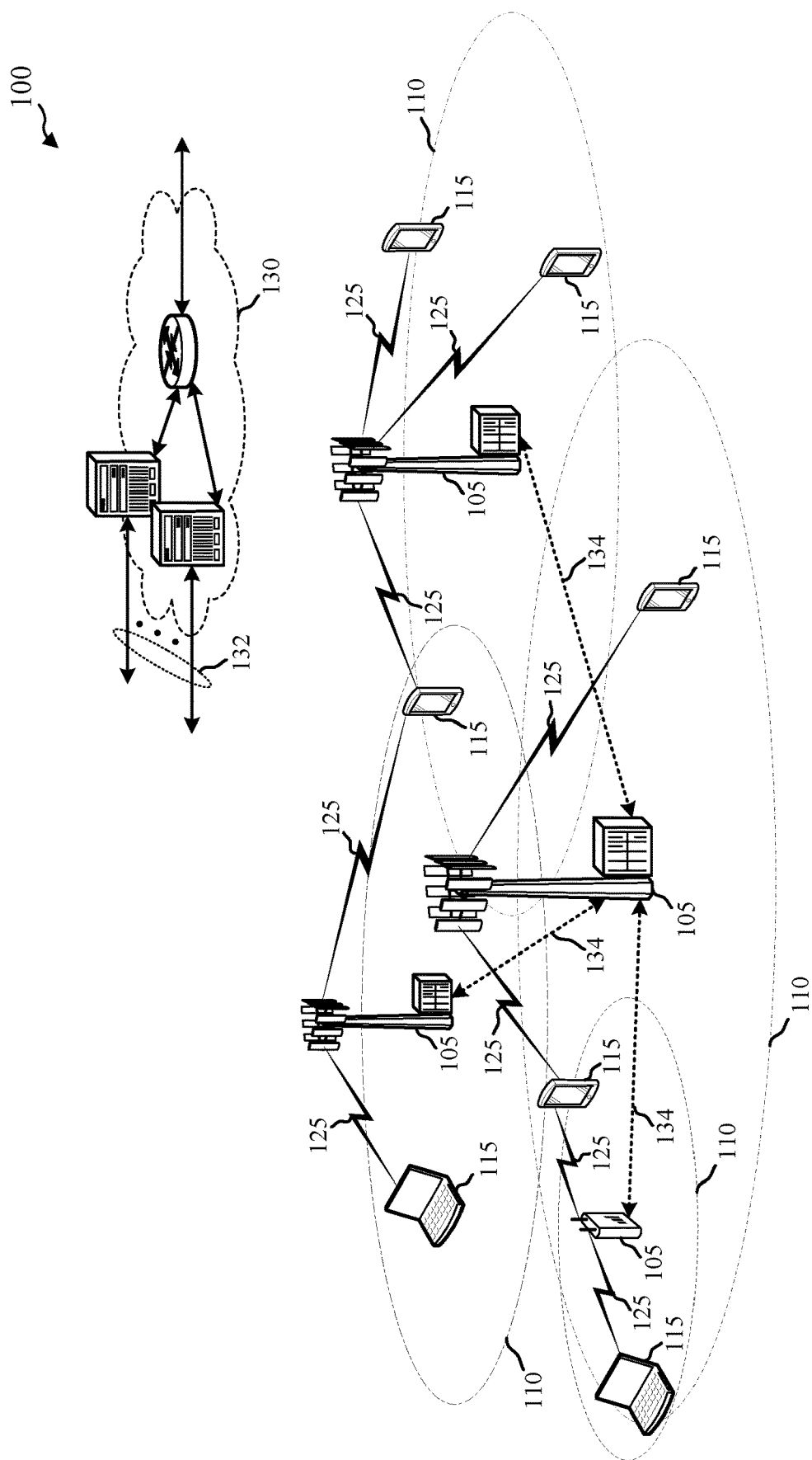
FIG. 1 illustrates an example of a wireless communication system, in accordance with various aspects of the disclosure.

Techniques are described in which an unlicensed radio frequency spectrum band is used for at least a portion of communications over a wireless communication system. In some examples, the unlicensed radio frequency spectrum band may be used for Long Term Evolution (LTE) communications and/or LTE-Advanced (LTE-A) communications. The unlicensed radio frequency spectrum band may be used in combination with, or independent from, a licensed radio frequency spectrum band. In some examples, the unlicensed radio frequency spectrum band may be a radio frequency spectrum band for which a device may need to contend for access because the radio frequency spectrum band is available, at least in part, for unlicensed use, such as Wi-Fi use.

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) and/or a coordinated set of base stations defining a cellular network, such as an LTE/LTE-A network) with opportunities for enhanced data transmission capacity. As noted above, before communicating over the unlicensed radio frequency spectrum band, devices may perform a listen-before-talk (LBT) procedure to gain access to the medium. Such an LBT procedure may include performing a clear channel assessment (CCA) procedure (or extended CCA procedure) to determine whether a channel of the unlicensed radio frequency spectrum band is available. When it is determined that a channel is not available, a CCA procedure (or extended CCA procedure) may be performed for the channel again at a later time.

The use of an unlicensed radio frequency spectrum band for wireless communication may present scenarios in which an uplink control channel is transmitted over the unlicensed radio frequency spectrum band. The uplink control channel may include uplink control information such as acknowledgements and/or non-acknowledgements of downlink transmissions, and/or channel state information for the unlicensed radio frequency spectrum band. When a plurality of UEs may have uplink control information to transmit at the same time, management of the available resources for transmitting uplink control channels from the UEs to a base station may be desirable, so that all of the UEs may transmit uplink control information at the same time and/or some or all of the UEs may use a greater or lesser share of the resources.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro and/or small cell base stations). There may be overlapping geographic coverage areas 110 for different technologies.

In some examples, the wireless communication system 100 may include an LTE/LTE-A network. In LTE/LTE-A networks, the term enhanced or evolved Node B (eNB) may be generally used to describe the base stations 105, while the term UE may be generally used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, and/or uplink (UL) transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) and/or enhanced or evolved PUCCH (ePUCCH)). The uplink control information may include, for example, acknowledgements and/or non-acknowledgements of downlink transmissions, and/or channel state information. UL transmissions may also include transmissions of data, which data may be transmitted over a physical uplink shared channel (PUSCH) and/or enhanced or evolved PUSCH (ePUSCH). UL transmissions may also include the transmission of a sounding reference signal (SRS), a physical random access channel (PRACH) and/or enhanced or evolved PRACH (ePRACH) (e.g., in a dual connectivity mode and/or the standalone mode described with reference to FIG. 2), and/or a scheduling request (SR) and/or enhanced or evolved SR (eSR) (e.g., in the standalone mode described with reference to FIG. 2). In some examples, an eSR may have a one-bit payload. When channel mapping is employed, an eSR may span one symbol across the entire bandwidth of a component carrier, be transmitted in the same symbol as an eSRS, and be transmitted using a resource block interleaved cyclic-shifted Zadoff-Chu (ZC) sequence. In some examples, an eSRS may have no payload. When channel mapping is employed, an eSRS may span one symbol across the entire bandwidth of a component carrier, be transmitted in the same symbol as an eSR, and be transmitted using a resource block interleaved cyclic-shifted ZC sequence.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD)

operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some embodiments of the wireless communication system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
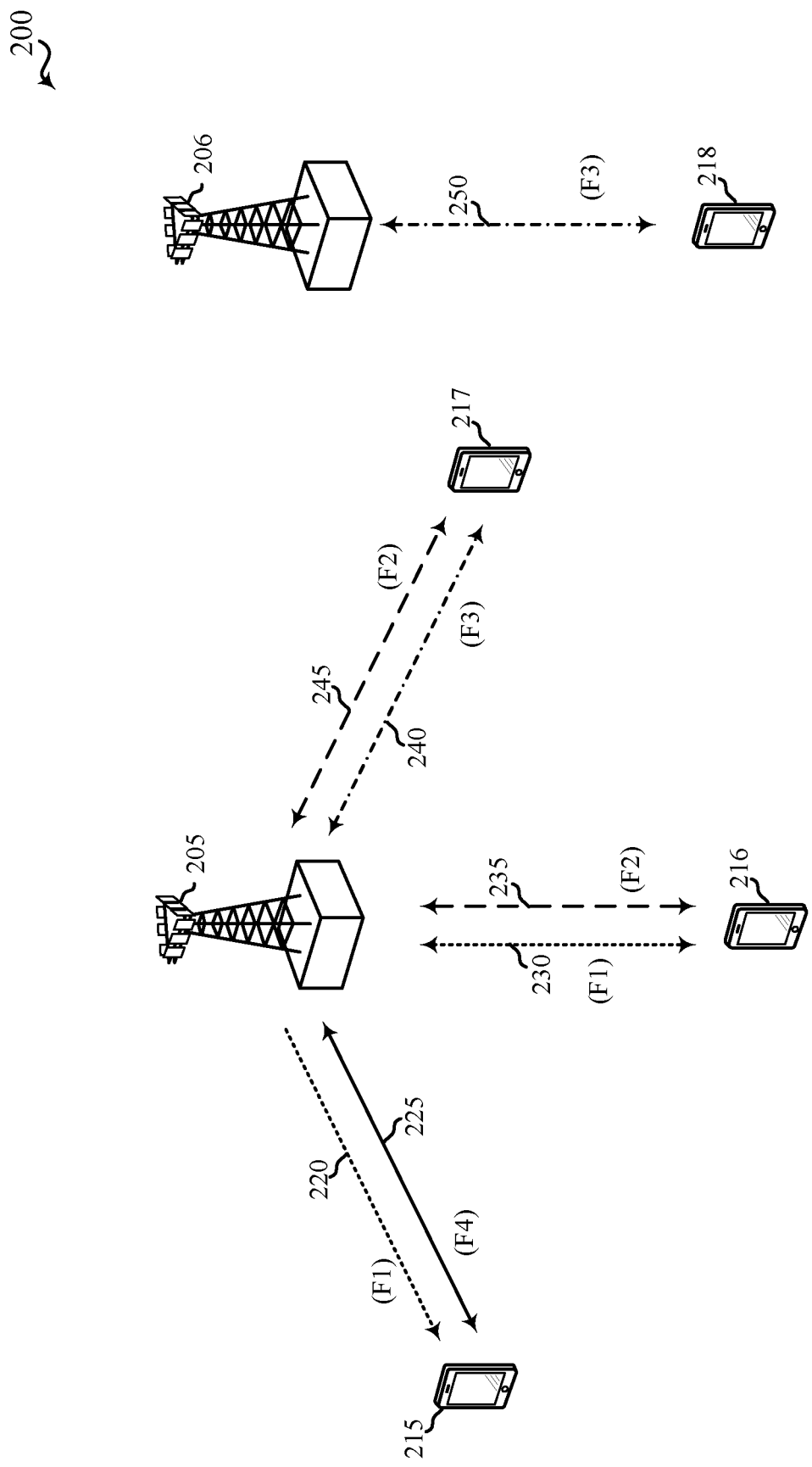
FIG. 2 shows a wireless communication system in which LTE/LTE-A may be deployed under different scenarios using an unlicensed radio frequency spectrum band, in accordance with various aspects of the present disclosure.

FIG. 2 shows a wireless communication system 200 in which LTE/LTE-A may be deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 206 may be examples of aspects of one or more of the base stations 105 described with reference to FIG. 1, while a first UE 215, a second UE 216, a third UE 217, and a fourth UE 218 may be examples of aspects of one or more of the UEs 115 described with reference to FIG. 1.

In the example of a supplemental downlink mode in the wireless communication system 200, the first base station 205 may transmit orthogonal frequency-division multiple access (OFDMA) waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive single-carrier frequency-division multiple access (SC-FDMA) waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic and/or signaling congestion.

In one example of a carrier aggregation mode in the wireless communication system 200, the first base station 205 may transmit OFDMA waveforms to the second UE 216 using a second bidirectional link 230 and may receive OFDMA waveforms, SC-FDMA waveforms, and/or resource block interleaved FDMA waveforms from the second UE 216 using the second bidirectional link 230. The second bidirectional link 230 may be associated with the frequency F1 in the unlicensed radio frequency spectrum band. The first base station 205 may also transmit OFDMA waveforms to the second UE 216 using a third bidirectional link 235 and may receive SC-FDMA waveforms from the second UE 216 using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic and/or signaling congestion.

In another example of a carrier aggregation mode in the wireless communication system 200, the first base station 205 may transmit OFDMA waveforms to the third UE 217 using a fourth bidirectional link 240 and may receive OFDMA waveforms, SC-FDMA waveforms, and/or resource block interleaved waveforms from the third UE 217 using the fourth bidirectional link 240. The fourth bidirectional link 240 may be associated with a frequency F3 in the unlicensed radio frequency spectrum band. The first base station 205 may also transmit OFDMA waveforms to the third UE 217 using a fifth bidirectional link 245 and may receive SC-FDMA waveforms from the third UE 217 using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 206 may transmit OFDMA waveforms to the fourth UE 218 using a bidirectional link 250 and may receive OFDMA waveforms, SC-FDMA waveforms, and/or resource block interleaved FDMA waveforms from the fourth UE 218 using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, and/or 206 described with reference to FIGS. 1 and/or 2, and/or one of the UEs 115, 215, 216, 217, and/or 218 described with reference to FIGS. 1 and/or 2, may use a gating interval to gain access to a channel of an unlicensed radio frequency spectrum band (e.g., to a physical channel of the unlicensed radio frequency spectrum band). The gating interval may define the application of a contention-based protocol, such as a listen-before-talk (LBT) protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure, such as a clear channel assessment (CCA) procedure. The outcome of the CCA procedure may indicate to the transmitting device whether a channel of an unlicensed radio frequency spectrum band is available or in use for the gating interval (also referred to as an LBT radio frame or a CCA frame). When a CCA procedure indicates that the channel is available (e.g., "clear" for use) for a corresponding LBT radio frame, the transmitting apparatus may reserve and/or use the channel of the unlicensed radio frequency spectrum band during part or all of the LBT radio frame. When the CCA procedure indicates that the channel is not available (e.g., that the channel is in use or reserved by another apparatus), the transmitting apparatus may be prevented from using the channel during the LBT radio frame.

In some examples, it may be useful for a transmitting apparatus to generate a gating interval for an unlicensed radio frequency spectrum band on a periodic basis and synchronize at least one boundary of the gating interval with at least one boundary of a periodic interval. For example, it may be useful to generate a periodic gating interval for a cellular downlink in a shared radio frequency spectrum band, and to synchronize at least one boundary of the periodic gating interval with at least one boundary of a periodic interval (e.g., a periodic LTE/LTE-A radio interval) associated with the cellular downlink.

Figure 3:
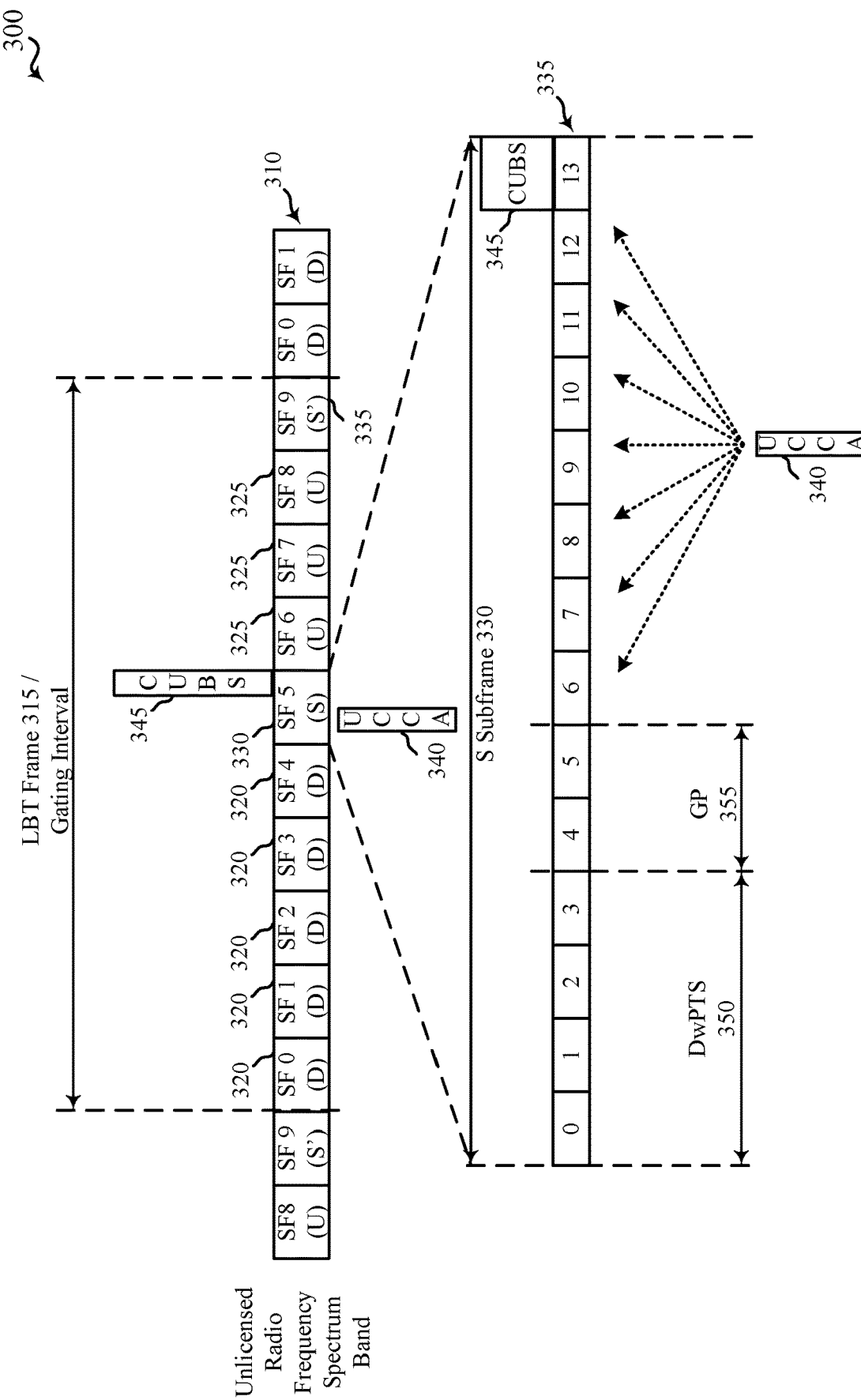
FIG. 3 shows an example of a wireless communication over an unlicensed radio frequency spectrum band, in accordance with various aspects of the present disclosure.

FIG. 3 shows an example 300 of a wireless communication 310 over an unlicensed radio frequency spectrum band, in accordance with various aspects of the present disclosure. An LBT radio frame 315, which may correspond to a gating interval, may have a duration of ten milliseconds and include a number of downlink subframes 320, a number of uplink subframes 325, and two types of special subframes (e.g., an S subframe 330 and an S' subframe 335). The S subframe 330 may provide a transition between downlink subframes 320 and uplink subframes 325, while the S' subframe 335 may provide a transition between uplink subframes 325 and downlink subframes 320. During the S subframe 330, an uplink CCA (UCCA) procedure 340 may be performed by one or more UEs, such as one or more of the UEs 115, 215, 216, 217, and/or 218 described above with reference to FIGS. 1 and/or 2, to reserve, for a period of time, the channel over which the wireless communication 310 occurs. Following a successful UCCA procedure 340 by a UE, the UE may transmit a channel usage beacon signal (CUBS) 345 to provide an indication to other UEs and/or apparatuses (e.g., base stations, Wi-Fi access points, etc.) that the UE has reserved the channel. In some examples, a CUBS 345 may be transmitted using a plurality of interleaved resource blocks, as described in more detail with reference to FIG. 6. Transmitting a CUBS 345 in this manner may enable the CUBS 345 to occupy at least a certain percentage of the available frequency bandwidth in the unlicensed radio frequency spectrum band and satisfy one or more regulatory requirements (e.g., a requirement that the CUBS 345 occupy at least 80% of the available frequency bandwidth). The CUBS 345 may in some examples take a form similar to that of an LTE/LTE-A cell-specific reference signal (CRS) and/or channel state information reference signal (CSI-RS). When the UCCA procedure 340 fails, the CUBS 345 is not transmitted.

The S subframe 330 may include 14 OFDM symbols, numbered 0 through 13 in FIG. 3. A first portion of the S subframe 330, symbols 0 through 3 in this example, may be used as a downlink pilot time slot (DwPTS) 350, and a second portion of the S subframe 330 may be used as a guard period (GP) 355. A third portion of the S subframe 330 may be used for a UCCA procedure 340. In the example 300, the S subframe 330 includes seven UCCA slots, included in symbols 6 through 12. Use of the UCCA slots by different UEs may be coordinated to provide more efficient system operation. In some examples, in order to determine which of the seven possible UCCA slots to use to perform a UCCA procedure 340, a UE may evaluate a mapping-function of the form:

$$F_U(\text{GroupID}, t) \in \{1, 2, 3, 4, 5, 6, 7\}$$

where GroupID is a "deployment group-id" assigned to the UE, and t is the LBT radio frame number corresponding to a frame for which a UCCA procedure 340 is performed.

The mapping function for a UCCA procedure 340 may be constructed based on different criteria, depending on whether the mapping function will have an orthogonalization or a non-orthogonalization property. In examples with orthogonal LBT access, the mapping function may have an orthogonalization property according to:

$$F_{D/U}(x, t) \neq F_{D/U}(y, t)$$

$$\text{GroupID } x, y \in \{1, 2, 3, 4, 5, 6, 7\}$$

for all time t, whenever x≠y represent different group-ids. In this case, base stations and/or UEs with different group-ids may perform CCA procedures (e.g., UCCA procedures 340) during non-overlapping CCA slots. In the absence of interference, the UE with the group-id which maps to an earlier CCA slot may secure the channel for a period of time. According to various deployments, the mapping-function is fair, in the sense that across different time indices t, the mapping $\{F_{D/U}(x, t), t=1, 2, 3, \ldots\}$ varies such that different group-ids have an equal chance of mapping to an earlier CCA slot (and hence secure the channel in the absence of other interference) over a suitably long interval of time.

All base stations and UEs deployed by the same network operator/service-provider may be assigned the same group-id, so that they do not preempt each other in the contention process. This allows full frequency reuse among base stations and UEs of the same deployment, leading to enhanced system throughput. Base stations and/or UEs of different deployments may be assigned different group-ids, so that with orthogonal CCA slot mapping, access to the channel is mutually exclusive.

In examples with non-orthogonal, or overlapping, CCA slot access, the mapping function may allow more than seven group ids. In some situations, for example, it may be useful to support more than seven deployment group-ids, in which case it is not possible to maintain the orthogonality property of CCA slot mapping functions. In such cases, it may be desirable to reduce the frequency of collision between any two group-ids. In some examples, non-orthogonal CCA slot mapping sequences may also be used to provide fair channel access among deployments without tight coordination on LBT opportunities. One example of a non-orthogonal CCA slot mapping sequence is given by:

$$F_{D/U}(x,t)=R_{1,7}(x,t)$$

$$\text{GroupID } x \in \{1, 2, \ldots 2^{16}\}$$

where $R_{1,7}(x,t)$ is a pseudo-random number generator between 1 and 7 chosen independently for GroupID x. In this case, there could be potential collisions between base stations and/or UEs of different GroupID's in the same LBT radio frame t.

Thus, CCA slots may be selected according to the noted mapping functions and used for a UCCA procedure 340.

In FIG. 3, the duration of each UCCA procedure 340 is fixed. However, in some examples, the duration of a UCCA procedure may vary.

Figure 4A:
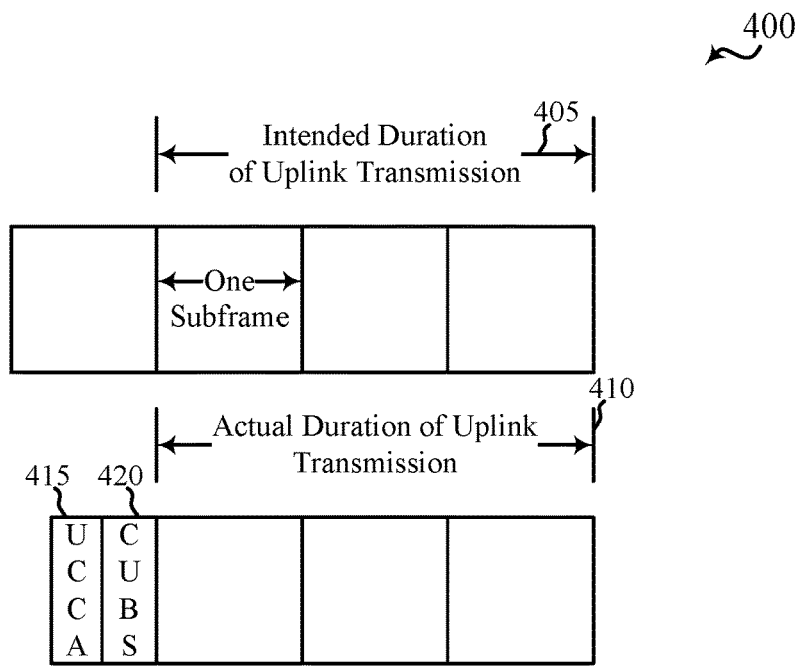
FIG. 4A shows an example of a UCCA procedure performed by a UE contending for access to an unlicensed radio frequency spectrum band, in accordance with various aspects of the present disclosure.

FIG. 4A shows an example 400 of a UCCA procedure 415 performed by a UE contending for access to an unlicensed radio frequency spectrum band, in accordance with various aspects of the present disclosure. The UCCA procedure 415 may have a fixed duration and be performed similarly to the UCCA procedure 340 described with reference to FIG. 3. In some examples, the UCCA procedure 415 may be performed in accordance with an LBT-frame based equipment (LBT-FBE) protocol (e.g., the LBT-FBE protocol described by EN 301 893). Following the UCCA procedure 415, a CUBS 420 may be transmitted, followed by an uplink transmission. By way of example, the uplink transmission may have an intended duration 405 of three subframes and an actual duration 410 of three subframes. In some examples, the uplink transmission may include a transmission of an uplink control channel, such as a physical uplink control channel (PUCCH) and/or enhanced or evolved PUCCH (ePUCCH).

Figure 4B:
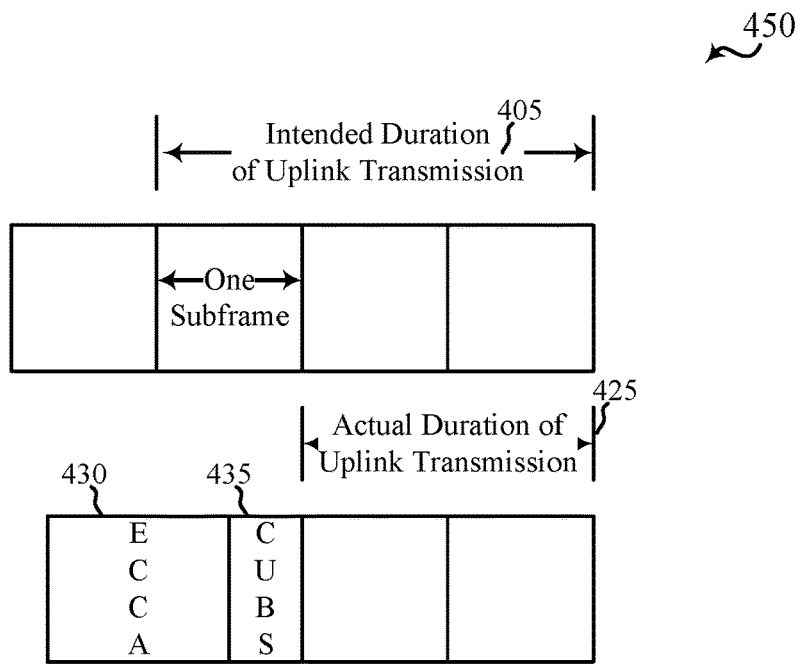
FIG. 4B shows an example of an extended CCA (ECCA) procedure performed by a UE contending for access to an unlicensed radio frequency spectrum band, in accordance with various aspects of the present disclosure.

FIG. 4B shows an example 450 of an extended CCA (ECCA) procedure 430 performed by a UE contending for access to an unlicensed radio frequency spectrum band, in accordance with various aspects of the present disclosure. The ECCA procedure 430 may have a variable duration and be performed as an alternative to the UCCA procedure 340 and/or 415 described with reference to FIGS. 3 and/or 4. In some examples, the ECCA procedure 430 may be performed in accordance with an LBT-load based equipment (LBT-LBE) protocol (e.g., the LBT-LBE protocol described by EN 301 893). The ECCA procedure 430 may provide a greater likelihood of winning contention to access the unlicensed radio frequency spectrum band, but at a potential cost of a shorter uplink transmission. Following the ECCA procedure 430, a CUBS 435 may be transmitted, followed by an uplink transmission. By way of example, the uplink transmission may have an intended duration 405 of three subframes and an actual duration 425 of two subframes. In some examples, the uplink transmission may include a transmission of an uplink control channel, such as a PUCCH and/or ePUCCH.

Figure 5:
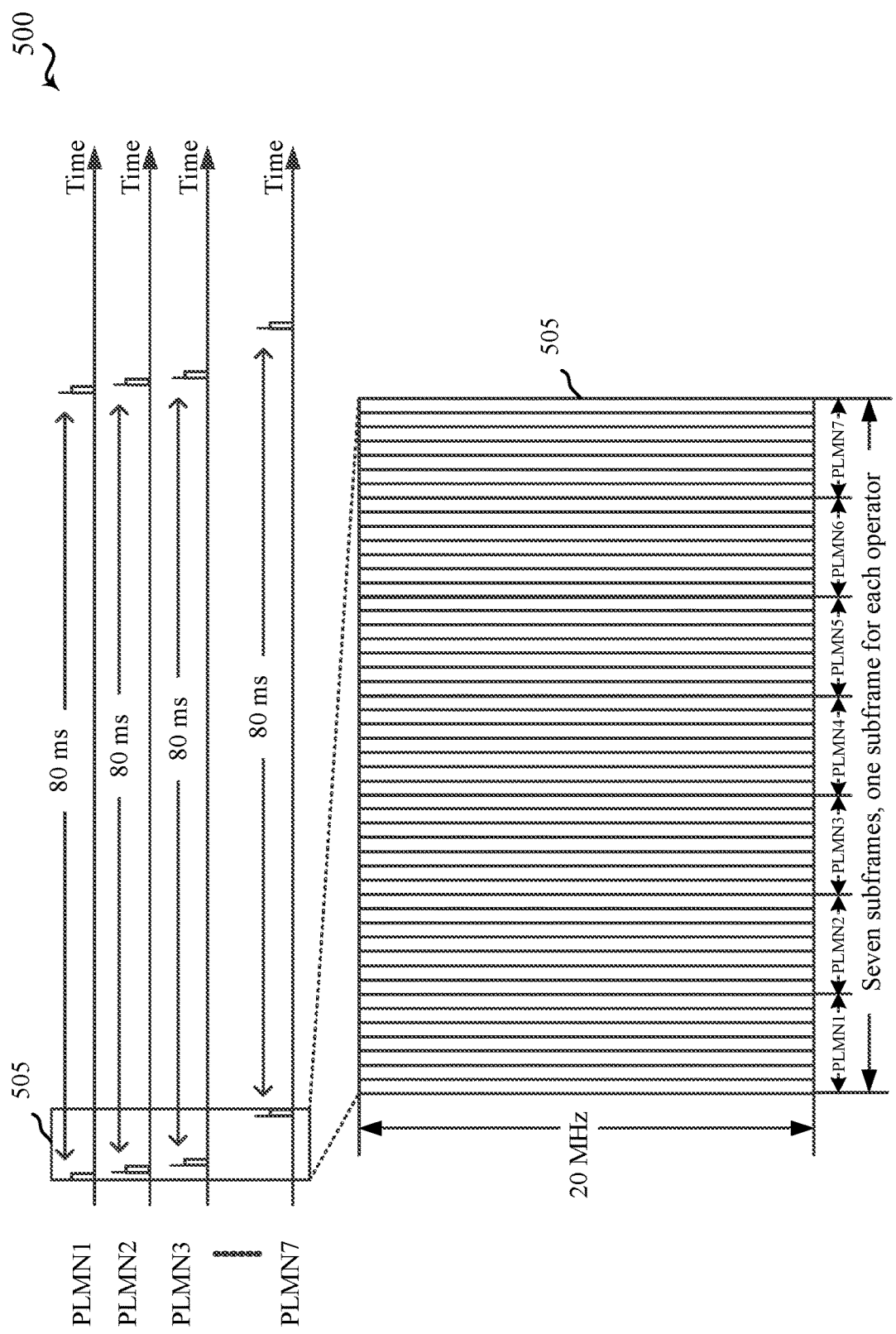
FIG. 5 shows an example of resource allocations for CCA-Exempt Transmissions (CETs) of synchronous operators in an unlicensed radio frequency spectrum band, in accordance with various aspects of the present disclosure.

FIG. 5 shows an example 500 of resource allocations for CCA-Exempt Transmissions (CETs) of synchronous operators in an unlicensed radio frequency spectrum band, in accordance with various aspects of the present disclosure. A CET may be made without a need to perform a CCA (e.g., a DCCA or an uplink CCA (UCCA)) to first gain access to the unlicensed radio frequency spectrum band. Instead, an operator may be exempted from performing a CCA for the purpose of transmitting a CET.

As shown, an allocation of resources 505 for CETs may be made, for example, once every eighty milliseconds (80 ms) or once every CET period, where the CET period may have a configurable periodicity. Each of a number of operators (e.g., different PLMNs) in the unlicensed radio frequency spectrum band may be provided a separate subframe (shown) or subframes (not shown) for transmitting CETs. By way of example, FIG. 5 shows adjacent CET subframes for seven different operators (e.g., operators PLMN1, PLMN2, PLMN7). Such a CET transmission framework may be applicable to a downlink and/or uplink between a base station and a UE. In some examples, a CET may be used by a wireless device (e.g., a UE) for transmitting uplink control information.

Figure 6:
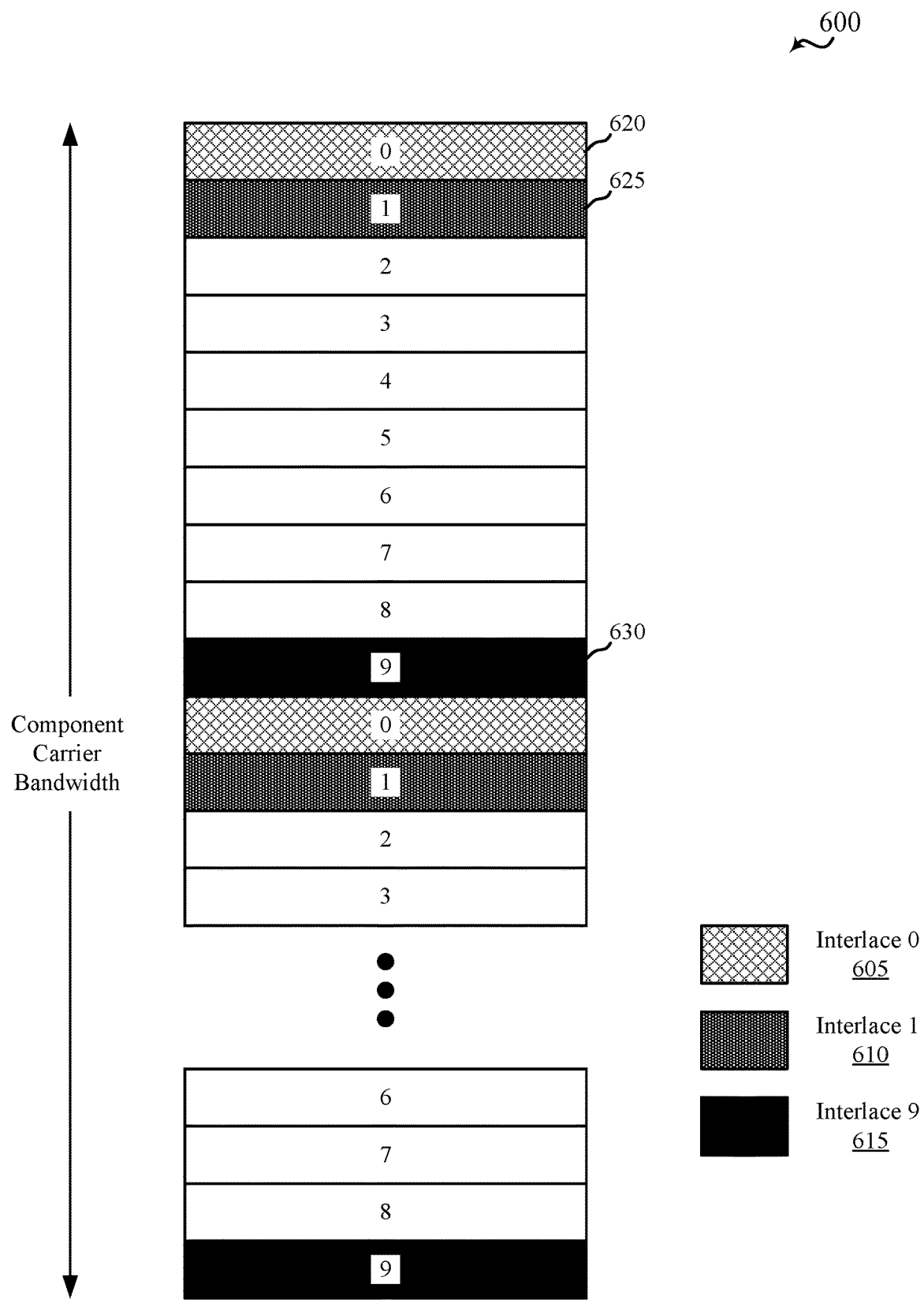
FIG. 6 shows a diagram of a component carrier (CC) bandwidth (BW) in an unlicensed radio frequency spectrum band, in accordance with various aspects of the present disclosure.

FIG. 6 shows a diagram 600 of a component carrier (CC) bandwidth (BW) in an unlicensed radio frequency spectrum band, in accordance with various aspects of the present disclosure. In some examples, the CC BW may be divided into a plurality of interlaces 605, 610, and/or 615 of resource blocks 620, 625, and/or 630. Each of the interlaces 605, 610, and/or 615 may include a plurality of non-contiguous concurrent resource blocks, which resource blocks may be spaced in frequency according to a uniform spreading pattern or a non-uniform spreading pattern. By way of example, FIG. 6 shows a plurality of interlaces (e.g., ten interlaces), with each interlace having resource blocks (e.g., ten resource blocks) spaced in frequency according to a uniform spreading pattern. In some examples, each of the interlaces 605, 610, and/or 615 may span a majority of the CC BW.

In some examples, each of a number of wireless devices (e.g., one or more wireless devices) may use each of the interlaces 605, 610, and/or 615 of resource blocks to transmit an uplink control channel (e.g., an enhanced or evolved PUCCH (ePUCCH)) over the unlicensed radio frequency spectrum band. Each of the uplink control channels may include, for example, hybrid automatic repeat request (HARQ) acknowledgement information (e.g., HARQ acknowledgements (ACKs) and/or non-acknowledgements (NAKs)) for a downlink transmission received from a base station at a wireless device over the unlicensed radio frequency spectrum band and/or channel state information (CSI) for the unlicensed radio frequency spectrum band. In some examples, the uplink control channel may be transmitted using a single-carrier frequency-domain multiple access (SC-FDMA) format. In some examples, the wireless devices may be examples of the UEs 115, 215, 216, 217, and/or 218 described with reference to FIGS. 1 and/or 2.

Each of a number of uplink control channels transmitted using the component carrier bandwidth shown in FIG. 6 may utilize resource in a number of discrete dimensions. The manner in which the resources are allocated and/or selected for use by the number of uplink control channels may determine a wireless device capacity and payload capacity of the component carrier bandwidth.

Figure 7:
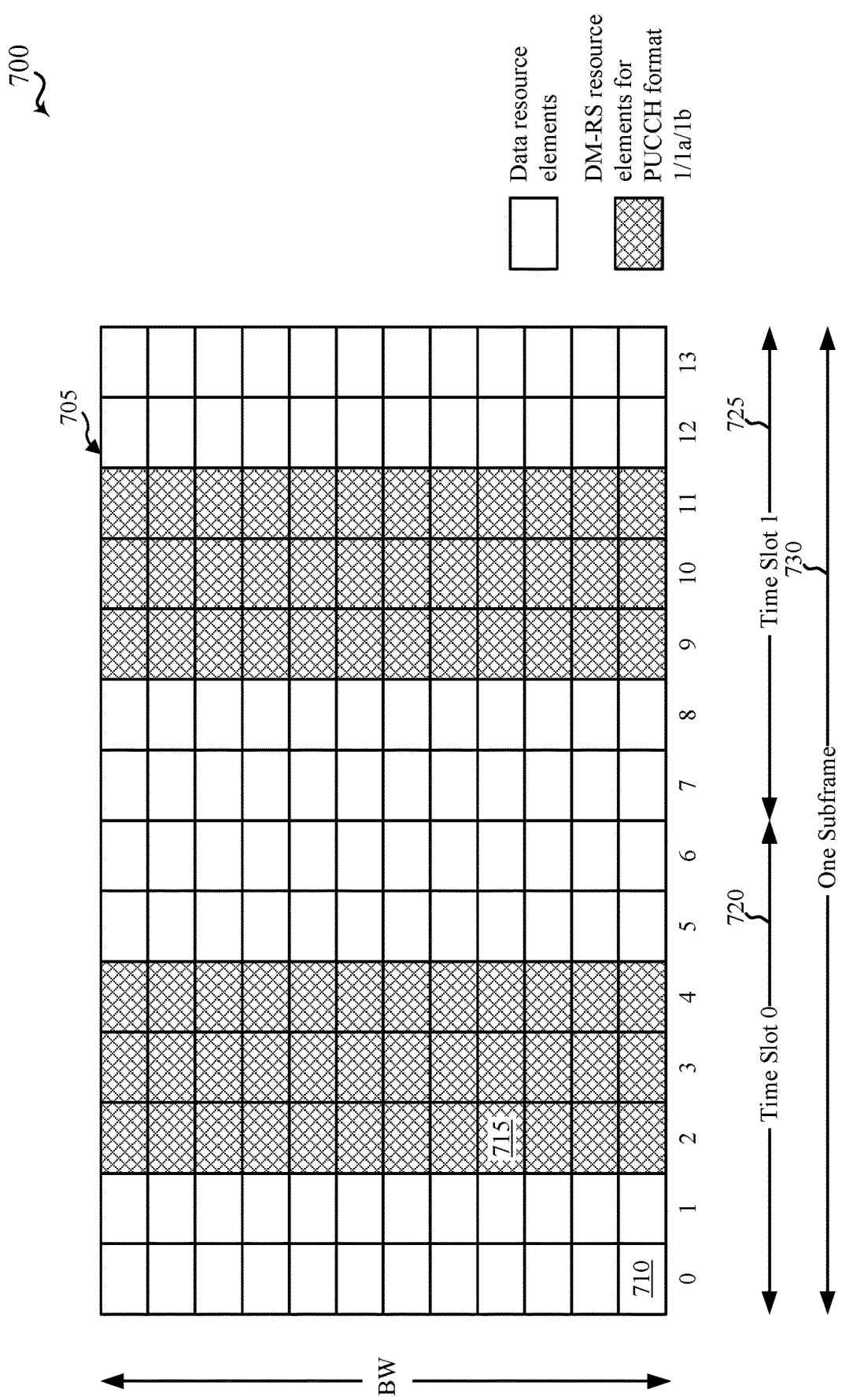
FIG. 7 shows a diagram of a resource block having a PUCCH format from a group consisting of format 1, format 1a, and format 1b, in accordance with various aspects of the present disclosure.

FIG. 7 shows a diagram 700 of a resource block 705 having a PUCCH format from a group consisting of format 1, format 1a, and format 1b, in accordance with various aspects of the present disclosure. In some examples, the resource block 705 may be an example of one or more of the resource blocks described with reference to FIG. 6 (e.g., one or more of the resource blocks 620, 625, and/or 630).

By way of example, the resource block 705 may include a plurality of resource elements (including, for example, resource element 710 and/or 715) extending in time and/or frequency dimensions. In some examples, the resource block 705 may include resource elements spanning fourteen OFDM symbols (numbered 0 through 13), two slots 720 and 725, one subframe 730, and twelve frequency subcarriers spanning a bandwidth (BW). In some examples, the duration of the subframe 730 may be one millisecond.

According to LTE/LTE-A standards, a resource block 705 having a PUCCH format from a group consisting of format 1, format 1a, and format 1b may include information multiplexed on ZC sequences. Such a resource block 705 may also include three reference symbols (e.g., three demodulation reference signals (DM-RS), including DM-RS resource elements) and four quadrature phase-shift keying (QPSK) data symbols (including data resource elements) per slot 720 and 725. The three reference symbols per slot provide time domain spreading (three Discrete Fourier Transform (DFT) sequences of length three) and frequency domain spreading (12 cyclic shifts). The four QPSK data symbols per slot also provide time domain spreading (four Hadamard sequences) and frequency domain spreading (12 cyclic shifts). The maximum number of wireless devices that may use the resource block 705 is the minimum of {3×12, 4×12} or 36 wireless devices. In some examples, the wireless devices may be UEs such as the UEs 115, 215, 216, 217, and/or 218 described with reference to FIGS. 1 and/or 2. The maximum payload size that may be allocated to each wireless device in one millisecond (e.g., one subframe) when the maximum number of wireless devices is using the resource block 705 is two bits.

Figure 8:
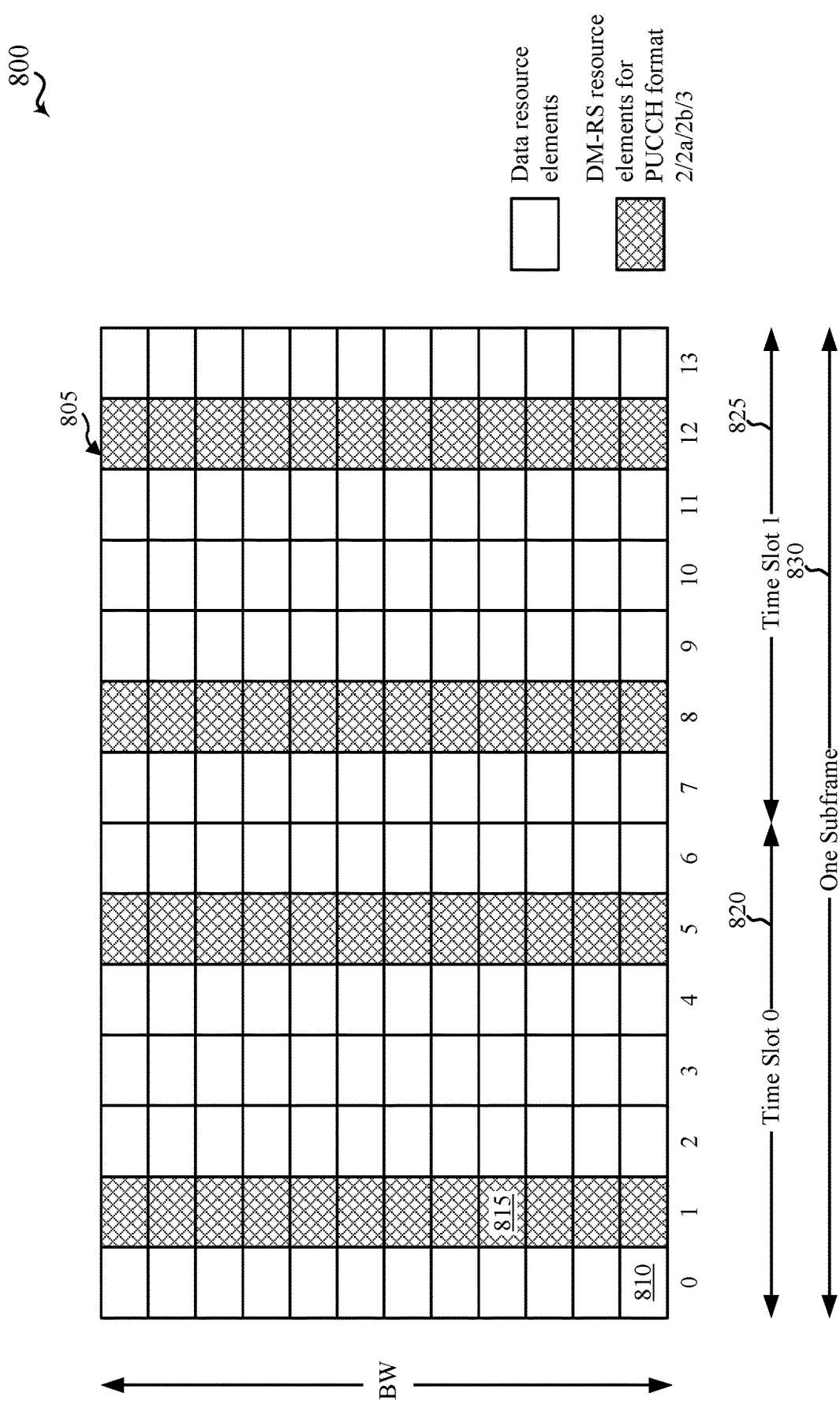
FIG. 8 shows a diagram of a resource block having a PUCCH format from a group consisting of format 2, format 2a, format 2b, and format 3, in accordance with various aspects of the present disclosure.

FIG. 8 shows a diagram 800 of a resource block 805 having a PUCCH format from a group consisting of format 2, format 2a, format 2b, and format 3, in accordance with various aspects of the present disclosure. In some examples, the resource block 805 may be an example of one or more of the resource blocks described with reference to FIG. 6 (e.g., one or more of the resource blocks 620, 625, and/or 630).

By way of example, the resource block 805 may include a plurality of resource elements (including, for example, resource element 810 and/or 815) extending in time and/or frequency dimensions. In some examples, the resource block 805 may include resource elements spanning fourteen OFDM symbols (numbered 0 through 13), two slots 820 and 825, one subframe 830, and twelve frequency subcarriers spanning a bandwidth (BW). In some examples, the duration of the subframe 830 may be one millisecond.

According to LTE/LTE-A standards, a resource block 805 having a PUCCH format from a group consisting of format 2, format 2a, and format 2b may include information multiplexed on ZC sequences. Such a resource block 805 may also include two reference symbols (e.g., two DM-RS, including DM-RS resource elements) and five QPSK data symbols (including data resource elements) per slot 820 and 825. The two reference symbols per slot provide time domain spreading (two Hadamard sequences of length two) and frequency domain spreading (12 cyclic shifts). The five QPSK data symbols per slot provide frequency domain spreading (12 cyclic shifts). When using format 2a and format 2b, data symbols may be multiplexed on the two reference symbols. The maximum number of wireless devices that may use the resource block 805 is the minimum of {2×12, 12} or 12 wireless devices. In some examples, the wireless devices may be UEs such as the UEs 115, 215, 216, 217, and/or 218 described with reference to FIGS. 1 and/or 2. The maximum payload size that may be allocated to each wireless device in one millisecond (e.g., one subframe) when the maximum number of wireless devices is using the resource block 805 is 2 time slots*2 QPSK data symbols*5 resource elements=20 bits.

Also according to LTE/LTE-A standards, a resource block 805 having a PUCCH format 3 may include information multiplexed on ZC sequences. Such a resource block 805 may also include two reference symbols (e.g., two DM-RS) and twelve QPSK data symbols per slot 820 and 825. The two reference symbols per slot provide time domain spreading (two Hadamard sequences of length two) and frequency domain spreading (12 cyclic shifts). The twelve QPSK data symbols per slot provide time domain spreading (5 sequences). The maximum number of wireless devices that may use the resource block 805 is five. In some examples, the wireless devices may be UEs such as the UEs 115, 215, 216, 217, and/or 218 described with reference to FIGS. 1 and/or 2. The maximum payload size that may be allocated to each wireless device in one millisecond (e.g., one subframe) when the maximum number of wireless devices is using the resource block 805 is 2 time slots*2 QPSK data symbols*12 resource elements=48 bits.

In some examples, an interlace of resource blocks such as one of the interlaces 605, 610, or 615 of resource blocks described with reference to FIG. 6, and/or a plurality of resource block formats such as the PUCCH formats described with reference to FIGS. 7 and/or 8, may provide a plurality of discrete dimensions to the resources available for transmitting an uplink control channel (e.g., an ePUCCH) over an unlicensed radio frequency spectrum band. The discrete dimensions may include, for example, a plurality of resource block formats (e.g., PUCCH formats including format 1, format 1a, format 1b, format 2, format 2a, format 2b, and/or format 3. The discrete dimensions may also or alternatively include an information-to-resource block mapping where, for example, different portions of information (e.g., acknowledgement information and/or CSI) may be mapped to (and transmitted over) different ones or subsets of resource blocks of an interlace and/or the same information may be mapped to (and transmitted over) each of the resource blocks of an interlace. The discrete dimensions may also or alternatively include the use of code level acknowledgement information, where bits of acknowledgement information indicate whether an individual code block or group of code blocks of a downlink transmission was received correctly, and/or the use of transport block acknowledgement information, where bits of acknowledgement information indicate whether an individual transport block or group of transport blocks of a downlink transmission was received correctly. The discrete dimensions may also or alternatively include the generation of acknowledgement information for individual code blocks (or individual transport blocks) and/or the generation of acknowledgement information for groups of code block (or groups of transport blocks) across hybrid automatic repeat request (HARQ) processes. Thus, an option of three PUCCH formats (e.g., format 1a/1b, format 2, and format 3) defining a first discrete dimension, the use of repeated (redundant) or individual information-to-resource block mapping defining a second discrete dimension, the use of code block level or transport block level acknowledgement information defining a third discrete dimension, and the use of individual code block or transport block acknowledgement information or group code block or transport block acknowledgement information (across HARQ processes) defining a fourth discrete dimension may provide twenty-four alternatives for allocating resources to an uplink control channel transmitted over an unlicensed radio frequency spectrum band.

With reference to FIG. 7, it was indicated that the maximum number of wireless devices that may use a resource block 705 having a PUCCH format 1b is 36 wireless devices. However, in the presence of delay spread in the frequency spectrum, the maximum number of wireless devices that may use the resource block to transmit an uplink control channel (e.g., an ePUCCH) may be 18. With reference to FIG. 8, it was indicated that the maximum number of wireless devices that may use a resource block 805 having a PUCCH format 2 is twelve wireless devices. However, in the presence of delay spread in the frequency spectrum, the maximum number of wireless devices that may use the resource block 805 to transmit an uplink control channel (e.g., an ePUCCH) may be six. Thus, the orthogonal wireless device (user) capacity per resource block is 18 for a resource block 705 having a PUCCH format 1b, six for a resource block 805 having a PUCCH format 2, and five for a resource block 805 having a PUCCH format 3. Similarly, the orthogonal wireless device (user) capacity per interlace (e.g., per ten resource blocks in the context of one of the interlaces 605, 610, or 615 described with reference to FIG. 6) is 18 for a resource block 705 having a PUCCH format 1b, six for a resource block 805 having a PUCCH format 2, and five for a resource block 805 having a PUCCH format 3.

With reference to FIG. 7, the maximum payload capacity of a resource block having a PUCCH format 1b is 2 bits/wireless device*36 wireless devices=72 bits. However, in some examples, the payload capacity of a resource block 705 having a PUCCH format 1b, when a maximum number of wireless devices is using the resource block to transmit an uplink control channel (e.g., an ePUCCH), may be 36 bits (e.g., 6 cyclic shifts, and 3 time domain codes). With reference to FIG. 8, the maximum payload capacity of a resource block having a PUCCH format 2 is 20 bits/wireless device*12 wireless devices=240 bits. However, in some examples, the payload capacity of a resource block 805 having a PUCCH format 2, when a maximum number of wireless devices is using the resource block to transmit an uplink control channel (e.g., an ePUCCH), may be 60 bits (e.g., 6 cyclic shifts, and a code rate of 0.5). With reference to FIG. 8, the maximum payload capacity of a resource block having a PUCCH format 3 is 48 bits/wireless device*5 wireless devices=240 bits. However, in some examples, the payload capacity of a resource block 805 having a PUCCH format 3, when a maximum number of wireless devices is using the resource block to transmit an uplink control channel (e.g., an ePUCCH), may be 120 bits (e.g., a code rate of 0.5). Thus, the payload capacity per resource block (using all discrete dimensions) is 36 bits for a resource block 705 having a PUCCH format 1b, 60 bits for a resource block 805 having a PUCCH format 2, and 120 bits for a resource block 805 having a PUCCH format 3. The payload capacity per interlace (e.g., per ten resource blocks in the context of one of the interlaces 605, 610, or 615 described with reference to FIG. 6, and using all discrete dimensions), assuming information is repeated across all of the resource blocks of the interlace, is 36 bits for a resource block 705 having a PUCCH format 1b, 60 bits for a resource block 805 having a PUCCH format 2, and 120 bits for a resource block 805 having a PUCCH format 3. The payload capacity per interlace (e.g., per ten resource blocks in the context of one of the interlaces 605, 610, or 615 described with reference to FIG. 6, and using all discrete dimensions), assuming information is not repeated across all of the resource blocks of the interlace (e.g., transmitted in one resource block of the interlace), is 10*36=360 bits for a resource block 705 having a PUCCH format 1b, 10*60=600 bits for a resource block 805 having a PUCCH format 2, and 10*120=1200 bits for a resource block 805 having a PUCCH format 3.

In a first example of allocating and/or selecting resources for use in transmitting an uplink control channel (e.g., an ePUCCH) over an unlicensed radio frequency spectrum band, PUCCH format 1b may be allocated and/or selected in a first dimension, individual information-to-resource block mapping may be allocated and/or selected in a second dimension, the use of transport block level acknowledgement information may be allocated and/or selected in a third dimension, and the use of individual transport block acknowledgement information across HARQ processes may be allocated and/or selected in a fourth dimension. Assuming that a wireless device (e.g., a UE such as one of the UEs 115, 215, 216, 217, and/or 218 described with reference to FIGS. 1 and/or 2) is allocated one interlace of ten resource blocks, which interlace and resource blocks are configured as described, for example, with reference to FIGS. 6 and 7, the example of resource allocation and/or selection described in this paragraph may enable eighteen wireless devices to share resources within an interlace, with each user using one ZC resource per resource block. The example of resource allocation and/or selection described in this paragraph may also enable each of the eighteen wireless devices to transmit twenty bits of information. Alternatively, and by way of example, if the number of wireless devices sharing the interlace is reduced to seventeen, each of sixteen wireless devices may use one ZC resource per resource block and transmit twenty bits of information, and one wireless device may use two ZC resources per resource block and transmit forty bits of information.

In a second example of allocating and/or selecting resources for use in transmitting an uplink control channel (e.g., an ePUCCH) over an unlicensed radio frequency spectrum band, PUCCH format 2 may be allocated and/or selected in a first dimension, individual information-to-resource block mapping may be allocated and/or selected in a second dimension, the use of transport block level acknowledgement information may be allocated and/or selected in a third dimension, and the use of individual transport block acknowledgement information across HARQ processes may be allocated and/or selected in a fourth dimension. Assuming that a wireless device (e.g., a UE such as one of the UEs 115, 215, 216, 217, and/or 218 described with reference to FIGS. 1 and/or 2) is allocated one interlace of ten resource blocks, which interlace and resource blocks are configured as described, for example, with reference to FIGS. 6 and 8, the example of resource allocation and/or selection described in this paragraph may enable six wireless devices to share resources within an interlace. The example of resource allocation and/or selection described in this paragraph may also enable each of the six wireless devices to transmit 100 bits of information. Alternatively, and by way of example, if the number of wireless devices sharing the interlace is reduced to five, each of four wireless devices may transmit 100 bits of information, and one wireless device may transmit 200 bits of information.

In a third example of allocating and/or selecting resources for use in transmitting an uplink control channel (e.g., an ePUCCH) over an unlicensed radio frequency spectrum band, PUCCH format 2 may be allocated and/or selected in a first dimension, individual information-to-resource block mapping may be allocated and/or selected in a second dimension, the use of transport block level acknowledgement information may be allocated and/or selected in a third dimension, and the use of individual transport block acknowledgement information across HARQ processes may be allocated and/or selected in a fourth dimension. The acknowledgement information in this third example may include acknowledgement bits on which a joint coding is performed, where in some examples the joint coding may be a joint convolutional coding. Assuming that a wireless device (e.g., a UE such as one of the UEs 115, 215, 216, 217, and/or 218 described with reference to FIGS. 1 and/or 2) is allocated one interlace of ten resource blocks, which interlace and resource blocks are configured as described, for example, with reference to FIGS. 6 and 8, the example of resource allocation and/or selection described in this paragraph may enable six wireless devices to share resources within an interlace. The example of resource allocation and/or selection described in this paragraph may also enable each of the six wireless devices to transmit 100 bits of information, or 50 acknowledgement bits on which a joint coding is performed.

In a fourth example of allocating and/or selecting resources for use in transmitting an uplink control channel (e.g., an ePUCCH) over an unlicensed radio frequency spectrum band, PUCCH format 3 may be allocated and/or selected in a first dimension, individual information-to-resource block mapping may be allocated and/or selected in a second dimension, the use of transport block level acknowledgement information may be allocated and/or selected in a third dimension, and the use of individual transport block acknowledgement information across HARQ processes may be allocated and/or selected in a fourth dimension. Assuming that a wireless device (e.g., a UE such as one of the UEs 115, 215, 216, 217, and/or 218 described with reference to FIGS. 1 and/or 2) is allocated one interlace of ten resource blocks, which interlace and resource blocks are configured as described, for example, with reference to FIGS. 6 and 8, the example of resource allocation and/or selection described in this paragraph may enable five wireless devices to share resources within an interlace, with each user using one code division multiplexed (CDM) resource per resource block. The example of resource allocation and/or selection described in this paragraph may also enable each of the five wireless devices to transmit 240 bits of information. Alternatively, and by way of example, if the number of wireless devices sharing the interlace is reduced to four, each of three wireless devices may use one CDM resource per resource block and transmit 240 bits of information, and one wireless device may use two CDM resources per resource block and transmit 480 bits of information.

In a fifth example of allocating and/or selecting resources for use in transmitting an uplink control channel (e.g., an ePUCCH) over an unlicensed radio frequency spectrum band, PUCCH format 2 may be allocated and/or selected in a first dimension, individual information-to-resource block mapping may be allocated and/or selected in a second dimension, the use of code block level acknowledgement information may be allocated and/or selected in a third dimension, and the use of individual code block acknowledgement information across HARQ processes may be allocated and/or selected in a fourth dimension. Assuming that a wireless device (e.g., a UE such as one of the UEs 115, 215, 216, 217, and/or 218 described with reference to FIGS. 1 and/or 2) is allocated one interlace of ten resource blocks, which interlace and resource blocks are configured as described, for example, with reference to FIGS. 6 and 8, the example of resource allocation and/or selection described in this paragraph may enable six wireless devices to share resources within an interlace. The example of resource allocation and/or selection described in this paragraph may also enable each of the six wireless devices to transmit 100 bits of information. For a 20 Megahertz (MHz) component carrier in the unlicensed radio frequency spectrum band with four spatial layers, the maximum number of code blocks for which acknowledgement information may be transmitted may be less than or equal to fifty. Also, code block level HARQ may be employed.

In a sixth example of allocating and/or selecting resources for use in transmitting an uplink control channel (e.g., an ePUCCH) over an unlicensed radio frequency spectrum band, PUCCH format 3 may be allocated and/or selected in a first dimension, individual information-to-resource block mapping may be allocated and/or selected in a second dimension, the use of code block level acknowledgement information may be allocated and/or selected in a third dimension, and the use of individual code block acknowledgement information across HARQ processes may be allocated and/or selected in a fourth dimension. Assuming that a wireless device (e.g., a UE such as one of the UEs 115, 215, 216, 217, and/or 218 described with reference to FIGS. 1 and/or 2) is allocated one interlace of ten resource blocks, which interlace and resource blocks are configured as described, for example, with reference to FIGS. 6 and 8, the example of resource allocation and/or selection described in this paragraph may enable five wireless devices to share resources within an interlace. The example of resource allocation and/or selection described in this paragraph may also enable each of the five wireless devices to transmit 240 bits of information. For a 20 Megahertz (MHz) component carrier in the unlicensed radio frequency spectrum band with four spatial layers, the maximum number of code blocks for which acknowledgement information may be transmitted may be less than or equal to fifty. Also, code block level HARQ may be employed.

Figure 9:
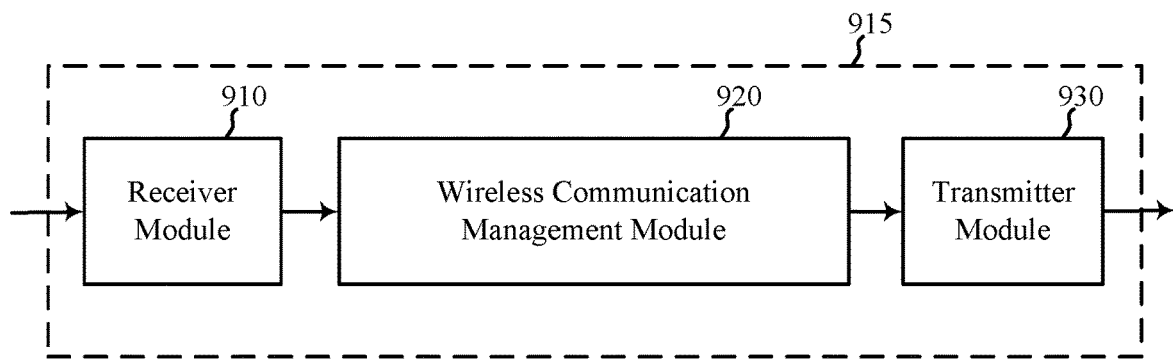
FIG. 9 shows a block diagram of a wireless device for use in wireless communication, in accordance with various aspects of the present disclosure.

FIG. 9 shows a block diagram 900 of a wireless device 915 for use in wireless communication, in accordance with various aspects of the present disclosure. The wireless device 915 may be an example of aspects of one or more of the UEs 115, 215, 216, 217, and/or 218 described with reference to FIGS. 1 and/or 2. The wireless device 915 may also be or include a processor. The wireless device 915 may include a receiver module 910, a wireless communication management module 920, and/or a transmitter module 930. Each of these modules may be in communication with each other.

The modules of the wireless device 915 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 910 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 910 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 930 may include at least one RF transmitter, such as at least one RF transmitter operable to transmit over the licensed radio frequency spectrum band and/or the unlicensed radio frequency spectrum band. The transmitter module 930 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 920 may be used to manage one or more aspects of wireless communication for the wireless device 915. For example, the wireless communication management module 920 may be used to manage the generation of uplink control information including acknowledgement information for a downlink transmission received by the wireless device and/or channel state information (CSI) for an unlicensed radio frequency spectrum band over which the downlink transmission is received. The wireless communication management module 920 may also or alternatively be used to modulate a reference signal based on a determination that the wireless device 915 has uplink data to transmit. The modulated reference signal may indicate a scheduling request (SR) for a base station (e.g., one of the base stations 105, 205, and/or 206 described with reference to FIGS. 1 and/or 2). The wireless communication management module 920 may also or alternatively be used to generate a sounding reference signal (SRS). The downlink transmission may be received using the receiver module 910. The uplink control information, modulated reference signal, and/or SRS may be transmitted using the transmitter module 930.

Figure 10:
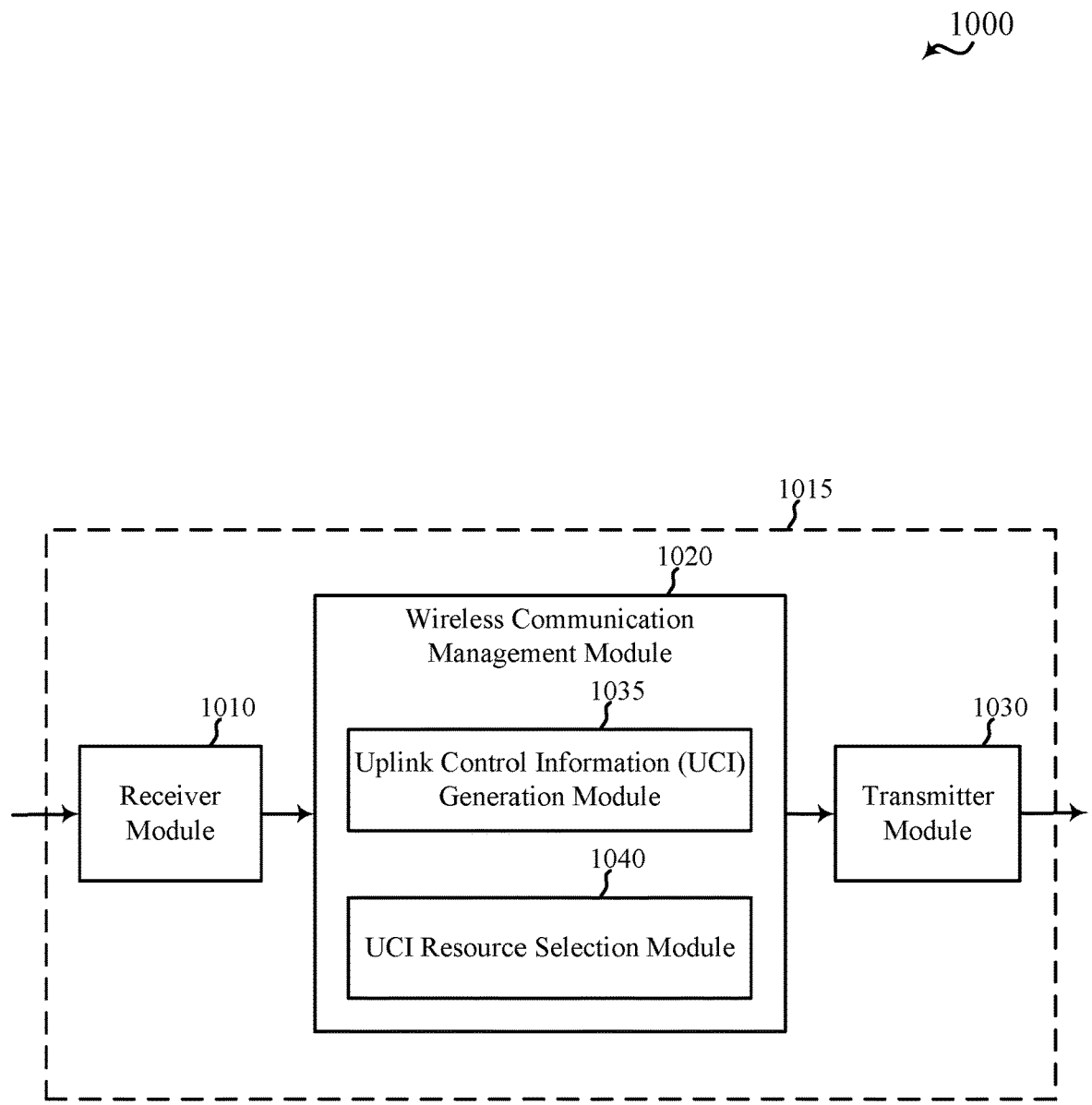
FIG. 10 shows a block diagram of a wireless device for use in wireless communication, in accordance with various aspects of the present disclosure.

FIG. 10 shows a block diagram 1000 of a wireless device 1015 for use in wireless communication, in accordance with various aspects of the present disclosure. The wireless device 1015 may be an example of aspects of one or more of the UEs 115, 215, 216, 217, and/or 218 described with reference to FIGS. 1 and/or 2, and/or aspects of the wireless device 915 described with reference to FIG. 9. The wireless device 1015 may also be or include a processor. The wireless device 1015 may include a receiver module 1010, a wireless communication management module 1020, and/or a transmitter module 1030. Each of these modules may be in communication with each other.

The modules of the wireless device 1015 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1010 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1010 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1030 may include at least one RF transmitter, such as at least one RF transmitter operable to transmit over the licensed radio frequency spectrum band and/or the unlicensed radio frequency spectrum band. The transmitter module 1030 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1020 may be used to manage one or more aspects of wireless communication for the wireless device 1015. In some examples, the wireless communication management module 1020 may include an uplink control information (UCI) generation module 1035 and/or a UCI resource selection module 1040. Each of these modules may be in communication with each other.

In some examples, the UCI generation module 1035 may be used to generate uplink control information.

In some examples, the UCI resource selection module 1040 may be used to select resources, such as an interlace of a component carrier of an unlicensed radio frequency spectrum band, for transmitting uplink control information. The interlace may include a plurality of non-contiguous concurrent resource blocks in the unlicensed radio frequency spectrum band. At least two resource blocks in the interlace may include different portions of the uplink control information.

In some examples, the UCI resource selection module 1040 may be used to select resources for transmitting uplink control information over an uplink control channel of an unlicensed radio frequency spectrum band. The resources of the uplink control channel may be divided into a plurality of discrete dimensions and the uplink control information of the wireless device 1015 may be transmitted over a number of the discrete dimensions allocated to the uplink control information of the wireless device 1015.

Figure 11:
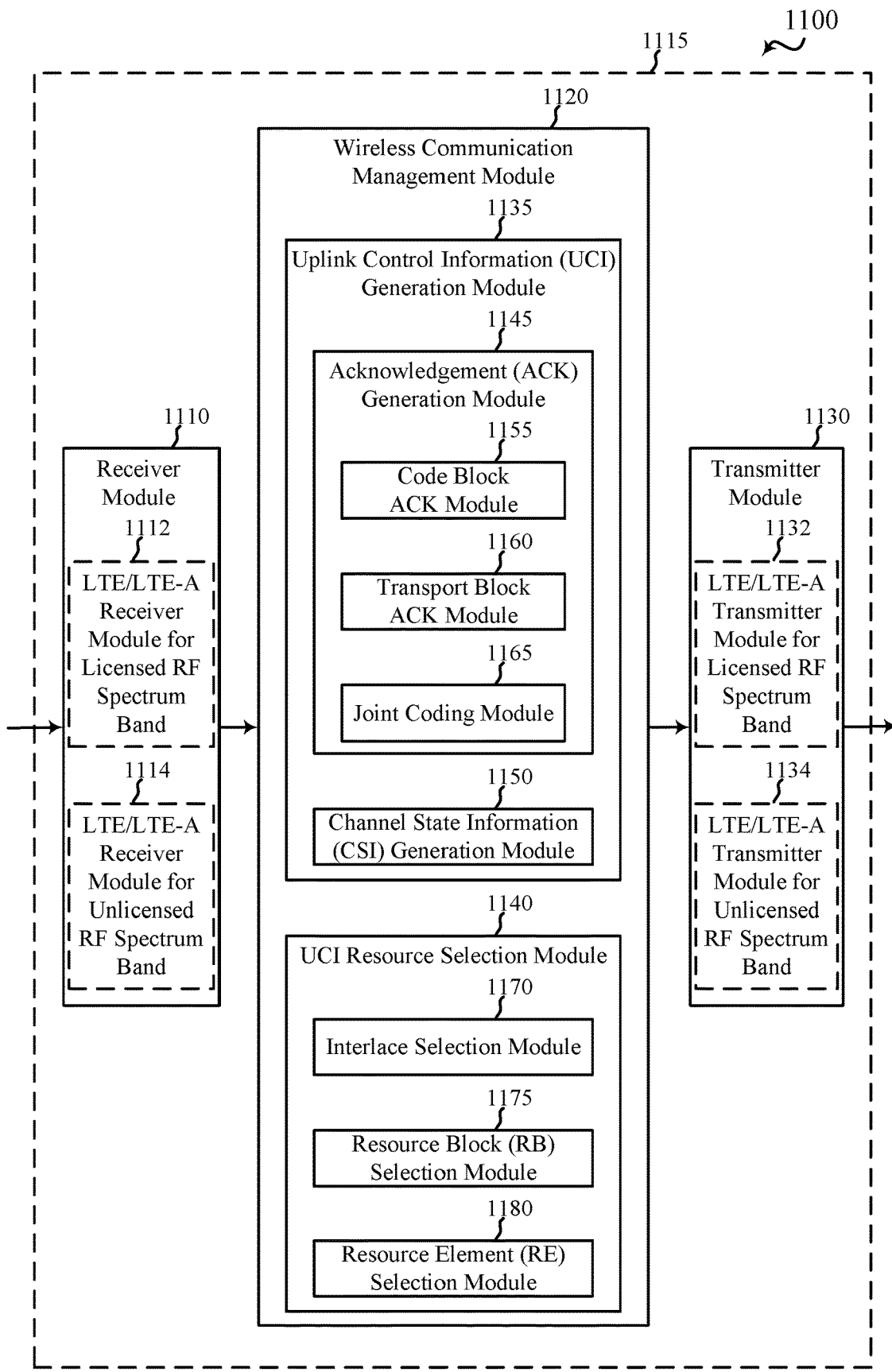
FIG. 11 shows a block diagram of a wireless device for use in wireless communication, in accordance with various aspects of the present disclosure.

FIG. 11 shows a block diagram 1100 of a wireless device 1115 for use in wireless communication, in accordance with various aspects of the present disclosure. The wireless device 1115 may be an example of aspects of one or more of the UEs 115, 215, 216, 217, and/or 218 described with reference to FIGS. 1 and/or 2, and/or aspects of one or more of the wireless devices 915 and/or 1015 described with reference to FIGS. 9 and/or 10. The wireless device 1115 may also be or include a processor. The wireless device 1115 may include a receiver module 1110, a wireless communication management module 1120, and/or a transmitter module 1130. Each of these modules may be in communication with each other.

The modules of the wireless device 1115 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1110 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1110 may in some cases include separate receivers for the licensed radio frequency spectrum band and the unlicensed radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 1112), and an LTE/LTE-A receiver module for communicating over the unlicensed radio frequency spectrum band (e.g., LTE/LTE-A receiver module for unlicensed RF spectrum band 1114). The receiver module 1110, including the LTE/LTE-A receiver module for licensed RF spectrum band 1112 and/or the LTE/LTE-A receiver module for unlicensed RF spectrum band 1114, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1130 may include at least one RF transmitter, such as at least one RF transmitter operable to transmit over the licensed radio frequency spectrum band and/or the unlicensed radio frequency spectrum band. The transmitter module 1130 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 1132), and an LTE/LTE-A transmitter module for communicating over the unlicensed radio frequency spectrum band (e.g., LTE/LTE-A transmitter module for unlicensed RF spectrum band 1134). The transmitter module 1130, including the LTE/LTE-A transmitter module for licensed RF spectrum band 1132 and/or the LTE/LTE-A transmitter module for unlicensed RF spectrum band 1134, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1120 may be used to manage one or more aspects of wireless communication for the wireless device 1115. In some examples, the wireless communication management module 1120 may include an uplink control information (UCI) generation module 1135 and/or a UCI resource selection module 1140. Each of these modules may be in communication with each other.

In some examples, the UCI generation module 1135 may be used to generate uplink control information. In some examples, generating the uplink control information may include generating acknowledgement information (e.g., ACK and/or NAK information) for a downlink transmission received using the receiver module 1110. In some examples, generating the uplink control information may include generating CSI for an unlicensed radio frequency spectrum band. In some examples, the UCI generation module 1135 may include an ACK generation module 1145 for generating the acknowledgement information and/or a CSI generation module 1150 for generating the CSI.

In some examples, the ACK generation module 1145 may include a code block ACK module 1155, a transport block ACK module 1160, and/or a joint coding module 1165. The code block ACK module 1155 may be used to generate code block level acknowledgement information for an individual code block of the downlink transmission and/or a group of code blocks of the downlink transmission. In some examples, the acknowledgement information may include code block level acknowledgement information for each of a number of individual code blocks of the downlink transmission and/or each of a number of groups of code blocks of the downlink transmission. The transport block ACK module 1160 may be used to generate transport block level acknowledgement information for an individual transport block of the downlink transmission and/or a group of transport blocks of the downlink transmission. In some examples, the acknowledgement information may include transport block level acknowledgement information for each of a number of individual transport blocks of the downlink transmission and/or each of a number of groups of transport blocks of the downlink transmission. In some examples, the ACK generation module 1145 may be statically, semi-statically, or dynamically configured to generate code block level acknowledgement information and/or transport block level acknowledgement information.

In some examples, the joint coding module 1165 may be used to perform a joint coding on a plurality of acknowledgement bits of acknowledgement information, and in some examples the joint coding may be a joint convolutional coding.

In some examples, the UCI resource selection module 1140 may be used to select resources, such as an interlace of a component carrier of an unlicensed radio frequency spectrum band, for transmitting uplink control information. In some examples, the UCI resource selection module 1140 may include an interlace selection module 1170, a resource block (RB) selection module 1175, and/or a resource element (RE) selection module 1180.

In some examples, the interlace selection module 1170 may be used to select an interlace over which uplink control information will be transmitted. In some examples, the selection may be based on configuration information received from a base station. In some examples, the selected interlace may include a plurality of non-contiguous concurrent resource blocks in an unlicensed radio frequency spectrum band. In some examples, the selected interlace may be selected from among ten interlaces, each of which includes ten non-contiguous concurrent resource blocks in the unlicensed radio frequency spectrum band. In some examples, the plurality of non-contiguous concurrent resource blocks of the selected interlace may be spaced in frequency according to a uniform spreading pattern. In some examples, the plurality of non-contiguous concurrent resource blocks of the selected interlace may be distributed in frequency according to a non-uniform spreading pattern.

In some examples, the RB selection module 1175 may be used to select the resource block(s) of an interlace over which uplink control information (or portions of uplink control information) will be transmitted. In some examples, the RB selection module 1175 may select at least two resource blocks in an interlace for the transmission of different portions of the uplink control information. In examples in which a joint convolutional coding is performed on a plurality of acknowledgement bits of acknowledgement information, the RB selection module 1175 may select different resource blocks of an interlace for transmitting different portions of the jointly coded acknowledgement bits.

In some examples, the RE selection module 1180 may be used to select the resource element(s) of a resource block over which uplink control information (or portions of uplink control information) will be transmitted. In some examples, the resource element(s) may be selected according to a PUCCH format, such as format 1, format 1a, format 1b, format 2, format 2a, format 2b, and/or format 3. In some examples, the resource element(s) may be selected according to a PUCCH format from a group consisting of format 1a, format 1b, format 2, and format 3.

Figure 12:
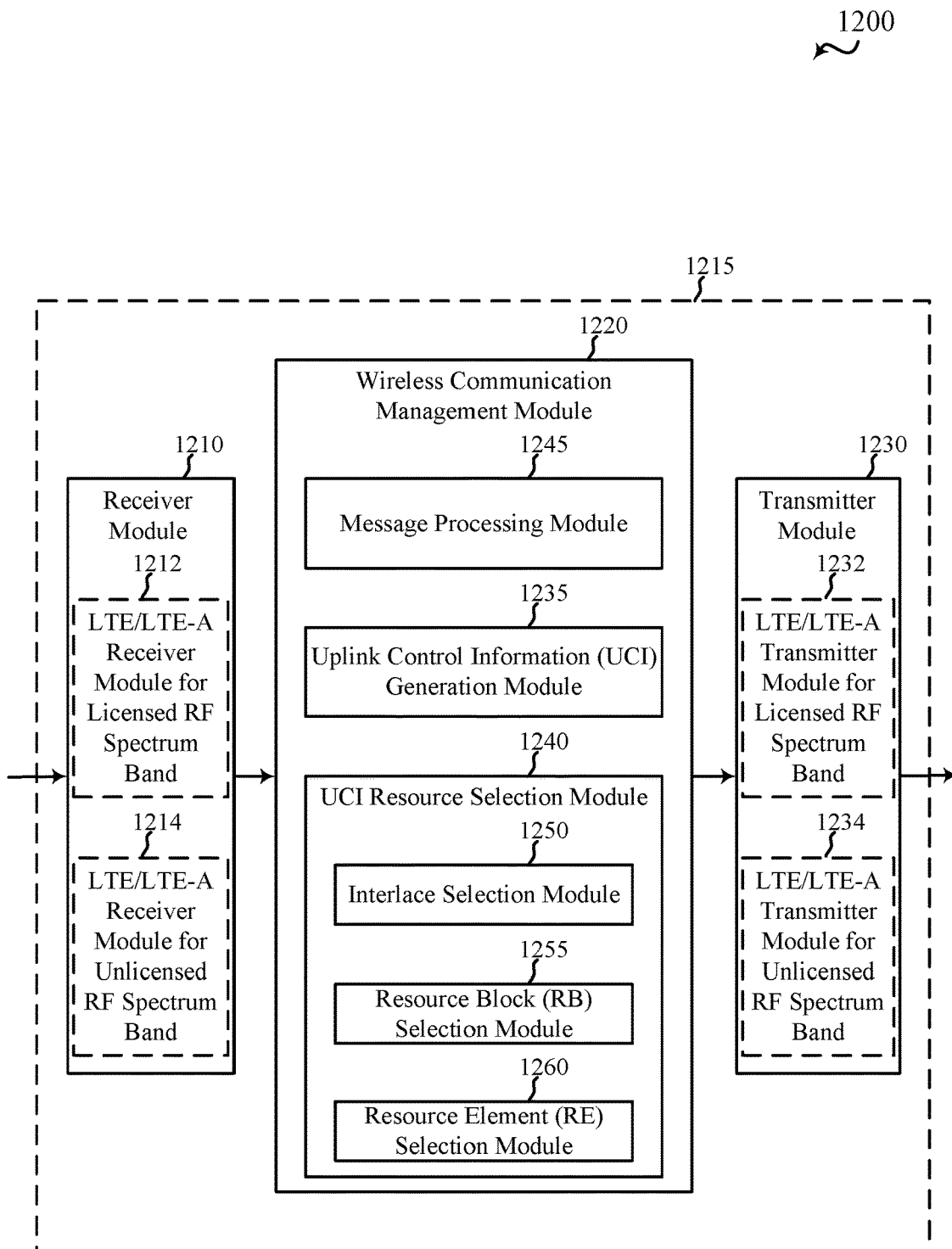
FIG. 12 shows a block diagram of a wireless device for use in wireless communication, in accordance with various aspects of the present disclosure.

FIG. 12 shows a block diagram 1200 of a wireless device 1215 for use in wireless communication, in accordance with various aspects of the present disclosure. The wireless device 1215 may be an example of aspects of one or more of the UEs 115, 215, 216, 217, and/or 218 described with reference to FIGS. 1 and/or 2, and/or aspects of one or more of the wireless devices 915 and/or 1015 described with reference to FIGS. 9 and/or 10. The wireless device 1215 may also be or include a processor. The wireless device 1215 may include a receiver module 1210, a wireless communication management module 1220, and/or a transmitter module 1230. Each of these modules may be in communication with each other.

The modules of the wireless device 1215 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1210 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1210 may in some cases include separate receivers for the licensed radio frequency spectrum band and the unlicensed radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 1212), and an LTE/LTE-A receiver module for communicating over the unlicensed radio frequency spectrum band (e.g., LTE/LTE-A receiver module for unlicensed RF spectrum band 1214). The receiver module 1210, including the LTE/LTE-A receiver module for licensed RF spectrum band 1212 and/or the LTE/LTE-A receiver module for unlicensed RF spectrum band 1214, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1230 may include at least one RF transmitter, such as at least one RF transmitter operable to transmit over the licensed radio frequency spectrum band and/or the unlicensed radio frequency spectrum band. The transmitter module 1230 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 1232), and an LTE/LTE-A transmitter module for communicating over the unlicensed radio frequency spectrum band (e.g., LTE/LTE-A transmitter module for unlicensed RF spectrum band 1234). The transmitter module 1230, including the LTE/LTE-A transmitter module for licensed RF spectrum band 1232 and/or the LTE/LTE-A transmitter module for unlicensed RF spectrum band 1234, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1220 may be used to manage one or more aspects of wireless communication for the wireless device 1215. In some examples, the wireless communication management module 1220 may include an uplink control information (UCI) generation module 1235, a message processing module 1245, and/or a UCI resource selection module 1240. Each of these modules may be in communication with each other.

In some examples, the UCI generation module 1235 may be used to generate uplink control information.

In some examples, the message processing module 1245 may be used to receive a scheduling message from a base station (e.g., from one of the base stations 105, 205, and/or 206 described with reference to FIGS. 1 and/or 2). The scheduling message may indicate a number of discrete dimensions (e.g., of the resources of an uplink control channel) allocated to the transmission of uplink control information of the wireless device 1215. The number of the discrete dimensions allocated to the uplink control information of the wireless device 1215 may include one, some, or each of a plurality of discrete dimensions into which the resources of the uplink control channel are divided. In some examples, the number of the discrete dimensions allocated to the uplink control information of the wireless device 1215 may be based on a size of the uplink control information of the wireless device 1215.

In some examples, the UCI resource selection module 1240 may be used to select resources for transmitting uplink control information over an uplink control channel of an unlicensed radio frequency spectrum band. The resources of the uplink control channel may be divided into a plurality of discrete dimensions and the uplink control information of the wireless device 1215 may be transmitted over a number of the discrete dimensions allocated to the uplink control information of the wireless device 1215. In some examples, the UCI resource selection module 1240 may include an interlace selection module 1250, a resource block (RB) selection module 1255, and/or a resource element (RE) selection module 1260.

In some examples, the resources of the uplink control channel may include an interlace of a component carrier of an unlicensed radio frequency spectrum band, and the interlace selection module 1250 may be used to select the interlace. In some examples, the selection may be based on configuration information received in a scheduling message from a base station. In some examples, the selected interlace may include a plurality of non-contiguous concurrent resource blocks in an unlicensed radio frequency spectrum band. In some examples, the selected interlace may be selected from among ten interlaces, each of which includes ten non-contiguous concurrent resource blocks in the unlicensed radio frequency spectrum band. In some examples, the plurality of non-contiguous concurrent resource blocks of the selected interlace may be spaced in frequency according to a uniform spreading pattern. In some examples, the plurality of non-contiguous concurrent resource blocks of the selected interlace may be distributed in frequency according to a non-uniform spreading pattern.

In some examples, at least one of a number of discrete dimensions allocated to the uplink control information of the wireless device 1215 may span multiple ones of the resource blocks of an interlace, and the RB selection module 1255 may be used to select the resource block(s) of an interlace over which uplink control information (or portions of uplink control information) will be transmitted.

In some examples, resource blocks (e.g., of an interlace) may include different ones of the dimensions (e.g., time and/or frequency), and the RE selection module 1260 may be used to select the resource element(s) of a resource block over which uplink control information (or portions of uplink control information) will be transmitted. In some examples, the resource element(s) may be selected according to a PUCCH format, such as format 1, format 1a, format 1b, format 2, format 2a, format 2b, and/or format 3. In some examples, the resource element(s) may be selected according to a PUCCH format from a group consisting of format 1a, format 1b, format 2, and format 3.

Figure 13:
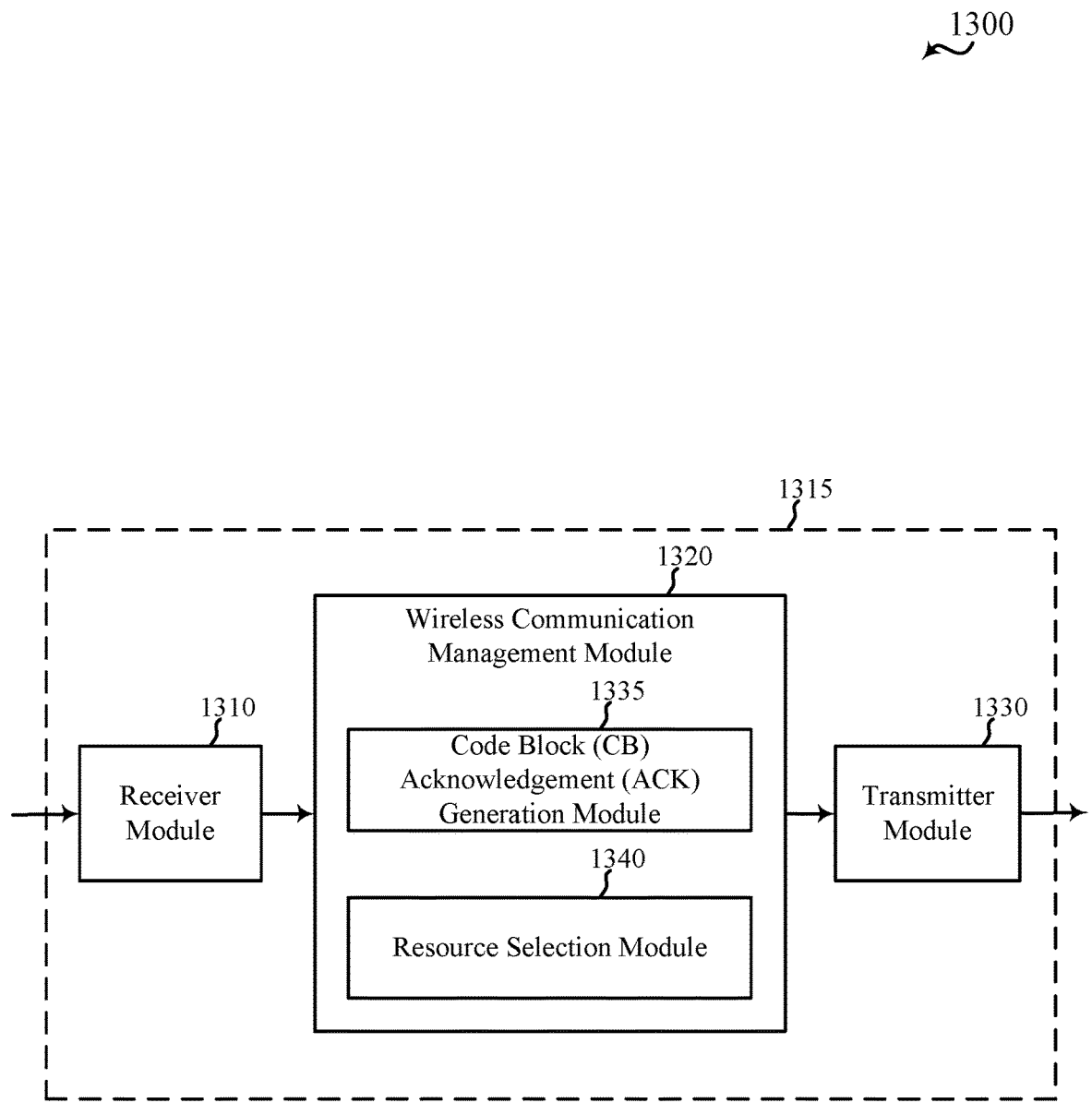
FIG. 13 shows a block diagram of a wireless device for use in wireless communication, in accordance with various aspects of the present disclosure.

FIG. 13 shows a block diagram 1300 of a wireless device 1315 for use in wireless communication, in accordance with various aspects of the present disclosure. The wireless device 1315 may be an example of aspects of one or more of the UEs 115, 215, 216, 217, and/or 218 described with reference to FIGS. 1 and/or 2, and/or aspects of the wireless device 915 described with reference to FIG. 9. The wireless device 1315 may also be or include a processor. The wireless device 1315 may include a receiver module 1310, a wireless communication management module 1320, and/or a transmitter module 1330. Each of these modules may be in communication with each other.

The modules of the wireless device 1315 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1310 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1310 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1330 may include at least one RF transmitter, such as at least one RF transmitter operable to transmit over the licensed radio frequency spectrum band and/or the unlicensed radio frequency spectrum band. The transmitter module 1330 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1320 may be used to manage one or more aspects of wireless communication for the wireless device 1315. In some examples, the wireless communication management module 1320 may include a code block (CB) acknowledgement (ACK) generation module 1335 and/or a resource selection module 1340. Each of these modules may be in communication with each other.

In some examples, the CB ACK generation module 1335 may be used to generate acknowledgement information. The acknowledgement information may indicate, at a code block level, whether a plurality of code blocks of a downlink transmission were received correctly.

In some examples, the resource selection module 1340 may be used to select resources, such as an interlace of a component carrier of an unlicensed radio frequency spectrum band, for transmitting the acknowledgement information.

Figure 14:
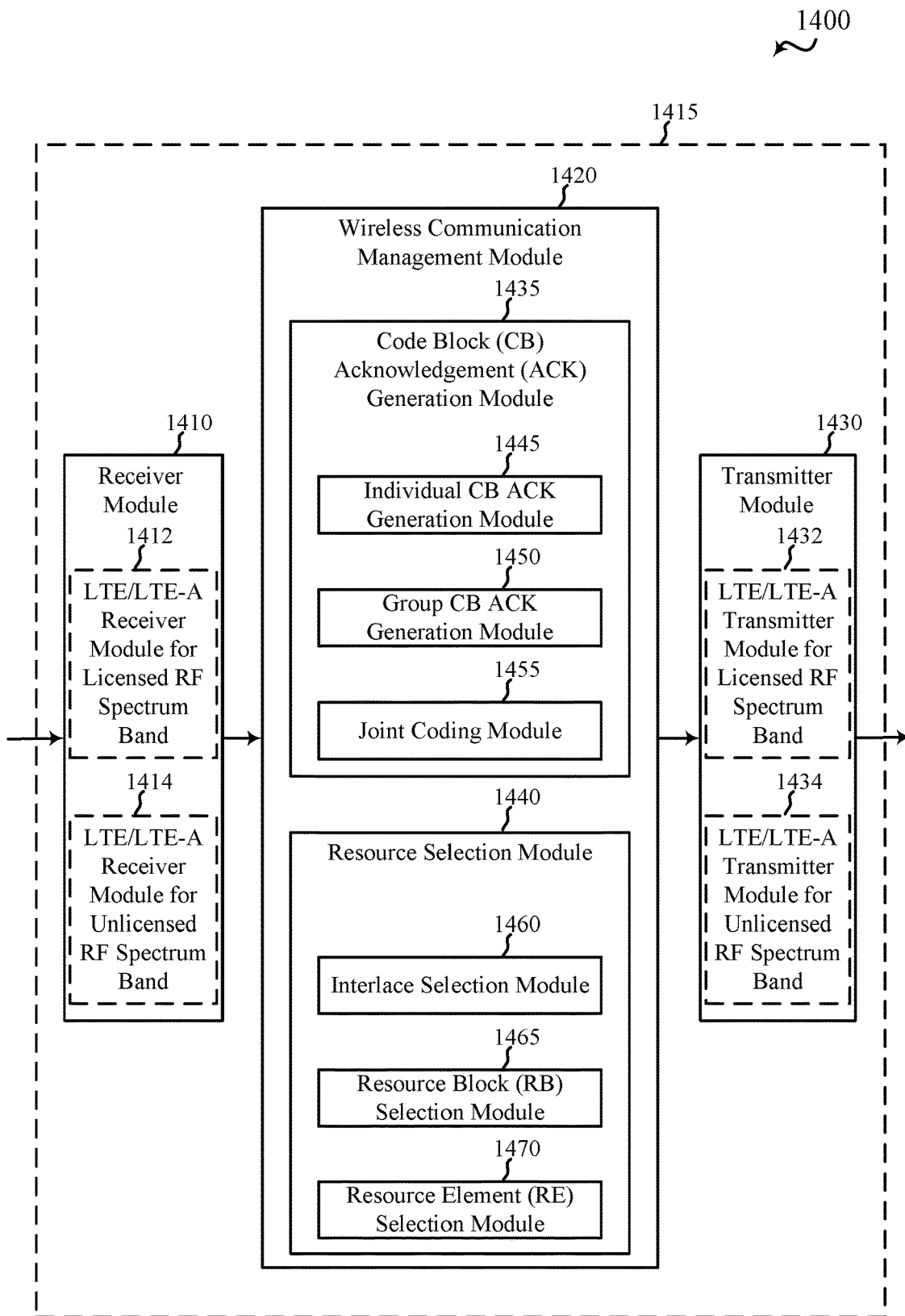
FIG. 14 shows a block diagram of a wireless device for use in wireless communication, in accordance with various aspects of the present disclosure.

FIG. 14 shows a block diagram 1400 of a wireless device 1415 for use in wireless communication, in accordance with various aspects of the present disclosure. The wireless device 1415 may be an example of aspects of one or more of the UEs 115, 215, 216, 217, and/or 218 described with reference to FIGS. 1 and/or 2, and/or aspects of one or more of the wireless devices 915 and/or 1315 described with reference to FIGS. 9 and/or 13. The wireless device 1415 may also be or include a processor. The wireless device 1415 may include a receiver module 1410, a wireless communication management module 1420, and/or a transmitter module 1430. Each of these modules may be in communication with each other.

The modules of the wireless device 1415 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1410 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1410 may in some cases include separate receivers for the licensed radio frequency spectrum band and the unlicensed radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 1412), and an LTE/LTE-A receiver module for communicating over the unlicensed radio frequency spectrum band (e.g., LTE/LTE-A receiver module for unlicensed RF spectrum band 1414). The receiver module 1410, including the LTE/LTE-A receiver module for licensed RF spectrum band 1412 and/or the LTE/LTE-A receiver module for unlicensed RF spectrum band 1414, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1430 may include at least one RF transmitter, such as at least one RF transmitter operable to transmit over the licensed radio frequency spectrum band and/or the unlicensed radio frequency spectrum band. The transmitter module 1430 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 1432), and an LTE/LTE-A transmitter module for communicating over the unlicensed radio frequency spectrum band (e.g., LTE/LTE-A transmitter module for unlicensed RF spectrum band 1434). The transmitter module 1430, including the LTE/LTE-A transmitter module for licensed RF spectrum band 1432 and/or the LTE/LTE-A transmitter module for unlicensed RF spectrum band 1434, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1420 may be used to manage one or more aspects of wireless communication for the wireless device 1415. In some examples, the wireless communication management module 1420 may be used to generate acknowledgement information for a downlink transmission and/or CSI for an unlicensed radio frequency spectrum band. In some examples, the wireless communication management module 1420 may include a code block (CB) acknowledgement (ACK) generation module 1435 and/or a resource selection module 1440. Each of these modules may be in communication with each other.

In some examples, the CB ACK generation module 1435 may be used to generate acknowledgement information. The acknowledgement information may indicate, at a code block level within a transport block, whether a plurality of code blocks of a downlink transmission were received correctly.

In some examples, the CB ACK generation module 1435 may include an individual CB ACK generation module 1445, a group CB ACK generation module 1450, and/or a joint coding module 1455. The individual CB ACK generation module 1445 may be used to generate a plurality of bits, with each bit indicating whether an individual code block of a downlink transmission was received correctly. The group CB ACK generation module 1450 may be used to generate at least one bit indicating whether a group of code blocks of a downlink transmission was received correctly.

In some examples, the joint coding module 1455 may be used to perform a joint coding on a plurality of acknowledgement bits of the acknowledgement information, and in some examples the joint coding may be a joint convolutional coding.

In some examples, the resource selection module 1440 may be used to select resources for transmitting an uplink control channel including acknowledgement information and/or CSI. In some examples, the resource selection module 1440 may include an interlace selection module 1460, a resource block (RB) selection module 1465, and/or a resource element (RE) selection module 1470.

In some examples, the interlace selection module 1460 may be used to select an interlace over which the uplink control channel will be transmitted. In some examples, the selection may be based on configuration information received from a base station. In some examples, the selected interlace may include a plurality of non-contiguous concurrent resource blocks in an unlicensed radio frequency spectrum band. In some examples, the selected interlace may be selected from among ten interlaces, each of which includes ten non-contiguous concurrent resource blocks in the unlicensed radio frequency spectrum band. In some examples, the plurality of non-contiguous concurrent resource blocks of the selected interlace may be spaced in frequency according to a uniform spreading pattern. In some examples, the plurality of non-contiguous concurrent resource blocks of the selected interlace may be distributed in frequency according to a non-uniform spreading pattern.

In some examples, the RB selection module 1465 may be used to select the resource block(s) of an interlace over which acknowledgement information and/or CSI (or portions of acknowledgement information and/or CSI) will be transmitted. In some examples, the RB selection module 1465 may select a subset of the resource blocks of an interlace to transmit acknowledgement information and/or CSI. In some examples, the RB selection module 1465 may select different resource blocks of an interlace for transmitting different portions of acknowledgement information and/or CSI. In some examples, the RB selection module 1465 may select each of the resource blocks of an interlace for transmitting some or all of the acknowledgement information and/or CSI (e.g., in some examples, the acknowledgement information may be redundantly transmitted over each of the resource blocks).

In examples in which a joint convolutional coding is performed on a plurality of acknowledgement bits of acknowledgement information, the RB selection module 1465 may select different resource blocks of an interlace for transmitting different portions of the jointly coded acknowledgement bits.

In some examples, the RE selection module 1470 may be used to select the resource element(s) of a resource block over which acknowledgement information and/or CSI (or portions of acknowledgement information and/or CSI) will be transmitted. In some examples, the resource element(s) may be selected according to a PUCCH format, such as format 1, format 1a, format 1b, format 2, format 2a, format 2b, and/or format 3. In some examples, the resource element(s) may be selected according to a PUCCH format from a group consisting of format 1a, format 1b, format 2, and format 3.

Figure 15:
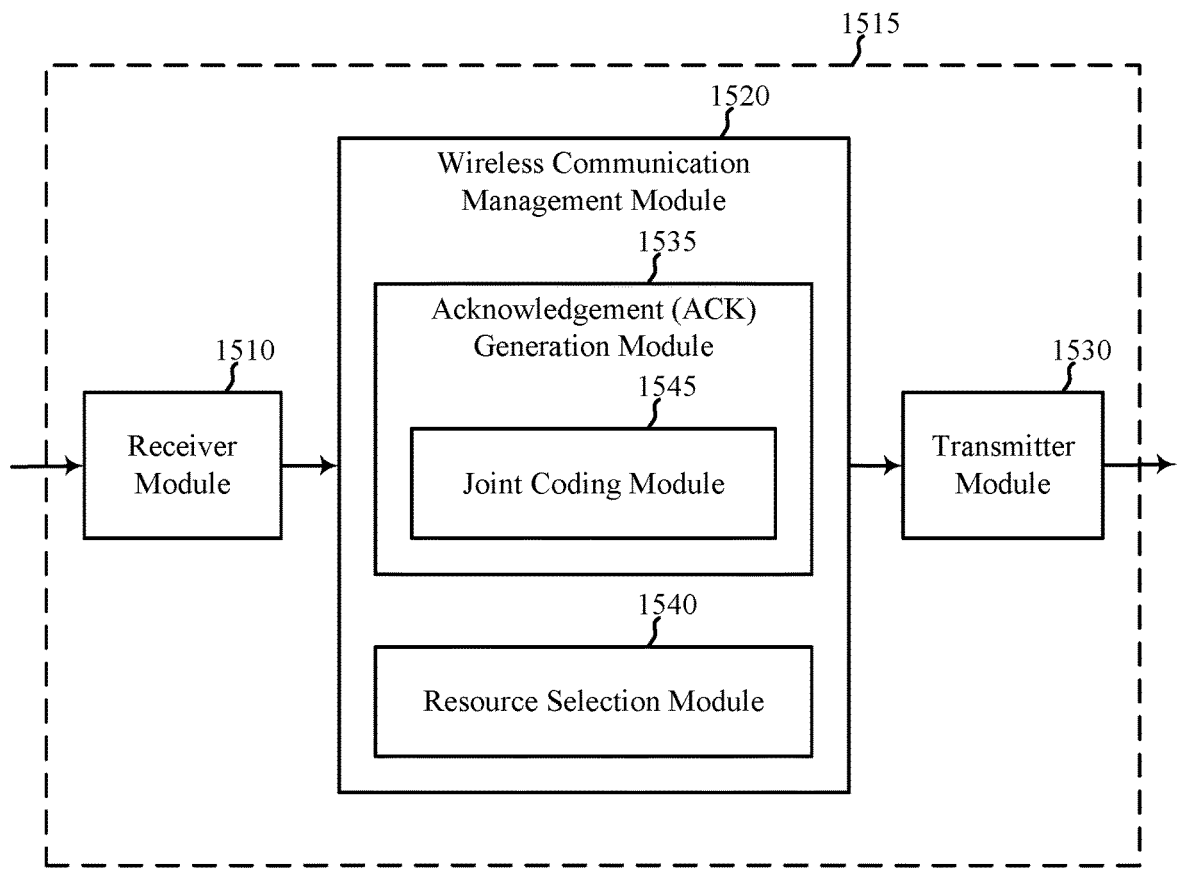
FIG. 15 shows a block diagram of a wireless device for use in wireless communication, in accordance with various aspects of the present disclosure.

FIG. 15 shows a block diagram 1500 of a wireless device 1515 for use in wireless communication, in accordance with various aspects of the present disclosure. The wireless device 1515 may be an example of aspects of one or more of the UEs 115, 215, 216, 217, and/or 218 described with reference to FIGS. 1 and/or 2, and/or aspects of the wireless device 915 described with reference to FIG. 9. The wireless device 1515 may also be or include a processor. The wireless device 1515 may include a receiver module 1510, a wireless communication management module 1520, and/or a transmitter module 1530. Each of these modules may be in communication with each other.

The modules of the wireless device 1515 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1510 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1510 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1530 may include at least one RF transmitter, such as at least one RF transmitter operable to transmit over the licensed radio frequency spectrum band and/or the unlicensed radio frequency spectrum band. The transmitter module 1530 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1520 may be used to manage one or more aspects of wireless communication for the wireless device 1515. In some examples, the wireless communication management module 1520 may include an acknowledgement (ACK) generation module 1535 and/or a resource selection module 1540. Each of these modules may be in communication with each other.

In some examples, the ACK generation module 1535 may be used to generate acknowledgement information including a plurality of acknowledgement bits for a downlink transmission. Each acknowledgement bit may indicate whether a separate portion of the downlink transmission was received correctly.

In some examples, the ACK generation module 1535 may include a joint coding module 1545. In some examples, the joint coding module 1545 may be used to perform a joint coding on a plurality of acknowledgement bits, and in some examples the joint coding may be a joint convolutional coding.

In some examples, the resource selection module 1540 may be used to select resources, such as an interlace of a component carrier of an unlicensed radio frequency spectrum band, for transmitting jointly coded acknowledgement bits.

Figure 16:
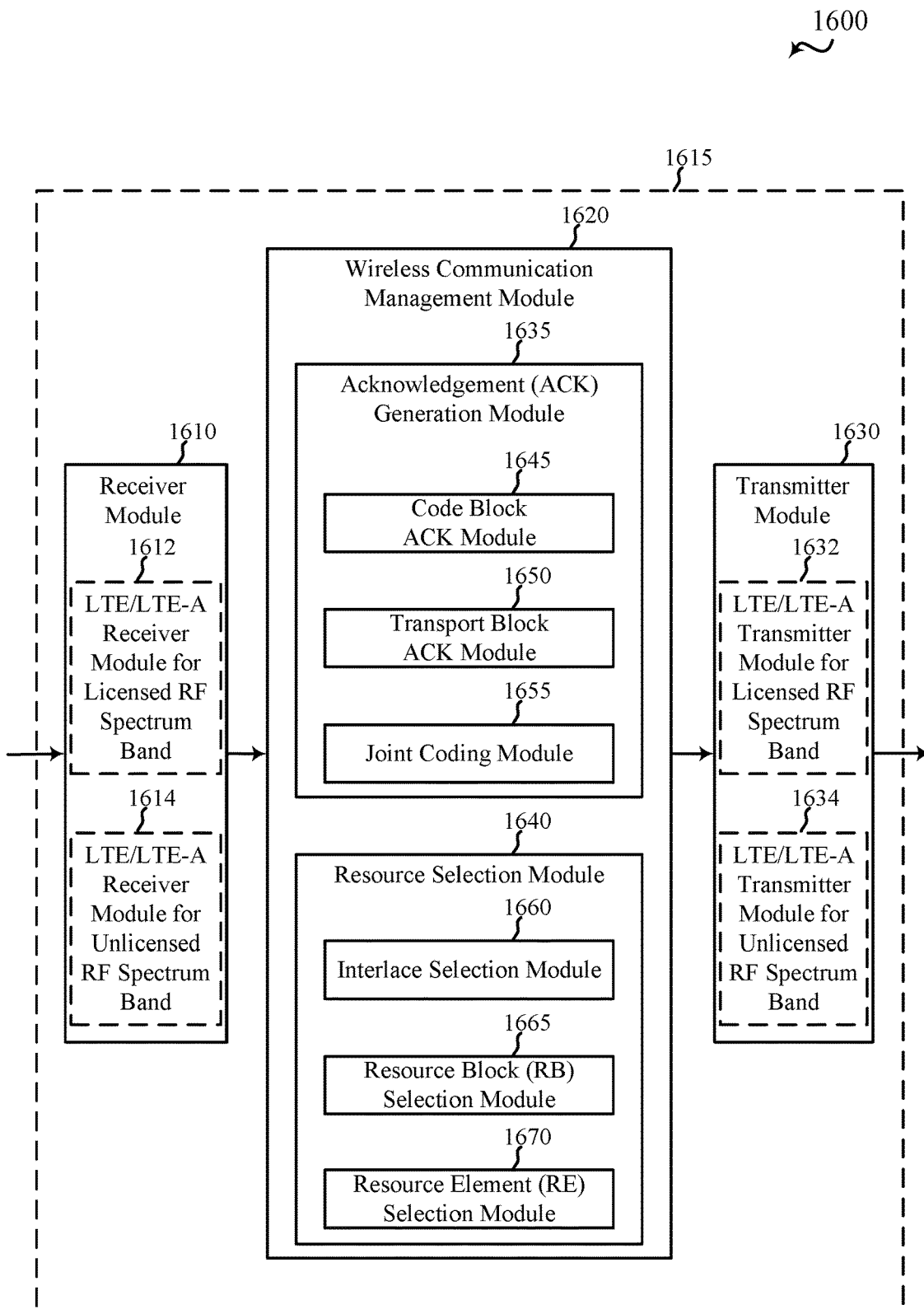
FIG. 16 shows a block diagram of a wireless device for use in wireless communication, in accordance with various aspects of the present disclosure.

FIG. 16 shows a block diagram 1600 of a wireless device 1615 for use in wireless communication, in accordance with various aspects of the present disclosure. The wireless device 1615 may be an example of aspects of one or more of the UEs 115, 215, 216, 217, and/or 218 described with reference to FIGS. 1 and/or 2, and/or aspects of one or more of the wireless devices 915 and/or 1515 described with reference to FIGS. 9 and/or 15. The wireless device 1615 may also be or include a processor. The wireless device 1615 may include a receiver module 1610, a wireless communication management module 1620, and/or a transmitter module 1630. Each of these modules may be in communication with each other.

The modules of the wireless device 1615 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1610 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1610 may in some cases include separate receivers for the licensed radio frequency spectrum band and the unlicensed radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 1612), and an LTE/LTE-A receiver module for communicating over the unlicensed radio frequency spectrum band (e.g., LTE/LTE-A receiver module for unlicensed RF spectrum band 1614). The receiver module 1610, including the LTE/LTE-A receiver module for licensed RF spectrum band 1612 and/or the LTE/LTE-A receiver module for unlicensed RF spectrum band 1614, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1630 may include at least one RF transmitter, such as at least one RF transmitter operable to transmit over the licensed radio frequency spectrum band and/or the unlicensed radio frequency spectrum band. The transmitter module 1630 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 1632), and an LTE/LTE-A transmitter module for communicating over the unlicensed radio frequency spectrum band (e.g., LTE/LTE-A transmitter module for unlicensed RF spectrum band 1634). The transmitter module 1630, including the LTE/LTE-A transmitter module for licensed RF spectrum band 1632 and/or the LTE/LTE-A transmitter module for unlicensed RF spectrum band 1634, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1620 may be used to manage one or more aspects of wireless communication for the wireless device 1615. In some examples, the wireless communication management module 1620 may be used to generate acknowledgement information for a downlink transmission and/or CSI for an unlicensed radio frequency spectrum band. In some examples, the wireless communication management module 1620 may include an acknowledgement (ACK) generation module 1635 and/or a resource selection module 1640. Each of these modules may be in communication with each other.

In some examples, the ACK generation module 1635 may be used to generate acknowledgement information including a plurality of acknowledgement bits for a downlink transmission. Each acknowledgement bit may indicate whether a separate portion of the downlink transmission was received correctly. In some examples, each separate portion of the downlink transmission may include a code block or a group of code blocks. In some examples, each separate portion of the downlink transmission may include a transport block or a group of transport blocks. In some examples of the method, each separate portion of the downlink transmission may include a group of code blocks across one or more transport blocks. In some examples, the ACK generation module 1635 may include a code block ACK module 1645 for generating one or more acknowledgement bits to indicate whether one or more respective code blocks were received correctly. In some examples, the ACK generation module 1635 may include a transport block ACK module 1650 for generating one or more acknowledgement bits to indicate whether one or more respective groups of code blocks were received correctly. In some examples, the ACK generation module 1635 may be statically, semi-statically, or dynamically configured to generate acknowledgement bits for code blocks and/or groups of code blocks.

In some examples, the ACK generation module 1635 may include a joint coding module 1655. In some examples, the joint coding module 1655 may be used to perform a joint coding on a plurality of acknowledgement bits, and in some examples the joint coding may be a joint convolutional coding.

In some examples, the resource selection module 1640 may be used to select resources for transmitting an uplink control channel including jointly coded acknowledgement bits and/or CSI. In some examples, the resource selection module 1640 may include an interlace selection module 1660, a resource block (RB) selection module 1665, and/or a resource element (RE) selection module 1670.

In some examples, the interlace selection module 1660 may be used to select an interlace over which the uplink control channel will be transmitted. In some examples, the selection may be based on configuration information received from a base station. In some examples, the selected interlace may include a plurality of non-contiguous concurrent resource blocks in an unlicensed radio frequency spectrum band. In some examples, the selected interlace may be selected from among ten interlaces, each of which includes ten non-contiguous concurrent resource blocks in the unlicensed radio frequency spectrum band. In some examples, the plurality of non-contiguous concurrent resource blocks of the selected interlace may be spaced in frequency according to a uniform spreading pattern. In some examples, the plurality of non-contiguous concurrent resource blocks of the selected interlace may be distributed in frequency according to a non-uniform spreading pattern.

In some examples, the RB selection module 1665 may be used to select the resource block(s) of an interlace over which jointly coded acknowledgement bits and/or CSI (or portions of acknowledgement information and/or CSI) will be transmitted. In some examples, the RB selection module 1665 may select a subset of the resource blocks of an interlace to transmit jointly coded acknowledgement bits and/or CSI. In some examples, the RB selection module 1665 may select different resource blocks of an interlace for transmitting different portions of jointly coded acknowledgement bits and/or CSI. In some examples, the RB selection module 1665 may select each of the resource blocks of an interlace for transmitting some or all of the jointly coded acknowledgement bits and/or CSI (e.g., in some examples, the acknowledgement information may be redundantly transmitted over each of the resource blocks).

In some examples, the RE selection module 1670 may be used to select the resource element(s) of a resource block over which jointly coded acknowledgement bits and/or CSI (or portions of jointly coded acknowledgement bits and/or CSI) will be transmitted. In some examples, the resource element(s) may be selected according to a PUCCH format, such as format 1, format 1a, format 1b, format 2, format 2a, format 2b, and/or format 3. In some examples, the resource element(s) may be selected according to a PUCCH format from a group consisting of format 1a, format 1b, format 2, and format 3.

Figure 17:
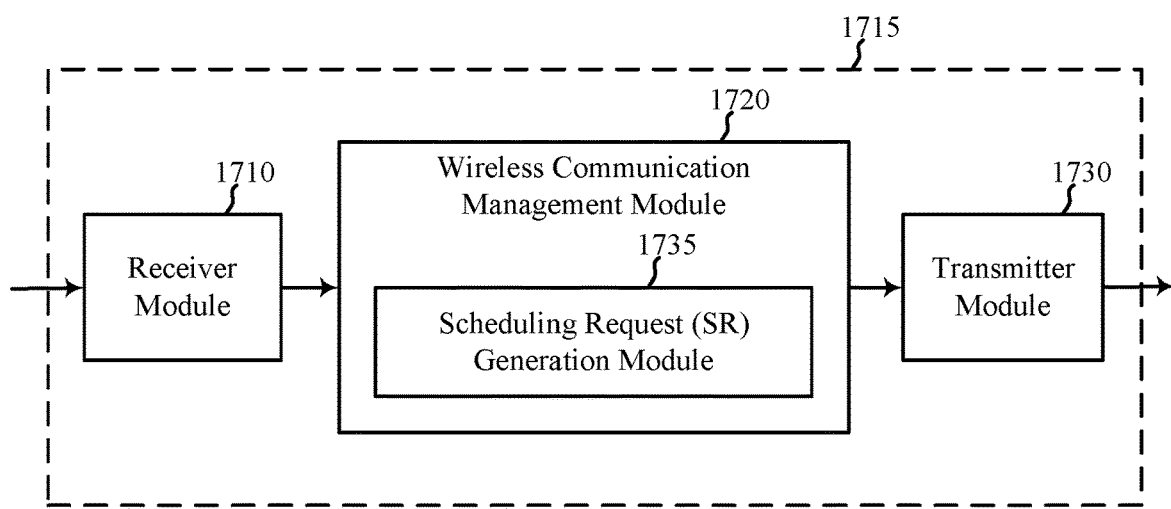
FIG. 17 shows a block diagram of a wireless device for use in wireless communication, in accordance with various aspects of the present disclosure.

FIG. 17 shows a block diagram 1700 of a wireless device 1715 for use in wireless communication, in accordance with various aspects of the present disclosure. The wireless device 1715 may be an example of aspects of one or more of the UEs 115, 215, 216, 217, and/or 218 described with reference to FIGS. 1 and/or 2, and/or aspects of the wireless device 915 described with reference to FIG. 9. The wireless device 1715 may also be or include a processor. The wireless device 1715 may include a receiver module 1710, a wireless communication management module 1720, and/or a transmitter module 1730. Each of these modules may be in communication with each other.

The modules of the wireless device 1715 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1710 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1710 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1730 may include at least one RF transmitter, such as at least one RF transmitter operable to transmit over the licensed radio frequency spectrum band and/or the unlicensed radio frequency spectrum band. The transmitter module 1730 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1720 may be used to manage one or more aspects of wireless communication for the wireless device 1715. In some examples, the wireless communication management module 1720 may include a scheduling request (SR) generation module 1735.

In some examples, the SR generation module 1735 may be used to modulate a reference signal based on a determination that the wireless device 1715 has uplink data to transmit. The modulated reference signal may indicate a scheduling request for a base station.

In some examples, the wireless communication management module 1720 may be used to transmit the modulated reference signal over an unlicensed radio frequency spectrum band.

Figure 18:
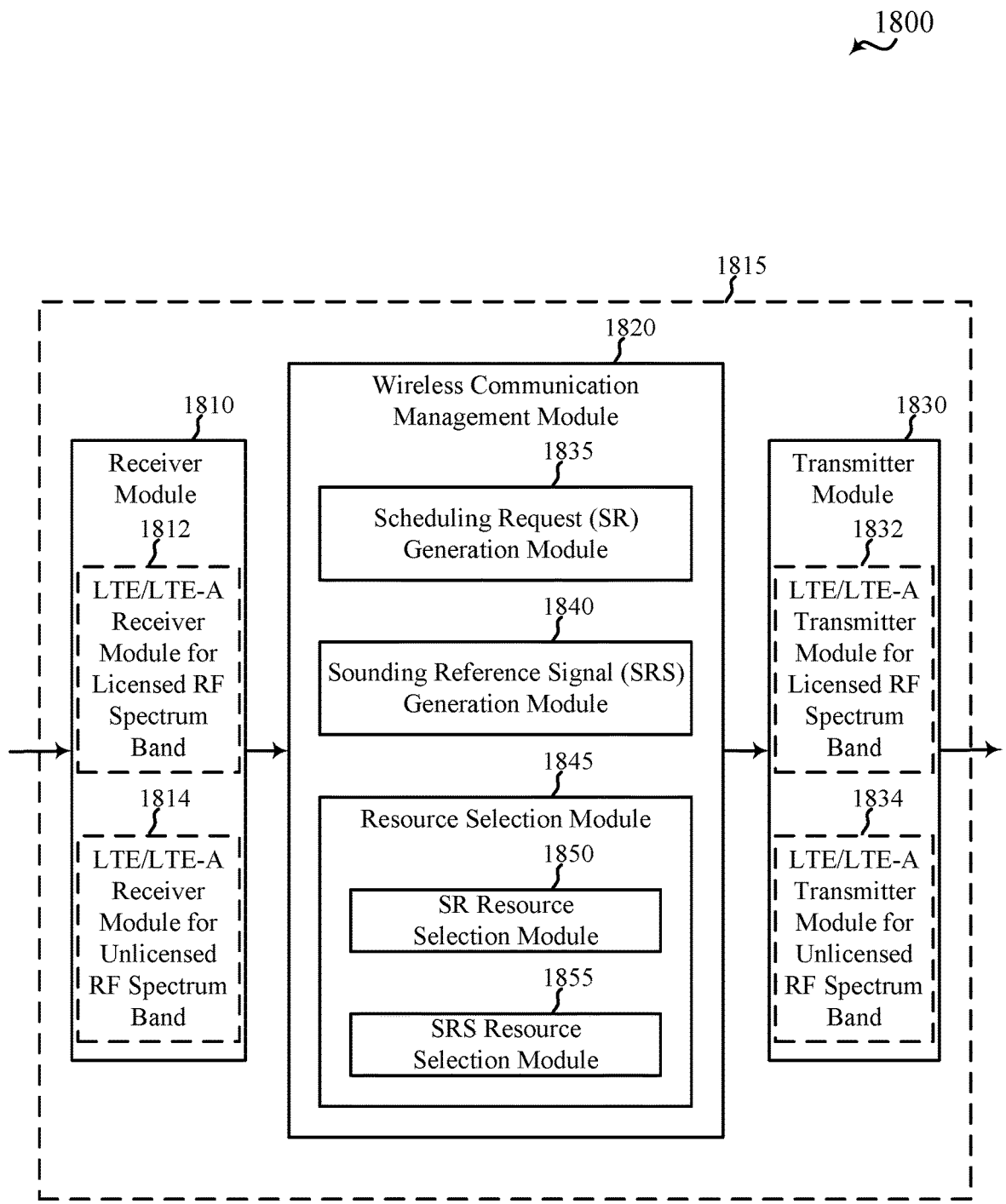
FIG. 18 shows a block diagram of a wireless device for use in wireless; communication, in accordance with various aspects of the present disclosure.

FIG. 18 shows a block diagram 1800 of a wireless device 1815 for use in wireless communication, in accordance with various aspects of the present disclosure. The wireless device 1815 may be an example of aspects of one or more of the UEs 115, 215, 216, 217, and/or 218 described with reference to FIGS. 1 and/or 2, and/or aspects of one or more of the wireless devices 915 and/or 1715 described with reference to FIGS. 9 and/or 17. The wireless device 1815 may also be or include a processor. The wireless device 1815 may include a receiver module 1810, a wireless communication management module 1820, and/or a transmitter module 1830. Each of these modules may be in communication with each other.

The modules of the wireless device 1815 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1810 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1810 may in some cases include separate receivers for the licensed radio frequency spectrum band and the unlicensed radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 1812), and an LTE/LTE-A receiver module for communicating over the unlicensed radio frequency spectrum band (e.g., LTE/LTE-A receiver module for unlicensed RF spectrum band 1814). The receiver module 1810, including the LTE/LTE-A receiver module for licensed RF spectrum band 1812 and/or the LTE/LTE-A receiver module for unlicensed RF spectrum band 1814, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1830 may include at least one RF transmitter, such as at least one RF transmitter operable to transmit over the licensed radio frequency spectrum band and/or the unlicensed radio frequency spectrum band. The transmitter module 1830 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 1832), and an LTE/LTE-A transmitter module for communicating over the unlicensed radio frequency spectrum band (e.g., LTE/LTE-A transmitter module for unlicensed RF spectrum band 1834). The transmitter module 1830, including the LTE/LTE-A transmitter module for licensed RF spectrum band 1832 and/or the LTE/LTE-A transmitter module for unlicensed RF spectrum band 1834, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1820 may be used to manage one or more aspects of wireless communication for the wireless device 1815. In some examples, the wireless communication management module 1820 may include a scheduling request (SR) generation module 1835, a sounding reference signal (SRS) generation module 1840, and/or a resource selection module 1845. Each of these modules may be in communication with each other.

In some examples, the SR generation module 1835 may be used to modulate a reference signal based on a determination that the wireless device 1815 has uplink data to transmit. The modulated reference signal may indicate a scheduling request for a base station. In some examples, modulating the reference signal may include modifying a polarity of the reference signal to indicate the scheduling request.

In some examples, the SRS generation module 1840 may be used to generate an SRS.

In some examples, the resource selection module 1845 may be used to select resources for transmitting the modulated reference signal and/or the SRS over an unlicensed radio frequency spectrum band. In some examples, the resource selection module 1845 may include an SR resource selection module 1850 and/or an SRS resource selection module 1855. In some examples, the SR resource selection module 1850 may be used to select an interlace of a component carrier of the unlicensed radio frequency spectrum band for transmitting the modulated reference signal. The interlace of the component carrier may include a plurality of non-contiguous concurrent resource blocks. In some examples, the interlace may span a majority of a bandwidth of the component carrier of the unlicensed radio frequency spectrum band. In some examples, the SR resource selection module 1850 may select a single symbol (e.g., a single OFDM symbol) in which to transmit the modulated reference signal.

In some examples, the SRS resource selection module 1855 may select resources for transmitting the SRS concurrently with the modulated reference signal.

Figure 19:
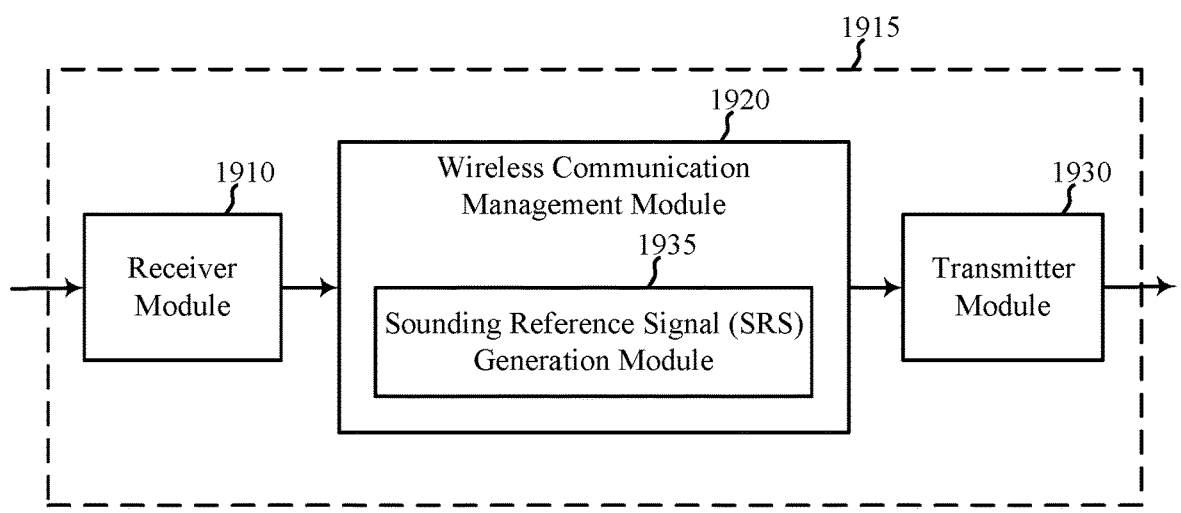
FIG. 19 shows a block diagram of a wireless device for use in wireless communication, in accordance with various aspects of the present disclosure.

FIG. 19 shows a block diagram 1900 of a wireless device 1915 for use in wireless communication, in accordance with various aspects of the present disclosure. The wireless device 1915 may be an example of aspects of one or more of the UEs 115, 215, 216, 217, and/or 218 described with reference to FIGS. 1 and/or 2, and/or aspects of the wireless device 915 described with reference to FIG. 9. The wireless device 1915 may also be or include a processor. The wireless device 1915 may include a receiver module 1910, a wireless communication management module 1920, and/or a transmitter module 1930. Each of these modules may be in communication with each other.

The modules of the wireless device 1915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1910 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1910 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1930 may include at least one RF transmitter, such as at least one RF transmitter operable to transmit over the licensed radio frequency spectrum band and/or the unlicensed radio frequency spectrum band. The transmitter module 1930 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1920 may be used to manage one or more aspects of wireless communication for the wireless device 1915. In some examples, the wireless communication management module 1920 may include a sounding reference signal (SRS) generation module 1935.

In some examples, the SRS generation module 1935 may be used to generate an SRS.

In some examples, the wireless communication management module 1920 may be used to transmit the SRS over an interlace of a component carrier of an unlicensed radio frequency spectrum band. The interlace may include a plurality of non-contiguous concurrent resource blocks in the unlicensed radio frequency spectrum band. In some examples, the interlace may span a majority of a bandwidth of the component carrier of the unlicensed radio frequency spectrum band. In some examples, the wireless communication management module 1920 may select a single symbol (e.g., a single OFDM symbol) in which to transmit the SRS.

In some examples, the wireless communication management module 1920 may transmit the SRS concurrently with a modulated reference signal. In some examples, the modulated reference signal may indicate a scheduling request for a base station.

Figure 20:
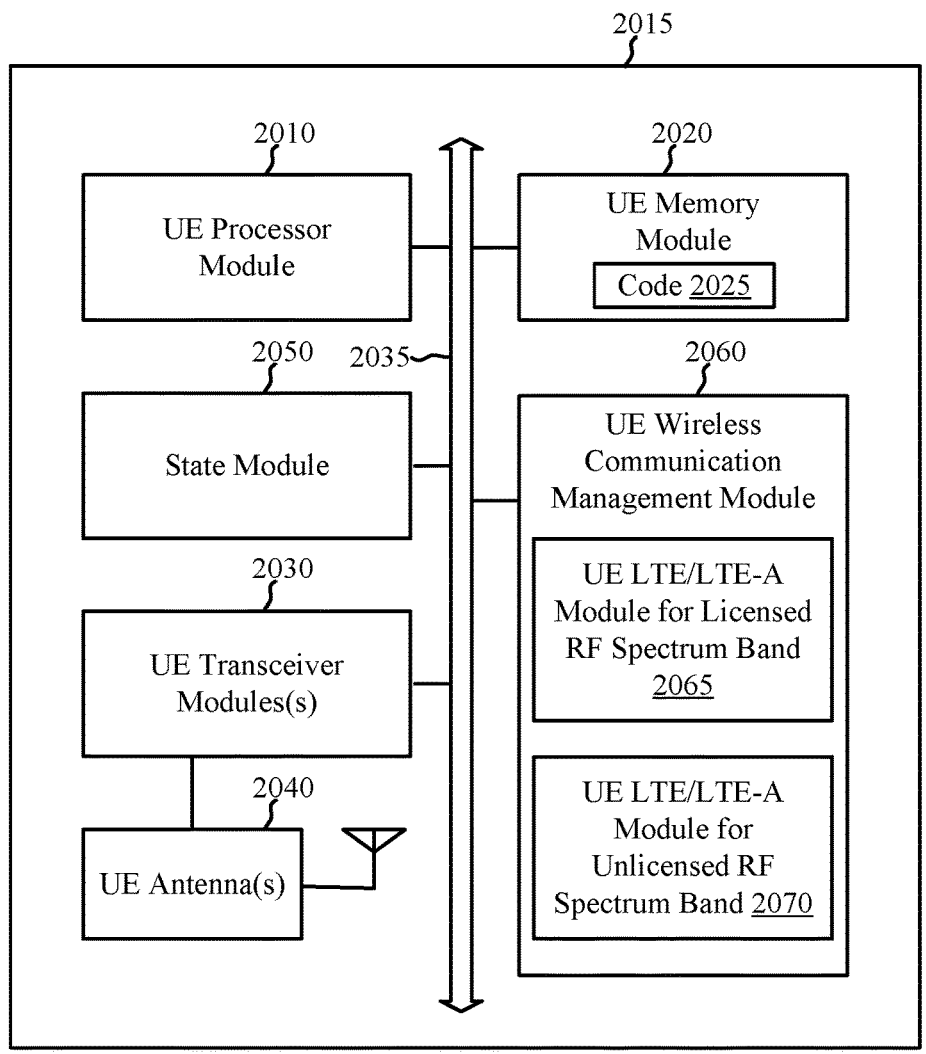
FIG. 20 shows a block diagram of a UE for use in wireless communication, in accordance with various aspects of the present disclosure.

FIG. 20 shows a block diagram 2000 of a UE 2015 for use in wireless communication, in accordance with various aspects of the present disclosure. The UE 2015 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 2015 may, in some examples, have an internal power supply (not shown), such as a small battery, to facilitate mobile operation. In some examples, the UE 2015 may be an example of aspects of one or more of the UE 115, 215, 216, 217, and/or 218 described with reference to FIGS. 1 and/or 2, and/or aspects of one or more of the wireless devices 915, 1015, 1115, 1215, 1315, 1415, 1515, 1615, 1715, 1815, and/or 1915 described with reference to FIGS. 9, 10, 11, 12, 13, 14, 15, 16, 17, 18, and/or 19. The UE 2015 may be configured to implement at least some of the UE and/or wireless device features and functions described with reference to FIGS. 1, 2, 3, 4, 5, 6, 7, 8, 9, 10, 11, 12, 13, 14, 15, 16, 17, 18, and/or 19.

The UE 2015 may include a UE processor module 2010, a UE memory module 2020, at least one UE transceiver module (represented by UE transceiver module(s) 2030), at least one UE antenna (represented by UE antenna(s) 2040), and/or a UE wireless communication management module 2060. Each of these components may be in communication with each other, directly or indirectly, over one or more buses 2035.

The UE memory module 2020 may include random access memory (RAM) and/or read-only memory (ROM). The UE memory module 2020 may store computer-readable, computer-executable code 2025 containing instructions that are configured to, when executed, cause the UE processor module 2010 to perform various functions described herein related to wireless communication. Alternatively, the code 2025 may not be directly executable by the UE processor module 2010 but be configured to cause the UE 2015 (e.g., when compiled and executed) to perform various of the functions described herein.

The UE processor module 2010 may include an intelligent hardware device, e.g., a central processing unit (CPU), a microcontroller, an ASIC, etc. The UE processor module 2010 may process information received through the UE transceiver module(s) 2030 and/or information to be sent to the UE transceiver module(s) 2030 for transmission through the UE antenna(s) 2040. The UE processor module 2010 may handle, alone or in connection with the UE wireless communication management module 2060, various aspects of communicating over (or managing communications over) a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use).

The UE transceiver module(s) 2030 may include a modem configured to modulate packets and provide the modulated packets to the UE antenna(s) 2040 for transmission, and to demodulate packets received from the UE antenna(s) 2040. The UE transceiver module(s) 2030 may, in some examples, be implemented as one or more UE transmitter modules and one or more separate UE receiver modules. The UE transceiver module(s) 2030 may support communications in the licensed radio frequency spectrum band and/or the unlicensed radio frequency spectrum band. The UE transceiver module(s) 2030 may be configured to communicate bi-directionally, via the UE antenna(s) 2040, with one or more of the base stations 105, 205, and/or 206 described with reference to FIGS. 1 and/or 2. While the UE 2015 may include a single UE antenna, there may be examples in which the UE 2015 may include multiple UE antennas 2040.

The UE state module 2050 may be used, for example, to manage transitions of the UE 2015 between an RRC idle state and an RRC connected state, and may be in communication with other components of the UE 2015, directly or indirectly, over the one or more buses 2035. The UE state module 2050, or portions of it, may include a processor, and/or some or all of the functions of the UE state module 2050 may be performed by the UE processor module 2010 and/or in connection with the UE processor module 2010.

The UE transceiver module(s) 2030 and the UE wireless communication management module 2060 may be configured to perform and/or control some or all of the UE and/or wireless device features and/or functions described with reference to FIGS. 1, 2, 3, 4, 5, 6, 7, 8, 9, 10, 11, 12, 13, 14, 15, 16, 17, 18, and/or 19 related to wireless communication over a licensed radio frequency spectrum band and/or an unlicensed radio frequency spectrum band. For example, the UE wireless communication management module 2060 may be configured to support a supplemental downlink mode, a carrier aggregation mode, and/or a standalone mode using the licensed radio frequency spectrum band and/or the unlicensed radio frequency spectrum band. The UE wireless communication management module 2060 may include a UE LTE/LTE-A module for licensed RF spectrum band 2065 configured to handle LTE/LTE-A communications in the licensed radio frequency spectrum band, and a UE LTE/LTE-A module for unlicensed RF spectrum band 2070 configured to handle LTE/LTE-A communications in the unlicensed radio frequency spectrum band. The UE wireless communication management module 2060, or portions of it, may include a processor, and/or some or all of the functions of the UE wireless communication management module 2060 may be performed by the UE processor module 2010 and/or in connection with the UE processor module 2010. In some examples, the UE transceiver module(s) 2030 may be an example of the receiver module 910, 1010, 1110, 1210, 1310, 1410, 1510, 1610, 1710, 1810, and/or 1910, and/or UE transceiver module(s) 2030 may be an example of the transmitter module 930, 1030, 1130, 1230, 1330, 1430, 1530, 1630, 1730, 1830, and/or 1930 described with reference to FIGS. 9, 10, 11, 12, 13, 14, 15, 16, 17, 18, and/or 19. In some examples, the UE wireless communication management module 2060 may be an example of the wireless communication management module 920, 1020, 1120, 1220, 1320, 1420, 1520, 1620, 1720, 1820, and/or 1920 described with reference to FIGS. 9, 10, 11, 12, 13, 14, 15, 16, 17, 18, and/or 19.

Figure 21:
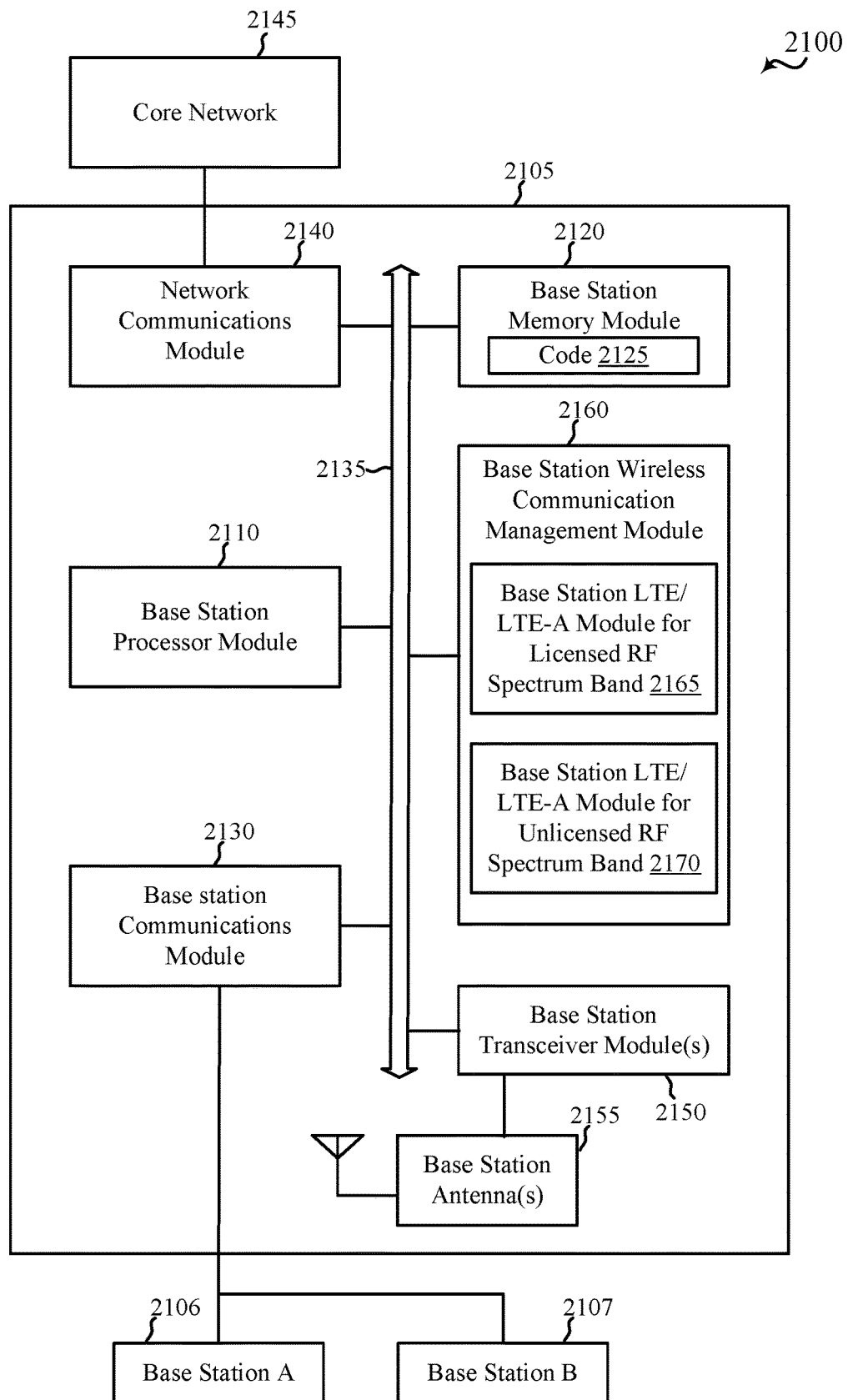
FIG. 21 shows a block diagram of a base station (e.g., a base station forming part or all of an eNB) for use in wireless communication, in accordance with various aspects of the present disclosure.

FIG. 21 shows a block diagram 2100 of a base station 2105 (e.g., a base station forming part or all of an eNB) for use in wireless communication, in accordance with various aspects of the present disclosure. In some examples, the base station 2105 may be an example of one or more aspects of the base station 105, 205, and/or 206 described with reference to FIGS. 1 and/or 2. The base station 2105 may be configured to implement or facilitate at least some of the base station features and functions described with reference to FIGS. 1, 2, 3, 4, 5, 6, 7, and/or 8.

The base station 2105 may include a base station processor module 2110, a base station memory module 2120, at least one base station transceiver module (represented by base station transceiver module(s) 2150), at least one base station antenna (represented by base station antenna(s) 2155), and/or a base station wireless communication management module 2160. The base station 2105 may also include one or more of a base station communications module 2130 and/or a network communications module 2140. Each of these components may be in communication with each other, directly or indirectly, over one or more buses 2135.

The base station memory module 2120 may include RAM and/or ROM. The base station memory module 2120 may store computer-readable, computer-executable code 2125 containing instructions that are configured to, when executed, cause the base station processor module 2110 to perform various functions described herein related to wireless communication. Alternatively, the code 2125 may not be directly executable by the base station processor module 2110 but be configured to cause the base station 2105 (e.g., when compiled and executed) to perform various of the functions described herein.

The base station processor module 2110 may include an intelligent hardware device, e.g., a CPU, a microcontroller, an ASIC, etc. The base station processor module 2110 may process information received through the base station transceiver module(s) 2150, the base station communications module 2130, and/or the network communications module 2140. The base station processor module 2110 may also process information to be sent to the transceiver module(s) 2150 for transmission through the antenna(s) 2155, to the base station communications module 2130, for transmission to one or more other base stations 2106 and 2107, and/or to the network communications module 2140 for transmission to a core network 2145, which may be an example of one or more aspects of the core network 130 described with reference to FIG. 1. The base station processor module 2110 may handle, alone or in connection with the base station wireless communication management module 2160, various aspects of communicating over (or managing communications over) a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use).

The base station transceiver module(s) 2150 may include a modem configured to modulate packets and provide the modulated packets to the base station antenna(s) 2155 for transmission, and to demodulate packets received from the base station antenna(s) 2155. The base station transceiver module(s) 2150 may, in some examples, be implemented as one or more base station transmitter modules and one or more separate base station receiver modules. The base station transceiver module(s) 2150 may support communications in the licensed radio frequency spectrum band and/or the unlicensed radio frequency spectrum band. The base station transceiver module(s) 2150 may be configured to communicate bi-directionally, via the antenna(s) 2155, with one or more UEs and/or wireless devices, such as one or more of the UEs 115, 215, 216, 217, 218, and/or 2015 described with reference to FIGS. 1, 2, and/or 20, and/or one or more of the wireless devices 915, 1015, 1115, 1215, 1315, 1415, 1515, 1615, 1715, 1815, and/or 1915 described with reference to FIGS. 9, 10, 11, 12, 13, 14, 15, 16, 17, 18, and/or 19. The base station 2105 may, for example, include multiple base station antennas 2155 (e.g., an antenna array). The base station 2105 may communicate with the core network 2145 through the network communications module 2140. The base station 2105 may also communicate with other base stations, such as the base stations 2106 and 2107, using the base station communications module 2130.

The base station wireless communication management module 2160 may be configured to perform and/or control some or all of the features and/or functions described with reference to FIGS. 1, 2, 3, 4, 5, 6, 7, and/or 8 related to wireless communication over a licensed radio frequency spectrum band and/or an unlicensed radio frequency spectrum band. For example, the base station wireless communication management module 2160 may be configured to support a supplemental downlink mode, a carrier aggregation mode, and/or a standalone mode using the licensed radio frequency spectrum band and/or the unlicensed radio frequency spectrum band. The base station wireless communication management module 2160 may include a base station LTE/LTE-A module for licensed RF spectrum band 2165 configured to handle LTE/LTE-A communications in the licensed radio frequency spectrum band, and a base station LTE/LTE-A module for unlicensed RF spectrum band 2170 configured to handle LTE/LTE-A communications in the unlicensed radio frequency spectrum band. The base station wireless communication management module 2160, or portions of it, may include a processor, and/or some or all of the functions of the base station wireless communication management module 2160 may be performed by the base station processor module 2110 and/or in connection with the base station processor module 2110.

Figure 22:
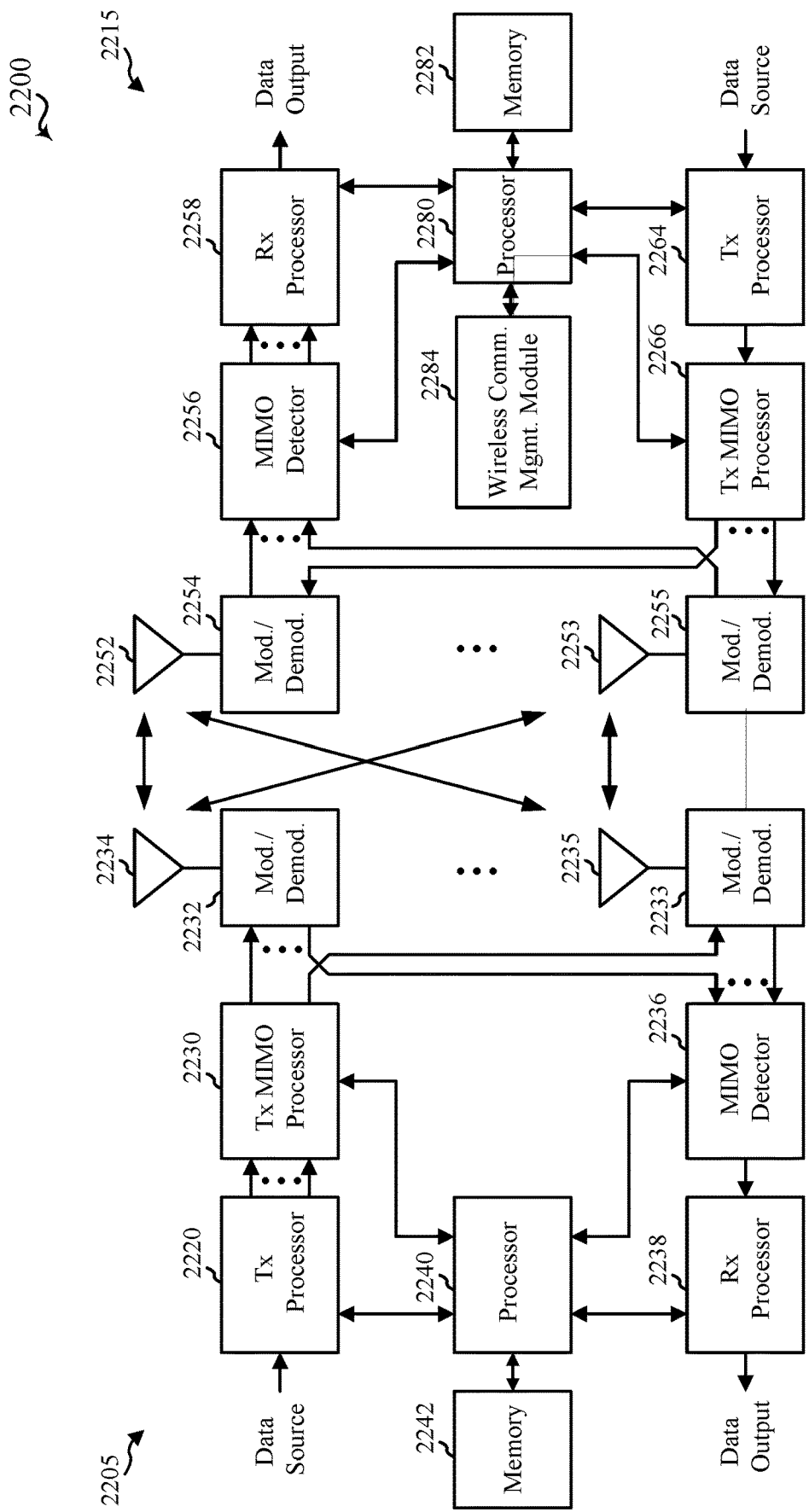
FIG. 22 is a block diagram of a multiple input/multiple output (MIMO) communication system including a base station and a UE, in accordance with various aspects of the present disclosure.

FIG. 22 is a block diagram of a multiple input/multiple output (MIMO) communication system 2200 including a base station 2205 and a UE 2215, in accordance with various aspects of the present disclosure. The MIMO communication system 2200 may illustrate aspects of the wireless communication system 100 and/or 200 shown in FIGS. 100 and/or 200 described with reference to FIGS. 1 and/or 2. The base station 2205 may be equipped with antennas 2234 through 2235, and the UE 2215 may be equipped with antennas 2252 through 2253. In the MIMO communication system 2200, the base station 2205 may be able to send data over multiple communication links at the same time. Each communication link may be called a "layer" and the "rank" of the communication link may indicate the number of layers used for communication. For example, in a 2×2 MIMO communications system where base station 2205 transmits two "layers," the rank of the communication link between the base station 2205 and the UE 2215 is two.

At the base station 2205, a transmit (Tx) processor 2220 may receive data from a data source. The transmit processor 2220 may process the data. The transmit processor 2220 may also generate control symbols and/or reference symbols. A transmit (Tx) MIMO processor 2230 may perform spatial processing (e.g., precoding) on data symbols, control symbols, and/or reference symbols, if applicable, and may provide output symbol streams to the modulator/demodulator (Mod./Demod.) modules 2232 through 2233. Each modulator/demodulator module 2232 through 2233 may process a respective output symbol stream (e.g., for OFDM, etc.) to obtain an output sample stream. Each modulator/demodulator module 2232 through 2233 may further process (e.g., convert to analog, amplify, filter, and upconvert) the output sample stream to obtain a DL signal. In one example, DL signals from modulator/demodulator modules 2232 through 2233 may be transmitted via the antennas 2234 through 2235, respectively.

At the UE 2215, the UE antennas 2252 through 2253 may receive the DL signals from the base station 2205 and may provide the received signals to the modulator/demodulator modules 2254 through 2255, respectively. Each modulator/demodulator module 2254 through 2255 may condition (e.g., filter, amplify, downconvert, and digitize) a respective received signal to obtain input samples. Each modulator/demodulator module 2254 through 2255 may further process the input samples (e.g., for OFDM, etc.) to obtain received symbols. A MIMO detector 2256 may obtain received symbols from all the modulator/demodulator modules 2254 through 2255, perform MIMO detection on the received symbols, if applicable, and provide detected symbols. A receive (Rx) processor 2258 may process (e.g., demodulate, deinterleave, and decode) the detected symbols, providing decoded data for the UE 2215 to a data output, and provide decoded control information to a processor 2280, or memory 2282.

The processor 2280 may in some cases execute stored instructions to instantiate a wireless communication management module 2284. The wireless communication management module 2284 may be an example of aspects of the wireless communication management module 2284 described with reference to FIGS. 9, 10, 11, 12, 13, 14, 15, 16, 17, 18, 19, and/or 20.

On the uplink (UL), at the UE 2215, a transmit processor 2264 may receive and process data from a data source. The transmit processor 2264 may also generate reference symbols for a reference signal. The symbols from the transmit processor 2264 may be precoded by a transmit MIMO processor 2266 if applicable, further processed by the modulator/demodulator modules 2254 through 2255 (e.g., for SC-FDMA, etc.), and be transmitted to the base station 2205 in accordance with the transmission parameters received from the base station 2205. At the base station 2205, the UL signals from the UE 2215 may be received by the antennas 2234 through 2235, processed by the modulator/demodulator modules 2232 through 2233, detected by a MIMO detector 2236 if applicable, and further processed by a receive processor 2238. The receive processor 2238 may provide decoded data to a data output and to the processor 2240 and/or memory 2242.

The components of the UE 2215 may, individually or collectively, be implemented with one or more ASICs adapted to perform some or all of the applicable functions in hardware. Each of the noted modules may be a means for performing one or more functions related to operation of the MIMO communication system 2200. Similarly, the components of the base station 2205 may, individually or collectively, be implemented with one or more ASICs adapted to perform some or all of the applicable functions in hardware. Each of the noted components may be a means for performing one or more functions related to operation of the MIMO communication system 2200.

Figure 23:
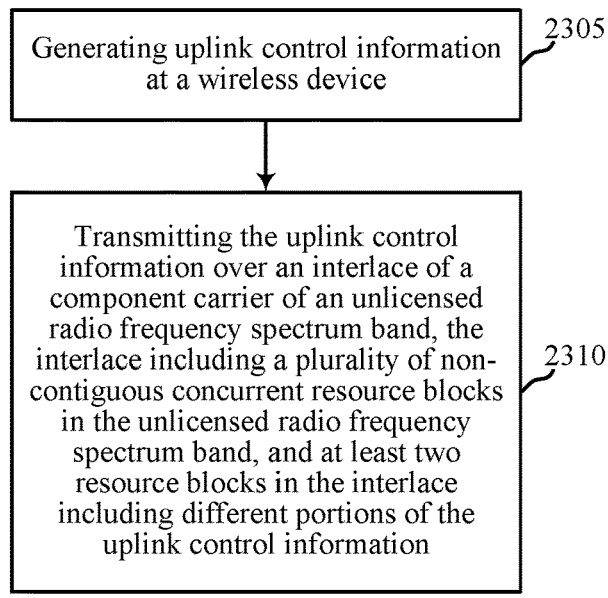
FIG. 23 is a flow chart illustrating an example of a method for wireless communication, in accordance with various aspects of the present disclosure.

FIG. 23 is a flow chart illustrating an example of a method 2300 for wireless communication, in accordance with various aspects of the present disclosure. For clarity, the method 2300 is described below with reference to aspects of one or more of the UEs 115, 215, 216, 217, 218, 2015, and/or 2215 described with reference to FIGS. 1, 2, 20, and/or 22, and/or aspects of one or more of the wireless devices 915, 1015, and/or 1115 described with reference to FIGS. 9, 10, and/or 11. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 2305, the method 2300 may include generating uplink control information at a wireless device. The operation(s) at block 2305 may be performed using the wireless communication management module 920, 1020, 1120, 2060, and/or 2284 described with reference to FIGS. 9, 10, 11, 20, and/or 22, and/or the UCI generation module 1035 and/or 1135 described with reference to FIGS. 10 and/or 11.

At block 2310, the method 2300 may include transmitting the uplink control information over an interlace of a component carrier of an unlicensed radio frequency spectrum band. The interlace may include a plurality of non-contiguous concurrent resource blocks in the unlicensed radio frequency spectrum band. At least two resource blocks in the interlace may include different portions of the uplink control information. In some examples, the unlicensed radio frequency spectrum band may include a radio frequency spectrum band for which apparatuses may need to contend for access because the radio frequency spectrum band is available for unlicensed use, such as Wi-Fi use. The operation(s) at block 2310 may be performed using the wireless communication management module 920, 1020, 1120, 2060, and/or 2284 described with reference to FIGS. 9, 10, 11, 20, and/or 22, the UCI resource selection module 1040 and/or 1140 described with reference to FIGS. 10 and/or 11, the transmitter module 930, 1030, and/or 1130 described with reference to FIGS. 9, 10, and/or 11, and/or the UE transceiver module(s) 2030 and UE antenna(s) 2040 described with reference to FIG. 20.

Thus, the method 2300 may provide for wireless communication. It should be noted that the method 2300 is just one implementation and that the operations of the method 2300 may be rearranged or otherwise modified such that other implementations are possible.

Figure 24:
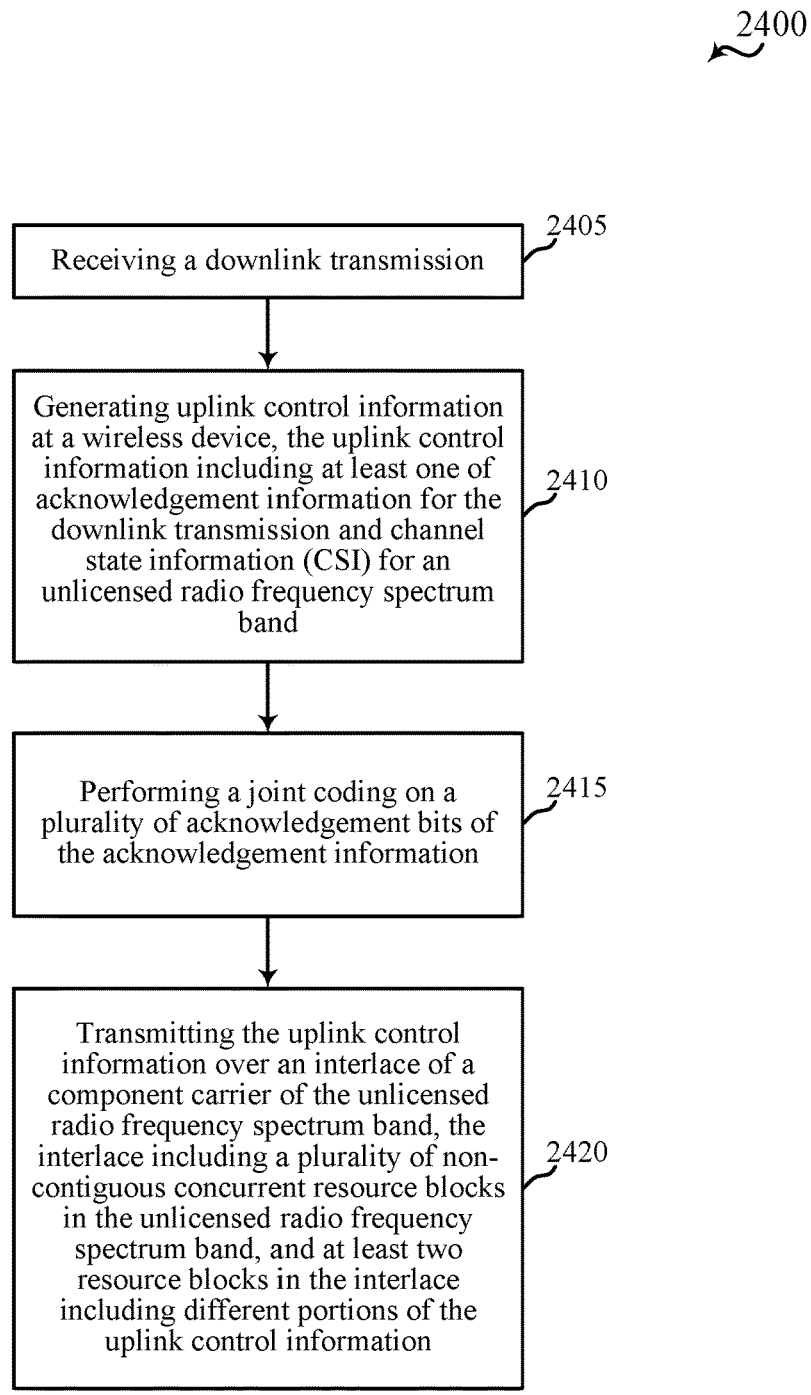
FIG. 24 is a flow chart illustrating an example of a method for wireless communication, in accordance with various aspects of the present disclosure.

FIG. 24 is a flow chart illustrating an example of a method 2400 for wireless communication, in accordance with various aspects of the present disclosure. For clarity, the method 2400 is described below with reference to aspects of one or more of the UEs 115, 215, 216, 217, 218, 2015, and/or 2215 described with reference to FIGS. 1, 2, 20, and/or 22, and/or aspects of one or more of the wireless devices 915, 1015, and/or 1115 described with reference to FIGS. 9, 10, and/or 11. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 2405, the method 2400 may include receiving a downlink transmission (e.g., at a wireless device). The operation(s) at block 2405 may be performed using the receiver module 910, 1010, and/or 1110 described with reference to FIGS. 9, 10, and/or 11, the transceiver module(s) 2030 and antenna(s) 2040 described with reference to FIG. 20, and/or the wireless communication management module 920, 1020, 1120, 2060, and/or 2284 described with reference to FIGS. 9, 10, 11, 20, and/or 22.

At block 2410, the method 2400 may include generating uplink control information at the wireless device. In some examples, generating the uplink control information may include generating acknowledgement information (e.g., ACK and/or NAK information) for the downlink transmission and/or generating CSI for an unlicensed radio frequency spectrum band. In some examples, the unlicensed radio frequency spectrum band may include a radio frequency spectrum band for which apparatuses may need to contend for access because the radio frequency spectrum band is available for unlicensed use, such as Wi-Fi use. The operation(s) at block 2410 may be performed using the wireless communication management module 920, 1020, 1120, 2060, and/or 2284 described with reference to FIGS. 9, 10, 11, 20, and/or 22, the UCI generation module 1035 and/or 1135 described with reference to FIGS. 10 and/or 11, and/or the ACK generation module 1145 and/or CSI generation module 1150 described with reference to FIG. 11.

In some examples of the method 2400, generated acknowledgement information may include code block level acknowledgement information for an individual code block of the downlink transmission and/or a group of code blocks of the downlink transmission. In some examples, the acknowledgement information may include code block level acknowledgement information for each of a number of individual code blocks of the downlink transmission and/or each of a number of groups of code blocks of the downlink transmission. In some examples of the method 2400, generated acknowledgement information may include transport block level acknowledgement information for an individual transport block of the downlink transmission and/or a group of transport blocks of the downlink transmission. In some examples, the acknowledgement information may include transport block level acknowledgement information for each of a number of individual transport blocks of the downlink transmission and/or each of a number of groups of transport blocks of the downlink transmission. Code block level acknowledgement information may be generated by the code block ACK module 1155, and transport block level acknowledgement information may be generated by the transport block ACK module 1160.

At block 2415, and in some examples, the method 2400 may include performing a joint coding on a plurality of acknowledgement bits of acknowledgement information, where in some examples the joint coding may be a joint convolutional coding. The operation(s) at block 2415 may be performed using the wireless communication management module 920, 1020, 1120, 2060, and/or 2284 described with reference to FIGS. 9, 10, 11, 20, and/or 22, the UCI generation module 1035 and/or 1135 described with reference to FIGS. 10 and/or 11, and/or the joint coding module 1165 described with reference to FIG. 11.

At block 2420, the method 2400 may include transmitting the uplink control information over an interlace of a component carrier of the unlicensed radio frequency spectrum band. The interlace may include a plurality of non-contiguous concurrent resource blocks in the unlicensed radio frequency spectrum band. At least two resource blocks in the interlace may include different portions of the uplink control information. The operation(s) at block 2420 may be performed using the wireless communication management module 920, 1020, 1120, 2060, and/or 2284 described with reference to FIGS. 9, 10, 11, 20, and/or 22, the UCI resource selection module 1040 and/or 1140 described with reference to FIGS. 10 and/or 11, the transmitter module 930, 1030, and/or 1130 described with reference to FIGS. 9, 10, and/or 11, and/or the UE transceiver module(s) 2030 and UE antenna(s) 2040 described with reference to FIG. 20.

In some examples of the method 2400, the plurality of non-contiguous concurrent resource blocks of the interlace may be spaced in frequency according to a uniform spreading pattern. In some examples, the plurality of non-contiguous concurrent resource blocks of the interlace may be distributed in frequency according to a non-uniform spreading pattern. In some examples, the uplink control information may be transmitted according to a PUCCH format, such as format 1, format 1a, format 1b, format 2, format 2a, format 2b, and/or format 3. In some examples, the uplink control information may be transmitted according to a PUCCH format from a group consisting of format 1a, format 1b, format 2, and format 3.

In examples of the method 2400 in which a joint convolutional coding is performed on a plurality of acknowledgement bits of acknowledgement information, transmitting the uplink control information over the interlace at block 2420 may include transmitting a different portion of the jointly coded acknowledgement bits over each resource block of the interlace.

Thus, the method 2400 may provide for wireless communication. It should be noted that the method 2400 is just one implementation and that the operations of the method 2400 may be rearranged or otherwise modified such that other implementations are possible.

Figure 25:
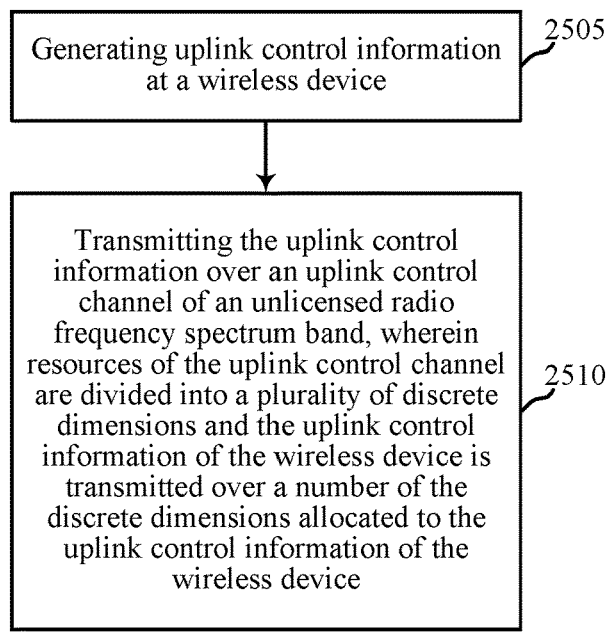
FIG. 25 is a flow chart illustrating an example of a method for wireless communication, in accordance with various aspects of the present disclosure.

FIG. 25 is a flow chart illustrating an example of a method 2500 for wireless communication, in accordance with various aspects of the present disclosure. For clarity, the method 2500 is described below with reference to aspects of one or more of the UEs 115, 215, 216, 217, 218, 2015, and/or 2215 described with reference to FIGS. 1, 2, 20, and/or 22, and/or aspects of one or more of the wireless devices 915, 1015, and/or 1215 described with reference to FIGS. 9, 10, and/or 12. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 2505, the method 2500 may include generating uplink control information at a wireless device. The operation(s) at block 2505 may be performed using the wireless communication management module 920, 1020, 1220, 2060, and/or 2284 described with reference to FIGS. 9, 10, 12, 20, and/or 22, and/or the UCI generation module 1035 and/or 1235 described with reference to FIGS. 10 and/or 12.

At block 2510, the method 2500 may include transmitting the uplink control information over an uplink control channel of an unlicensed radio frequency spectrum band. The resources of the uplink control channel may be divided into a plurality of discrete dimensions and the uplink control information of the wireless device may be transmitted over a number of the discrete dimensions allocated to the uplink control information of the wireless device. In some examples, the unlicensed radio frequency spectrum band may include a radio frequency spectrum band for which apparatuses may need to contend for access because the radio frequency spectrum band is available for unlicensed use, such as Wi-Fi use. The operation(s) at block 2510 may be performed using the wireless communication management module 920, 1020, 1220, 2060, and/or 2284 described with reference to FIGS. 9, 10, 12, 20, and/or 22, the UCI resource selection module 1040 and/or 1240 described with reference to FIGS. 10 and/or 12, the transmitter module 930, 1030, and/or 1230 described with reference to FIGS. 9, 10, and/or 12, and/or the UE transceiver module(s) 2030 and UE antenna(s) 2040 described with reference to FIG. 20.

Thus, the method 2500 may provide for wireless communication. It should be noted that the method 2500 is just one implementation and that the operations of the method 2500 may be rearranged or otherwise modified such that other implementations are possible.

Figure 26:
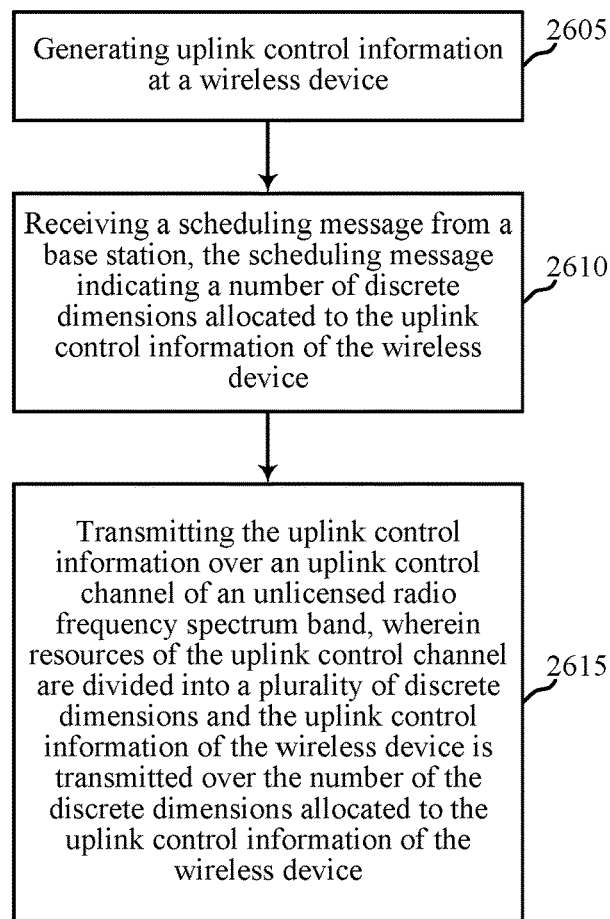
FIG. 26 is a flow chart illustrating an example of a method for wireless communication, in accordance with various aspects of the present disclosure.

FIG. 26 is a flow chart illustrating an example of a method 2600 for wireless communication, in accordance with various aspects of the present disclosure. For clarity, the method 2600 is described below with reference to aspects of one or more of the UEs 115, 215, 216, 217, 218, 2015, and/or 2215 described with reference to FIGS. 1, 2, 20, and/or 22, and/or aspects of one or more of the wireless devices 915, 1015, and/or 1215 described with reference to FIGS. 9, 10, and/or 12. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 2605, the method 2600 may include generating uplink control information at a wireless device. The operation(s) at block 2605 may be performed using the wireless communication management module 920, 1020, 1220, 2060, and/or 2284 described with reference to FIGS. 9, 10, 12, 20, and/or 22, and/or the UCI generation module 1035 and/or 1235 described with reference to FIGS. 10 and/or 12.

At block 2610, the method 2600 may include receiving a scheduling message from a base station (e.g., one of the base stations 105, 205, 206, 2105, and/or 2205 described with reference to FIGS. 1, 2, 21, and/or 22). The scheduling message may indicate a number of discrete dimensions (e.g., of the resources of an uplink control channel) allocated to the uplink control information of the wireless device. The number of the discrete dimensions allocated to the uplink control information of the wireless device may include one, some, or each of a plurality of discrete dimensions into which the resources of the uplink control channel are divided. In some examples, the number of the discrete dimensions allocated to the uplink control information of the wireless device may be based on a size of the uplink control information of the wireless device. The operation(s) at block 2610 may be performed using the receiver module 910, 1010, and/or 1210 described with reference to FIGS. 9, 10, and/or 12, the transceiver module(s) 2030 and antenna(s) 2040 described with reference to FIG. 20, and/or the wireless communication management module 920, 1020, 1220, 2060, and/or 2284 described with reference to FIGS. 9, 10, 12, 20, and/or 22.

At block 2615, the method 2600 may include transmitting the uplink control information over an uplink control channel of an unlicensed radio frequency spectrum band. The resources of the uplink control channel may be divided into the plurality of discrete dimensions and the uplink control information of the wireless device may be transmitted over the number of the discrete dimensions allocated to the uplink control information of the wireless device. In some examples, the unlicensed radio frequency spectrum band may include a radio frequency spectrum band for which apparatuses may need to contend for access because the radio frequency spectrum band is available for unlicensed use, such as Wi-Fi use. The operation(s) at block 2615 may be performed using the wireless communication management module 920, 1020, 1220, 2060, and/or 2284 described with reference to FIGS. 9, 10, 12, 20, and/or 22, the UCI resource selection module 1040 and/or 1240 described with reference to FIGS. 10 and/or 12, the transmitter module 930, 1030, and/or 1230 described with reference to FIGS. 9, 10, and/or 12, and/or the UE transceiver module(s) 2030 and UE antenna(s) 2040 described with reference to FIG. 20.

In some examples of the method 2600, the resources of the uplink control channel may include an interlace of a component carrier of the unlicensed radio frequency spectrum band. The interlace may include a plurality of non-contiguous concurrent resource blocks in the unlicensed radio frequency spectrum band. In some examples, the plurality of non-contiguous concurrent resource blocks of the interlace may be spaced in frequency according to a uniform spreading pattern. In some examples, the plurality of non-contiguous concurrent resource blocks of the interlace may be distributed in frequency according to a non-uniform spreading pattern. In some examples, the uplink control information may be transmitted according to a PUCCH format, such as format 1, format 1a, format 1b, format 2, format 2a, format 2b, and/or format 3. In some examples, the uplink control information may be transmitted according to a PUCCH format from a group consisting of format 1a, format 1b, format 2, and format 3.

In some examples of the method 2600, at least one of the number of the discrete dimensions allocated to the uplink control information of the wireless device may span multiple ones of the resource blocks of an interlace. In some examples, the resource blocks (e.g., of the interlace) may include different ones of the dimensions (e.g., time and/or frequency).

Thus, the method 2600 may provide for wireless communication. It should be noted that the method 2600 is just one implementation and that the operations of the method 2600 may be rearranged or otherwise modified such that other implementations are possible.

Figure 27:
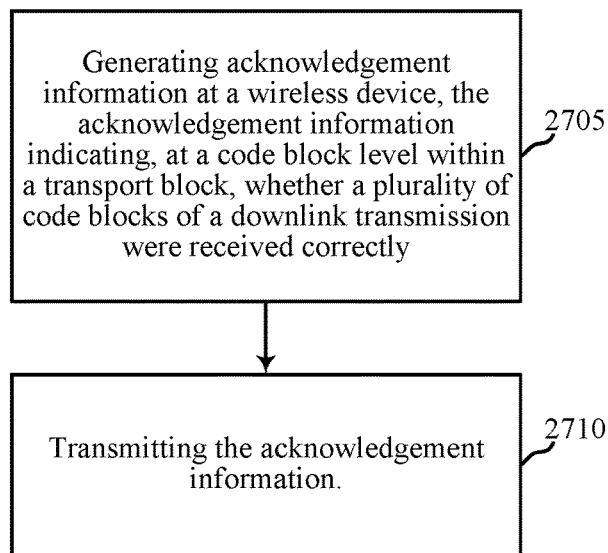
FIG. 27 is a flow chart illustrating an example of a method for wireless communication, in accordance with various aspects of the present disclosure.

FIG. 27 is a flow chart illustrating an example of a method 2700 for wireless communication, in accordance with various aspects of the present disclosure. For clarity, the method 2700 is described below with reference to aspects of one or more of the UEs 115, 215, 216, 217, 218, 2015, and/or 2215 described with reference to FIGS. 1, 2, 20, and/or 22, and/or aspects of one or more of the wireless devices 915, 1315, and/or 1415 described with reference to FIGS. 9, 13, and/or 14. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 2705, the method 2700 may include generating acknowledgement information at a wireless device. The acknowledgement information may indicate, at a code block level within a transport block, whether a plurality of code blocks of a downlink transmission were received correctly. The operation(s) at block 2705 may be performed using the wireless communication management module 920, 1320, 1420, 2060, and/or 2284 described with reference to FIGS. 9, 13, 14, 20, and/or 22, and/or the CB ACK generation module 1335 and/or 1435 described with reference to FIGS. 13 and/or 14.

At block 2710, the method 2700 may include transmitting the acknowledgement information. In some examples the acknowledgement information may be transmitted over an interlace of a component carrier of an unlicensed radio frequency spectrum band. In some examples, the unlicensed radio frequency spectrum band may include a radio frequency spectrum band for which apparatuses may need to contend for access because the radio frequency spectrum band is available for unlicensed use, such as Wi-Fi use. The operation(s) at block 2710 may be performed using the wireless communication management module 920, 1320, 1420, 2060, and/or 2284 described with reference to FIGS. 9, 13, 14, 20, and/or 22, the resource selection module 1340 and/or 1440 described with reference to FIGS. 13 and/or 14, the transmitter module 930, 1330, and/or 1430 described with reference to FIGS. 9, 13, and/or 14, and/or the UE transceiver module(s) 2030 and UE antenna(s) 2040 described with reference to FIG. 20.

Thus, the method 2700 may provide for wireless communication. It should be noted that the method 2700 is just one implementation and that the operations of the method 2700 may be rearranged or otherwise modified such that other implementations are possible.

Figure 28:
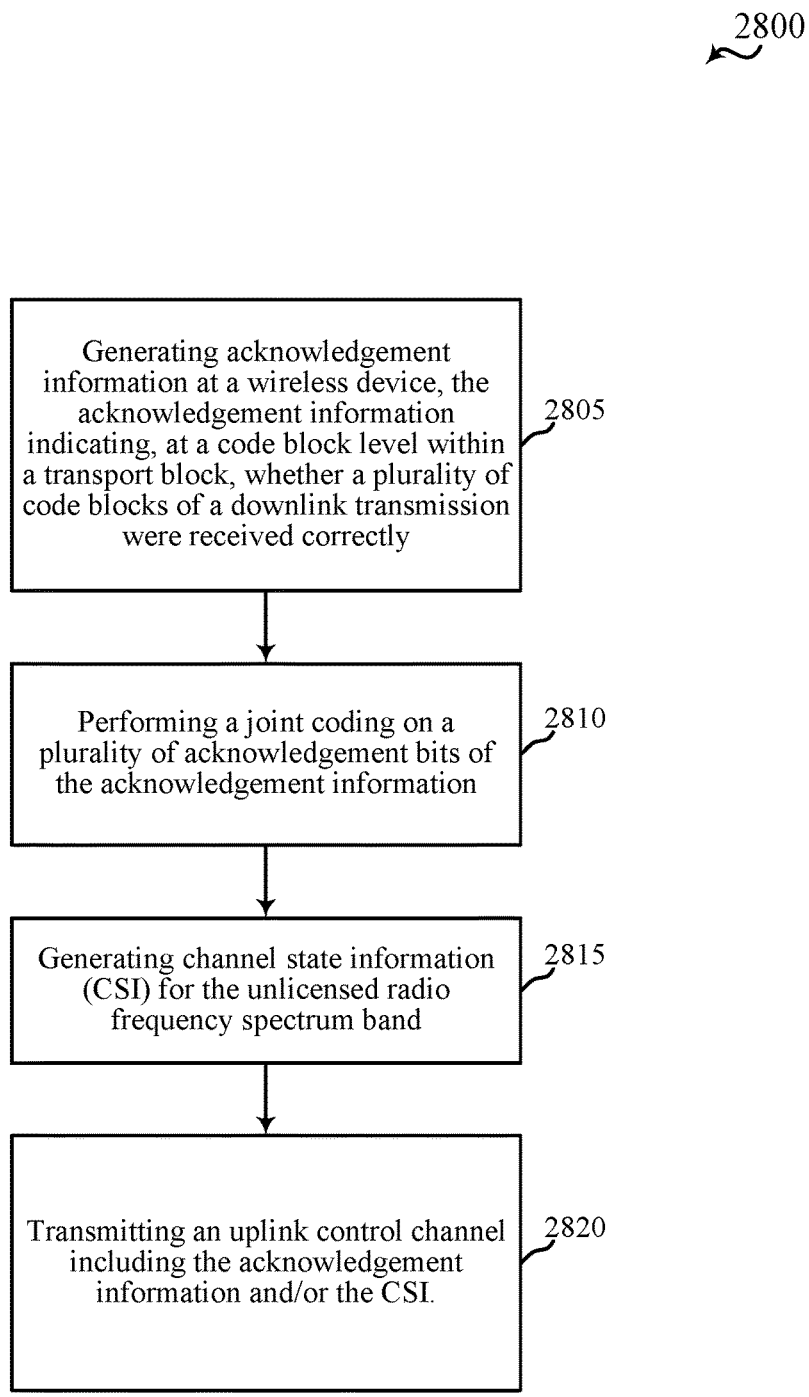
FIG. 28 is a flow chart illustrating an example of a method for wireless communication, in accordance with various aspects of the present disclosure.

FIG. 28 is a flow chart illustrating an example of a method 2800 for wireless communication, in accordance with various aspects of the present disclosure. For clarity, the method 2800 is described below with reference to aspects of one or more of the UEs 115, 215, 216, 217, 218, 2015, and/or 2215 described with reference to FIGS. 1, 2, 20, and/or 22, and/or aspects of one or more of the wireless devices 915, 1315, and/or 1415 described with reference to FIGS. 9, 13, and/or 14. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 2805, the method 2800 may include generating acknowledgement information at a wireless device. The acknowledgement information may indicate, at a code block level within a transport block, whether a plurality of code blocks of a downlink transmission were received correctly. The operation(s) at block 2805 may be performed using the wireless communication management module 920, 1320, 1420, 2060, and/or 2284 described with reference to FIGS. 9, 13, 14, 20, and/or 22, and/or the CB ACK generation module 1335 and/or 1435 described with reference to FIGS. 13 and/or 14.

In some examples of the method 2800, generated acknowledgement information may include a plurality of bits, with each bit indicating whether an individual code block of the downlink transmission was received correctly. In some examples, generated acknowledgement information may include at least one bit indicating whether a group of code blocks of the downlink transmission was received correctly. Individual code block level acknowledgement information may be generated by the individual CB ACK generation module 1445, and group code block level acknowledgement information may be generated by the group CB ACK generation module 1450.

At block 2810, and in some examples, the method 2800 may include performing a joint coding on a plurality of acknowledgement bits of the acknowledgement information, where in some examples the joint coding may be a joint convolutional coding. The operation(s) at block 2810 may be performed using the wireless communication management module 920, 1320, 1420, 2060, and/or 2284 described with reference to FIGS. 9, 13, 14, 20, and/or 22, the CB ACK generation module 1335 and/or 1435 described with reference to FIGS. 13 and/or 14, and/or the joint coding module 1455 described with reference to FIG. 14.

At block 2815, the method 2800 may include generating CSI for the unlicensed radio frequency spectrum band. The operation(s) at block 2815 may be performed using the wireless communication management module 920, 1320, 1420, 2060, and/or 2284 described with reference to FIGS. 9, 13, 14, 20, and/or 22.

At block 2820, the method 2800 may include transmitting an uplink control channel including the acknowledgement information and/or the CSI. In some examples the acknowledgement information and/or the CSI may be transmitted over an interlace of a component carrier of an unlicensed radio frequency spectrum band. In some examples, the interlace may include a plurality of non-contiguous concurrent resource blocks in the unlicensed radio frequency spectrum band. In some examples, the unlicensed radio frequency spectrum band may include a radio frequency spectrum band for which apparatuses may need to contend for access because the radio frequency spectrum band is available for unlicensed use, such as Wi-Fi use. The operation(s) at block 2820 may be performed using the wireless communication management module 920, 1320, 1420, 2060, and/or 2284 described with reference to FIGS. 9, 13, 14, 20, and/or 22, the resource selection module 1340 and/or 1440 described with reference to FIGS. 13 and/or 14, the transmitter module 930, 1330, and/or 1430 described with reference to FIGS. 9, 13, and/or 14, and/or the UE transceiver module(s) 2030 and UE antenna(s) 2040 described with reference to FIG. 20.

In some examples of the method 2800, transmitting the acknowledgement information (e.g., transmitting the uplink control channel including the acknowledgement information) over the interlace may include transmitting the acknowledgement information over a subset of the resource blocks of the interlace. In some examples of the method 2800, transmitting the acknowledgement information (e.g., transmitting the uplink control channel including the acknowledgement information) over the interlace may include transmitting different portions of the acknowledgement information over different subsets of the resource blocks of the interlace. In some examples of the method 2800, transmitting the acknowledgement information (e.g., transmitting the uplink control channel including the acknowledgement information) over the interlace may include transmitting the acknowledgement information over each of the resource blocks of the interlace.

In some examples of the method 2800, the plurality of non-contiguous concurrent resource blocks of the interlace may be spaced in frequency according to a uniform spreading pattern. In some examples, the plurality of non-contiguous concurrent resource blocks of the interlace may be distributed in frequency according to a non-uniform spreading pattern. In some examples, the acknowledgement information (e.g., the uplink control channel including the acknowledgement information) may be transmitted according to a PUCCH format, such as format 1, format 1a, format 1b, format 2, format 2a, format 2b, and/or format 3. In some examples, the acknowledgement information (e.g., the uplink control channel including the acknowledgement information) may be transmitted according to a PUCCH format from a group consisting of format 1a, format 1b, format 2, and format 3.

In examples of the method 2800 in which a joint convolutional coding is performed on a plurality of acknowledgement bits of the acknowledgement information, transmitting the acknowledgement information (e.g., the uplink control channel including the acknowledgement information) over the interlace at block 2820 may include transmitting a different portion of the jointly coded acknowledgement bits over each resource block of the interlace.

Thus, the method 2800 may provide for wireless communication. It should be noted that the method 2800 is just one implementation and that the operations of the method 2800 may be rearranged or otherwise modified such that other implementations are possible.

Figure 29:
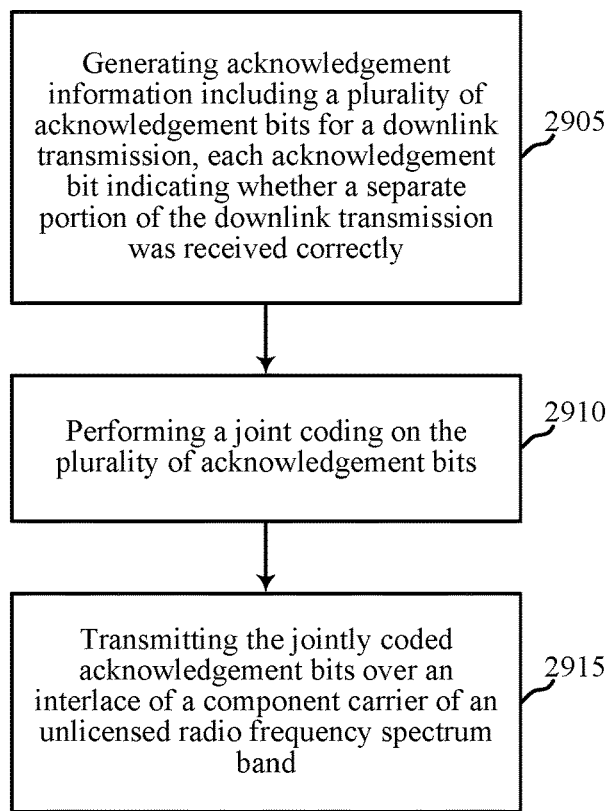
FIG. 29 is a flow chart illustrating an example of a method for wireless communication, in accordance with various aspects of the present disclosure.

FIG. 29 is a flow chart illustrating an example of a method 2900 for wireless communication, in accordance with various aspects of the present disclosure. For clarity, the method 2900 is described below with reference to aspects of one or more of the UEs 115, 215, 216, 217, 218, 2015, and/or 2215 described with reference to FIGS. 1, 2, 20, and/or 22, and/or aspects of one or more of the wireless devices 915, 1515, and/or 1615 described with reference to FIGS. 9, 15, and/or 16. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 2905, the method 2900 may include generating acknowledgement information including a plurality of acknowledgement bits for a downlink transmission. Each acknowledgement bit may indicate whether a separate portion of the downlink transmission was received correctly. The operation(s) at block 2905 may be performed using the wireless communication management module 920, 1520, 1620, 2060, and/or 2284 described with reference to FIGS. 9, 15, 16, 20, and/or 22, and/or the ACK generation module 1535 and/or 1635 described with reference to FIGS. 15 and/or 16.

At block 2910, the method 2900 may include performing a joint coding on the plurality of acknowledgement bits, where in some examples the joint coding may be a joint convolutional coding. The operation(s) at block 2910 may be performed using the wireless communication management module 920, 1520, 1620, 2060, and/or 2284 described with reference to FIGS. 9, 15, 16, 20, and/or 22, the ACK generation module 1535 and/or 1635 described with reference to FIGS. 15 and/or 16, and/or the joint coding module 1545 and/or 1655 described with reference to FIGS. 15 and/or 16.

At block 2915, the method 2900 may include transmitting the jointly coded acknowledgement bits over an interlace of a component carrier of an unlicensed radio frequency spectrum band. In some examples, the unlicensed radio frequency spectrum band may include a radio frequency spectrum band for which apparatuses may need to contend for access because the radio frequency spectrum band is available for unlicensed use, such as Wi-Fi use. The operation(s) at block 2915 may be performed using the wireless communication management module 920, 1520, 1620, 2060, and/or 2284 described with reference to FIGS. 9, 15, 16, 20, and/or 22, the resource selection module 1540 and/or 1640 described with reference to FIGS. 15 and/or 16, the transmitter module 930, 1530, and/or 1630 described with reference to FIGS. 9, 15, and/or 16, and/or the UE transceiver module(s) 2030 and UE antenna(s) 2040 described with reference to FIG. 20.

Thus, the method 2900 may provide for wireless communication. It should be noted that the method 2900 is just one implementation and that the operations of the method 2900 may be rearranged or otherwise modified such that other implementations are possible.

Figure 30:
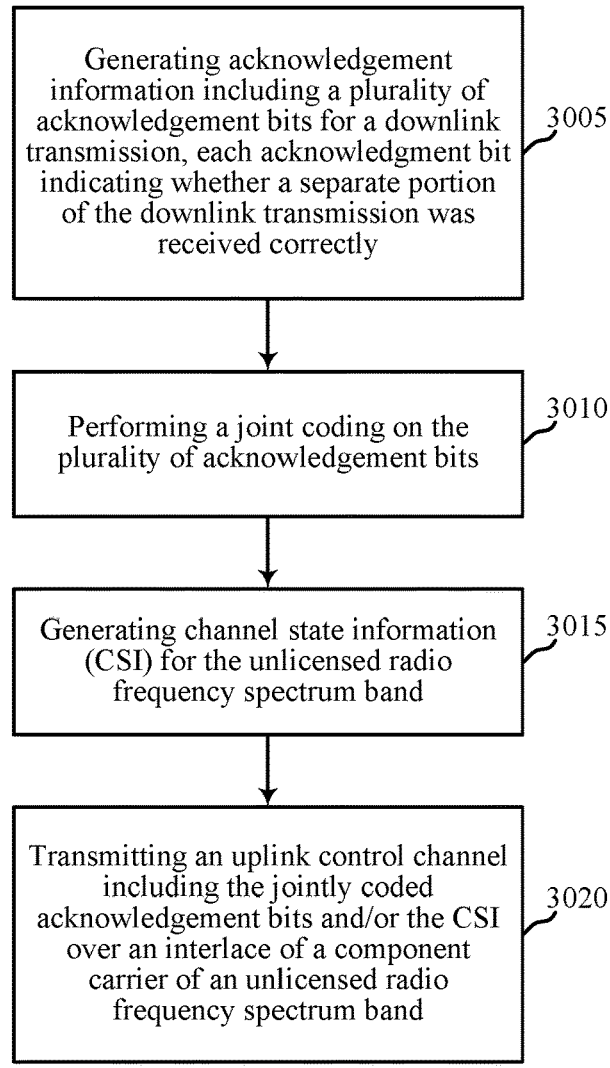
FIG. 30 is a flow chart illustrating an example of a method for wireless communication, in accordance with various aspects of the present disclosure.

FIG. 30 is a flow chart illustrating an example of a method 3000 for wireless communication, in accordance with various aspects of the present disclosure. For clarity, the method 3000 is described below with reference to aspects of one or more of the UEs 115, 215, 216, 217, 218, 2015, and/or 2215 described with reference to FIGS. 1, 2, 20, and/or 22, and/or aspects of one or more of the wireless devices 915, 1515, and/or 1615 described with reference to FIGS. 9, 15, and/or 16. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 3005, the method 3000 may include generating acknowledgement information including a plurality of acknowledgement bits for a downlink transmission. Each acknowledgement bit may indicate whether a separate portion of the downlink transmission was received correctly. In some examples, each separate portion of the downlink transmission may include a code block or a group of code blocks. In some examples, each separate portion of the downlink transmission may include a transport block or a group of transport blocks. In some examples of the method, each separate portion of the downlink transmission may include a group of code blocks across one or more transport blocks. The operation(s) at block 3005 may be performed using the wireless communication management module 920, 1520, 1620, 2060, and/or 2284 described with reference to FIGS. 9, 15, 16, 20, and/or 22, and/or the ACK generation module 1535 and/or 1635 described with reference to FIGS. 15 and/or 16.

At block 3010, the method 3000 may include performing a joint coding on the plurality of acknowledgement bits, where in some examples the joint coding may be a joint convolutional coding. The operation(s) at block 3010 may be performed using the wireless communication management module 920, 1520, 1620, 2060, and/or 2284 described with reference to FIGS. 9, 15, 16, 20, and/or 22, the ACK generation module 1535 and/or 1635 described with reference to FIGS. 15 and/or 16, and/or the joint coding module 1545 and/or 1655 described with reference to FIGS. 15 and/or 16.

At block 3015, the method 3000 may include generating CSI for an unlicensed radio frequency spectrum band. In some examples, the unlicensed radio frequency spectrum band may include a radio frequency spectrum band for which apparatuses may need to contend for access because the radio frequency spectrum band is available for unlicensed use, such as Wi-Fi use. The operation(s) at block 3015 may be performed using the wireless communication management module 920, 1520, 1620, 2060, and/or 2284 described with reference to FIGS. 9, 15, 16, 20, and/or 22.

At block 3020, the method 3000 may include transmitting an uplink control channel including the jointly coded acknowledgement bits and/or the CSI over an interlace of a component carrier of the unlicensed radio frequency spectrum band. In some examples, the interlace may include a plurality of non-contiguous resource blocks in the unlicensed radio frequency spectrum band. The operation(s) at block 3020 may be performed using the wireless communication management module 920, 1520, 1620, 2060, and/or 2284 described with reference to FIGS. 9, 15, 16, 20, and/or 22, the resource selection module 1540 and/or 1640 described with reference to FIGS. 15 and/or 16, the transmitter module 930, 1530, and/or 1630 described with reference to FIGS. 9, 15, and/or 16, and/or the UE transceiver module(s) 2030 and UE antenna(s) 2040 described with reference to FIG. 20.

In some examples of the method 3000, transmitting the jointly coded acknowledgement bits (e.g., transmitting the uplink control channel including the jointly coded acknowledgement bits) over the interlace may include transmitting the jointly coded acknowledgement bits over a subset of the resource blocks of the interlace. In some examples of the method 3000, transmitting the jointly coded acknowledgement bits (e.g., transmitting the uplink control channel including the jointly coded acknowledgement bits) over the interlace may include transmitting different portions of the jointly coded acknowledgement bits over different subsets of the resource blocks of the interlace. In some examples of the method 3000, transmitting the jointly coded acknowledgement bits (e.g., transmitting the uplink control channel including the jointly coded acknowledgement bits) over the interlace may include transmitting a different portion of the jointly coded acknowledgement bits over each resource block of the interlace. In some examples of the method 3000, transmitting the jointly coded acknowledgement bits (e.g., transmitting the uplink control channel including the jointly coded acknowledgement bits) over the interlace may include transmitting the jointly coded acknowledgement bits over each of the resource blocks of the interlace.

In some examples of the method 3000, the plurality of non-contiguous concurrent resource blocks of the interlace may be spaced in frequency according to a uniform spreading pattern. In some examples, the plurality of non-contiguous concurrent resource blocks of the interlace may be distributed in frequency according to a non-uniform spreading pattern. In some examples, the jointly coded acknowledgement bits (e.g., the uplink control channel including the jointly coded acknowledgement bits) may be transmitted according to a PUCCH format, such as format 1, format 1a, format 1b, format 2, format 2a, format 2b, and/or format 3. In some examples, the jointly coded acknowledgement bits (e.g., the uplink control channel including the jointly coded acknowledgement bits) may be transmitted according to a PUCCH format from a group consisting of format 1a, format 1b, format 2, and format 3.

Thus, the method 3000 may provide for wireless communication. It should be noted that the method 3000 is just one implementation and that the operations of the method 3000 may be rearranged or otherwise modified such that other implementations are possible.

Figure 31:
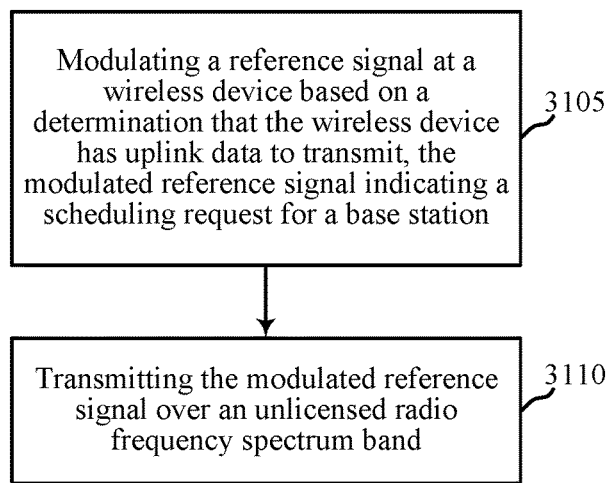
FIG. 31 is a flow chart illustrating an example of a method for wireless communication, in accordance with various aspects of the present disclosure.

FIG. 31 is a flow chart illustrating an example of a method 3100 for wireless communication, in accordance with various aspects of the present disclosure. For clarity, the method 3100 is described below with reference to aspects of one or more of the UEs 115, 215, 216, 217, 218, 2015, and/or 2215 described with reference to FIGS. 1, 2, 20, and/or 22, and/or aspects of one or more of the wireless devices 915, 1715, and/or 1815 described with reference to FIGS. 9, 17, and/or 18. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 3105, the method 3100 may include modulating a reference signal at a wireless device based on a determination that the wireless device has uplink data to transmit. The modulated reference signal may indicate a scheduling request for a base station. The operation(s) at block 3105 may be performed using the wireless communication management module 920, 1720, 1820, 2060, and/or 2284 described with reference to FIGS. 9, 17, 18, 20, and/or 22, and/or the SR generation module 1735 and/or 1835 described with reference to FIGS. 17 and/or 18.

At block 3110, the method 3100 may include transmitting the modulated reference signal over an unlicensed radio frequency spectrum band. In some examples, the unlicensed radio frequency spectrum band may include a radio frequency spectrum band for which apparatuses may need to contend for access because the radio frequency spectrum band is available for unlicensed use, such as Wi-Fi use. The operation(s) at block 3110 may be performed using the wireless communication management module 920, 1720, 1820, 2060, and/or 2284 described with reference to FIGS. 9, 17, 18, 20, and/or 22, the resource selection module 1845 and/or SR resource selection module 1850 described with reference to FIG. 18, the transmitter module 930, 1730, and/or 1830 described with reference to FIGS. 9, 17, and/or 18, and/or the UE transceiver module(s) 2030 and UE antenna(s) 2040 described with reference to FIG. 20.

In some examples of the method 3100, modulating the reference signal at block 3105 may include modifying a polarity of the reference signal to indicate the scheduling request.

In some examples of the method 3100, transmitting the modulated reference signal at block 3110 may include transmitting the modulated reference signal over an interlace of a component carrier of the unlicensed radio frequency spectrum band. The interlace of the component carrier may include a plurality of non-contiguous concurrent resource blocks. In some examples, the interlace may span a majority of a bandwidth of the component carrier of the unlicensed radio frequency spectrum band. In some examples of the method 3100, transmitting the modulated reference signal may include transmitting the modulated reference signal during a single symbol (e.g., a single OFDM symbol).

In some examples of the method 3100, the modulated reference signal may be transmitted concurrently with a sounding reference signal. In some examples, the sounding reference signal may be generated by the wireless communication management module 920, 1720, 1820, 2060, and/or 2284 described with reference to FIGS. 9, 17, 18, 20, and/or 22, and/or the SRS generation module 1840 described with reference to FIG. 18. In some examples, the sounding reference signal may be transmitted by the wireless communication management module 920, 1720, 1820, 2060, and/or 2284 described with reference to FIGS. 9, 17, 18, 20, and/or 22, the resource selection module 1845 and/or SRS resource selection module 1855 described with reference to FIG. 18, the transmitter module 930, 1730, and/or 1830 described with reference to FIGS. 9, 17, and/or 18, and/or the UE transceiver module(s) 2030 and UE antenna(s) 2040 described with reference to FIG. 20.

Thus, the method 3100 may provide for wireless communication. It should be noted that the method 3100 is just one implementation and that the operations of the method 3100 may be rearranged or otherwise modified such that other implementations are possible.

Figure 32:
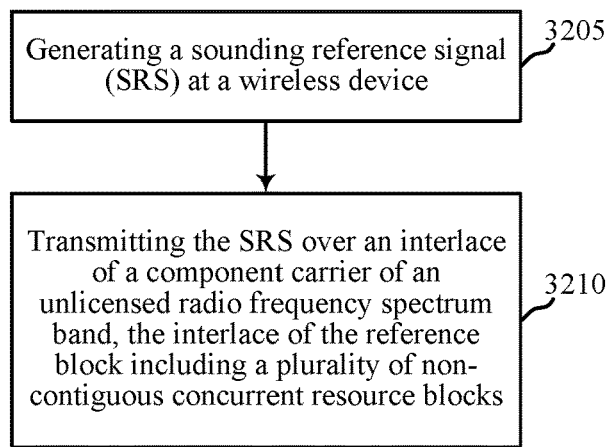
FIG. 32 is a flow chart illustrating an example of a method for wireless communication, in accordance with various aspects of the present disclosure.

FIG. 32 is a flow chart illustrating an example of a method 3200 for wireless communication, in accordance with various aspects of the present disclosure. For clarity, the method 3200 is described below with reference to aspects of one or more of the UEs 115, 215, 216, 217, 218, 2015, and/or 2215 described with reference to FIGS. 1, 2, 20, and/or 22, and/or aspects of one or more of the wireless devices 915 and/or 1915 described with reference to FIGS. 9 and/or 19. In some examples, a UE or wireless device may execute one or more sets of codes to control the functional elements of the UE or wireless device to perform the functions described below. Additionally or alternatively, the UE or wireless device may perform one or more of the functions described below using special-purpose hardware.

At block 3205, the method 3200 may include generating a sounding reference signal (SRS) at a wireless device. The operation(s) at block 3205 may be performed using the wireless communication management module 920, 1920, 2060, and/or 2284 described with reference to FIGS. 9, 19, 20, and/or 22, and/or the SRS generation module 1935 described with reference to FIG. 19.

At block 3210, the method 3200 may include transmitting the SRS over an interlace of a component carrier of an unlicensed radio frequency spectrum band. The interlace may include a plurality of non-contiguous concurrent resource blocks in the unlicensed radio frequency spectrum band. In some examples, the unlicensed radio frequency spectrum band may include a radio frequency spectrum band for which apparatuses may need to contend for access because the radio frequency spectrum band is available for unlicensed use, such as Wi-Fi use. The operation(s) at block 3210 may be performed using the wireless communication management module 920, 1920, 2060, and/or 2284 described with reference to FIGS. 9, 19, 20, and/or 22, the transmitter module 930 and/or 1930 described with reference to FIGS. 9 and/or 19, and/or the UE transceiver module(s) 2030 and UE antenna(s) 2040 described with reference to FIG. 20.

In some examples, the interlace may span a majority of a bandwidth of the component carrier of the unlicensed radio frequency spectrum band. In some examples of the method 3200, transmitting the SRS may include transmitting the SRS during a single symbol (e.g., a single OFDM symbol).

In some examples of the method 3200, the SRS may be transmitted concurrently with a modulated reference signal.

Thus, the method 3200 may provide for wireless communication. It should be noted that the method 3200 is just one implementation and that the operations of the method 3200 may be rearranged or otherwise modified such that other implementations are possible.

In some examples, aspects of one or more of the methods 2300, 2400, 2500, 2600, 2700, 2800, 2900, 3000, 3100, and/or 3200 described with reference to FIGS. 23, 24, 25, 26, 27, 28, 29, 30, 31, and/or 32 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   generating, at a wireless device, a set of uplink control information bits for the wireless device;
   mapping different subsets of the set of uplink control information bits to at least three resource blocks in an interlace of a carrier of an unlicensed radio frequency spectrum band, the interlace comprising a plurality of non-contiguous concurrent resource blocks in the unlicensed radio frequency spectrum band; and
   transmitting the set of uplink control information bits over an uplink control channel of an unlicensed radio frequency spectrum band via the interlace based at least in part on the mapping, wherein resources of the uplink control channel are divided into a plurality of discrete dimensions and the set of uplink control information bits of the wireless device is transmitted over a number of the discrete dimensions allocated to the set of uplink control information bits of the wireless device.

2. The method of claim 1, further comprising:
   receiving a scheduling message from a base station, the scheduling message indicating the number of the discrete dimensions allocated to the set of uplink control information bits of the wireless device.

3. The method of claim 2, wherein the number of the discrete dimensions allocated to the set of uplink control information bits of the wireless device is based on a size of the set of uplink control information bits of the wireless device.

4. The method of claim 1, wherein the set of uplink control information bits of the wireless device is transmitted over each of the plurality of discrete dimensions of the uplink control channel.

5. The method of claim 1, wherein at least one of the number of the discrete dimensions allocated to the set of uplink control information bits of the wireless device spans multiple ones of the resource blocks of the interlace.

6. The method of claim 1, wherein the resource blocks comprise different ones of the discrete dimensions.

7. The method of claim 1, wherein the plurality of non-contiguous concurrent resource blocks is spaced in frequency according to a uniform spreading pattern.

8. The method of claim 1, wherein the set of uplink control information bits is transmitted according to a physical uplink control channel (PUCCH) format from a group consisting of: format 1a, format 1b, format 2, and format 3.

9. An apparatus for wireless communication, comprising:
   means for generating, at a wireless device, a set of uplink control information bits for the wireless device;
   means for mapping different subsets of the set of uplink control information bits to at least three resource blocks in an interlace of a carrier of an unlicensed radio frequency spectrum band, the interlace comprising a plurality of non-contiguous concurrent resource blocks in the unlicensed radio frequency spectrum band; and
   means for transmitting the set of uplink control information bits over an uplink control channel of an unlicensed radio frequency spectrum band via the interlace based at least in part on the mapping, wherein resources of the uplink control channel are divided into a plurality of discrete dimensions and the set of uplink control information bits of the wireless device is transmitted over a number of the discrete dimensions allocated to the set of uplink control information bits of the wireless device.

10. The apparatus of claim 9, further comprising:
    means for receiving a scheduling message from a base station, the scheduling message indicating the number of the discrete dimensions allocated to the set of uplink control information bits of the wireless device.

11. The apparatus of claim 10, wherein the number of the discrete dimensions allocated to the set of uplink control information bits of the wireless device is based on a size of the set of uplink control information bits of the wireless device.

12. The apparatus of claim 9, wherein the set of uplink control information bits of the wireless device is transmitted over each of the plurality of discrete dimensions of the uplink control channel.

13. The apparatus of claim 9, wherein at least one of the number of the discrete dimensions allocated to the set of uplink control information bits of the wireless device spans multiple ones of the resource blocks of the interlace.

14. The apparatus of claim 9, wherein the resource blocks comprise different ones of the discrete dimensions.

15. The apparatus of claim 9, wherein the plurality of non-contiguous concurrent resource blocks is spaced in frequency according to a uniform spreading pattern.

16. The apparatus of claim 9, wherein the set of uplink control information bits is transmitted according to a physical uplink control channel (PUCCH) format from a group consisting of: format 1a, format 1b, format 2, and format 3.

17. An apparatus for wireless communication, comprising:
    a processor;
    memory coupled to the processor, wherein the processor is configured to:
        generate, at a wireless device, a set of uplink control information bits for the wireless device;

map different subsets of the set of uplink control information bits to at least three resource blocks in an interlace of a carrier of an unlicensed radio frequency spectrum band, the interlace comprising a plurality of non-contiguous concurrent resource blocks in the unlicensed radio frequency spectrum band; and transmit the set of uplink control information bits over an uplink control channel of an unlicensed radio frequency spectrum band via the interlace based at least in part on the mapping, wherein resources of the uplink control channel are divided into a plurality of discrete dimensions and the set of uplink control information bits of the wireless device is transmitted over a number of the discrete dimensions allocated to the set of uplink control information bits of the wireless device.

18. The apparatus of claim 17, wherein the processor is configured to:

receive a scheduling message from a base station, the scheduling message indicating the number of the discrete dimensions allocated to the set of uplink control information bits of the wireless device.

19. The apparatus of claim 18, wherein the number of the discrete dimensions allocated to the set of uplink control information bits of the wireless device is based on a size of the set of uplink control information bits of the wireless device.

20. The apparatus of claim 17, wherein the set of uplink control information bits of the wireless device is transmitted over each of the plurality of discrete dimensions of the uplink control channel.

21. The apparatus of claim 17, wherein the resource blocks comprise different ones of the discrete dimensions.

22. A non-transitory computer-readable medium for storing instructions executable by a processor, comprising:

instructions to generate, at a wireless device, a set of uplink control information bits for the wireless device;

instructions to map different subsets of the set of uplink control information bits to at least three resource blocks in an interlace of a carrier of an unlicensed radio frequency spectrum band, the interlace comprising a plurality of non-contiguous concurrent resource blocks in the unlicensed radio frequency spectrum band; and instructions to transmit the set of uplink control information bits over an uplink control channel of an unlicensed radio frequency spectrum band via the interlace based at least in part on the mapping, wherein resources of the uplink control channel are divided into a plurality of discrete dimensions and the set of uplink control information bits of the wireless device is transmitted over a number of the discrete dimensions allocated to the set of uplink control information bits of the wireless device.

23. The computer-readable medium of claim 22, wherein the instructions comprise:

instructions to receive a scheduling message from a base station, the scheduling message indicating the number of the discrete dimensions allocated to the set of uplink control information bits of the wireless device.

\* \* \* \* \*